(12) United States Patent
Hirakawa et al.

(10) Patent No.: US 7,529,901 B2
(45) Date of Patent: *May 5, 2009

(54) STORAGE SYSTEM AND DATA PROCESSING SYSTEM

(75) Inventors: Yusuke Hirakawa, Odawara (JP); Yoshihiro Asaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/973,773

(22) Filed: Oct. 9, 2007

(65) Prior Publication Data

US 2008/0215835 A1 Sep. 4, 2008

Related U.S. Application Data

(63) Continuation of application No. 11/473,827, filed on Jun. 23, 2006, now Pat. No. 7,296,126, which is a continuation of application No. 10/956,647, filed on Sep. 30, 2004, now Pat. No. 7,159,088.

(30) Foreign Application Priority Data

Aug. 4, 2004 (JP) ............................. 2004-228203

(51) Int. Cl.
*G06F 12/00* (2006.01)
(52) U.S. Cl. ....................... 711/162; 711/112
(58) Field of Classification Search ............... None
See application file for complete search history.

(56) References Cited

U.S. PATENT DOCUMENTS

| 5,155,845 A | 10/1992 | Beal et al. |
| 5,170,480 A | 12/1992 | Mohan et al. |
| 5,307,481 A | 4/1994 | Shimazaki et al. |
| 5,379,418 A | 1/1995 | Shimazaki et al. |
| 5,459,857 A | 10/1995 | Ludlam et al. |
| 5,504,882 A | 4/1996 | Chai et al. |
| 5,544,347 A | 8/1996 | Yanai et al. |
| 5,548,712 A | 8/1996 | Larson et al. |
| 5,555,371 A | 9/1996 | Duyanovich et al. |
| 5,682,513 A | 10/1997 | Candelaria et al. |

(Continued)

FOREIGN PATENT DOCUMENTS

| EP | 1400899 A2 | 3/2004 |
| JP | 02-037418 | 2/1990 |
| JP | 07-191811 | 7/1995 |
| JP | 2004-259079 A | 9/2004 |

OTHER PUBLICATIONS

Lyon "Tandem's Remote Data Facility," Proc. IEEE Spring CompCon Conf, pp. 562-567 (1990).

(Continued)

*Primary Examiner*—Brian R Peugh
(74) *Attorney, Agent, or Firm*—Townsend and Townsend and Crew LLP

(57) ABSTRACT

A storage system comprises a data set storage region for storing a data set containing data and update information for managing this data, and a control section. The data set storage region is divided into a plurality of storage regions including a first storage region and a second storage region. The control section generates a first data set containing first data and first update data which is update data for same, stores at least the first data of this first data set in the first storage region, generates a second data set containing second data and second update data which is update data for same, and stores at least the second data of this second data set in the second storage region, which is separate from the first storage region.

19 Claims, 33 Drawing Sheets

U.S. PATENT DOCUMENTS

| | | |
|---|---|---|
| 5,720,029 A | 2/1998 | Kern et al. |
| 5,734,818 A | 3/1998 | Kern et al. |
| 5,742,792 A | 4/1998 | Yanai et al. |
| 5,799,323 A | 8/1998 | Mosher et al. |
| 5,835,953 A | 11/1998 | Ohran |
| 5,901,327 A | 5/1999 | Ofek |
| 5,933,653 A | 8/1999 | Ofek |
| 5,974,563 A | 10/1999 | Beeler |
| 5,995,980 A | 11/1999 | Olson et al. |
| 6,044,444 A | 3/2000 | Ofek |
| 6,052,758 A | 4/2000 | Crockett et al. |
| 6,092,066 A | 7/2000 | Ofek |
| 6,101,497 A | 8/2000 | Ofek |
| 6,148,383 A | 11/2000 | Micka et al. |
| 6,157,991 A | 12/2000 | Arnon |
| 6,173,377 B1 | 1/2001 | Yanai et al. |
| 6,178,427 B1 | 1/2001 | Parker |
| 6,209,002 B1 | 3/2001 | Gagne et al. |
| 6,226,651 B1 | 5/2001 | Masuda et al. |
| 6,282,610 B1 | 8/2001 | Bergsten |
| 6,308,283 B1 | 10/2001 | Gal.ipeau |
| 6,324,654 B1 | 11/2001 | Wahl et al. |
| 6,360,306 B1 | 3/2002 | Bergsten |
| 6,363,462 B1 | 3/2002 | Bergsten |
| 6,393,538 B2 | 5/2002 | Murayama |
| 6,397,307 B2 | 5/2002 | Ohran |
| 6,408,370 B2 | 6/2002 | Yamamoto et al. |
| 6,442,706 B1 | 8/2002 | Wahl et al. |
| 6,446,176 B1 | 9/2002 | West et al. |
| 6,460,055 B1 | 10/2002 | Midgley et al. |
| 6,463,501 B1 | 10/2002 | Kern et al. |
| 6,467,034 B1 | 10/2002 | Yanaka |
| 6,477,627 B1 | 11/2002 | Ofek |
| 6,487,645 B1 | 11/2002 | Clark et al. |
| 6,496,908 B1 | 12/2002 | Kamvysselis et al. |
| 6,499,112 B1 | 12/2002 | Milillo et al. |
| 6,502,205 B1 | 12/2002 | Yanai et al. |
| 6,526,487 B2 | 2/2003 | Ohran et al. |
| 6,560,617 B1 | 5/2003 | Winger et al. |
| 6,598,134 B2 | 7/2003 | Ofek et al. |
| 6,611,901 B1 * | 8/2003 | Micka et al. ............... 711/162 |
| 6,618,818 B1 | 9/2003 | Wahl et al. |
| 6,622,152 B1 | 9/2003 | Sinn et al. |
| 6,625,623 B1 | 9/2003 | Midgley et al. |
| 6,662,197 B1 | 12/2003 | LeCrone et al. |
| 6,804,676 B1 | 10/2004 | Bains |
| 6,883,122 B2 | 4/2005 | Maple et al. |
| 6,941,322 B2 | 9/2005 | Bills et al. |
| 6,959,369 B1 | 10/2005 | Ashton et al. |
| 6,968,349 B2 | 11/2005 | Owen et al. |
| 7,020,744 B2 | 3/2006 | Nishikawa et al. |
| 7,219,201 B2 | 5/2007 | Kasako et al. |
| 2002/0016827 A1 | 2/2002 | McCabe et al. |
| 2002/0133511 A1 | 9/2002 | Hostetter et al. |
| 2002/0143888 A1 | 10/2002 | Lisiecki et al. |
| 2003/0014432 A1 | 1/2003 | Teloh et al. |
| 2003/0014433 A1 | 1/2003 | Teloh et al. |
| 2003/0051111 A1 | 3/2003 | Nakano et al. |
| 2003/0074378 A1 | 4/2003 | Midgley et al. |
| 2003/0074600 A1 | 4/2003 | Tamatsu et al. |
| 2003/0084075 A1 | 5/2003 | Bal.ogh et al. |
| 2003/0131207 A1 | 7/2003 | Arakawa et al. |
| 2003/0204479 A1 | 10/2003 | Bills et al. |
| 2003/0217031 A1 | 11/2003 | Owen et al. |
| 2003/0220935 A1 | 11/2003 | Vivian et al. |
| 2003/0229764 A1 | 12/2003 | Ohno et al. |
| 2004/0030703 A1 | 2/2004 | Bourbonnais et al. |
| 2004/0059738 A1 | 3/2004 | Tarbell |
| 2004/0117344 A1 | 6/2004 | Yang |
| 2004/0139128 A1 | 7/2004 | Becker et al. |
| 2004/0172509 A1 | 9/2004 | Takeda et al. |
| 2005/0038968 A1 | 2/2005 | Iwamura et al. |
| 2005/0050115 A1 | 3/2005 | Kekre |
| 2005/0055523 A1 | 3/2005 | Suishu et al. |
| 2005/0060505 A1 | 3/2005 | Kasako et al. |
| 2005/0060507 A1 | 3/2005 | Kasako et al. |
| 2005/0132155 A1 | 6/2005 | Kasako |
| 2005/0138308 A1 | 6/2005 | Morishita et al. |
| 2005/0204106 A1 | 9/2005 | Testardi |
| 2005/0235121 A1 | 10/2005 | Ito et al. |
| 2005/0273565 A1 | 12/2005 | Hirakawa et al. |
| 2006/0020754 A1 | 1/2006 | Suzuki et al. |
| 2006/0069889 A1 | 3/2006 | Nagaya et al. |
| 2006/0069891 A1 | 3/2006 | Nishikawa et al. |
| 2006/0123213 A1 | 6/2006 | Kasako |

OTHER PUBLICATIONS

"IBM DB2 Replication Guide and Reference, version 7," IBM Corporation Armonk, NY (2000).

"IBM DB2 Replication Guide and Reference, version 8," IBM Corporation Armonk, NY (2003).

"IBM DB2 RepliData for z/OS, version 3.1" IBM Corporation Armonk, NY (Mar. 2003).

"IBM DB2 DataPropagator for z/OS, version 8.1" IBM Corporation Armonk, NY (2002).

* cited by examiner

FIG. 4

| LOGICAL VOLUME NUMBER | VOLUME STATUS | FORMAT | CAPACITY | PAIR NUMBER | PHYSICAL ADDRESS | |
|---|---|---|---|---|---|---|
| | | | | | STORAGE DEVICE NUMBER | POSITION FROM HEAD |
| 1 | PRIMARY | OPEN3 | 3 | 1 | 1 | 0 |
| 2 | PRIMARY | OPEN6 | 6 | 2 | 1 | 3 |
| 3 | UNUSED | OPEN6 | 6 | 0 | 1 | 9 |
| 4 | NORMAL | OPEN9 | 9 | 0 | 2 | 0 |
| 5 | NORMAL | OPEN3 | 3 | 0 | 2 | 9 |
| 6 | UNUSED | OPEN6 | 6 | 0 | 2 | 12 |

400 VOLUME INFORMATION

FIG. 5

| PAIR NUMBER | PAIR STATUS | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | NORMAL | 1 | 1 | 2 | 1 | 1 | 0 |
| 2 | NORMAL | 1 | 2 | 2 | 3 | 1 | 0 |
| 3 | UNUSED | 0 | 0 | 0 | 0 | 0 | 0 |
| 4 | UNUSED | 0 | 0 | 0 | 0 | 0 | 0 |
| 5 | UNUSED | 0 | 0 | 0 | 0 | 0 | 0 |

500 PATH INFORMATION

FIG. 6

| GROUP NUMBER | GROUP STATUS | PAIR SET | JOURNAL LOGICAL VOLUME NUMBER | UPDATE NUMBER |
|---|---|---|---|---|
| 1 | NORMAL | 1,2 | 4 | 1 |
| 2 | UNUSED | 0 | 0 | 0 |

600 GROUP INFORMATION

FIG. 7

| GROUP NUMBER "1" | LOGICAL ADDRESS | |
|---|---|---|
| | LOGICAL VOLUME NUMBER | POSITION FROM HEAD OF STORAGE REGION OF LOGICAL VOLUME |
| UPDATE INFORMATION STORAGE REGION HEAD ADDRESS | 4 | 0 |
| WRITE DATA REGION HEAD ADDRESS | 4 | 700 |
| NEWEST UPDATE INFORMATION ADDRESS | 4 | 500 |
| OLDEST UPDATE INFORMATION ADDRESS | 4 | 200 |
| NEWEST WRITE DATA ADDRESS | 4 | 2200 |
| OLDEST WRITE DATA ADDRESS | 4 | 1300 |
| READ START ADDRESS | 4 | 400 |
| RETRY START ADDRESS | 4 | 300 |

700 POINTER INFORMATION

FIG. 21

| SETTING ITEMS | EXAMPLE OF SETTING VALUE |
|---|---|
| TIME AT WHICH WRITE COMMAND WAS RECEIVED | 3/17/1999 22:20:10 |
| GROUP NUMBER | 1 |
| UPDATE NUMBER | 4 |
| LOGICAL ADDRESS OF WRITE COMMAND | LOGICAL VOLUME NUMBER : 1<br>POSITION FROM HEAD OF STORAGE REGION IN LOGICAL VOLUME : 700 |
| SIZE OF WRITE DATA | 300 |
| LOGICAL ADDRESS OF JOURNAL LOGICAL VOLUME STORING WRITE DATA | LOGICAL VOLUME NUMBER : 4<br>POSITION FROM HEAD OF STORAGE REGION IN LOGICAL VOLUME : 1500 |

FIG. 22

| SETTING ITEMS | EXAMPLE OF SETTING VALUE |
|---|---|
| TIME AT WHICH WRITE COMMAND WAS RECEIVED | 3/17/1999 22:20:10 |
| GROUP NUMBER | 1 |
| UPDATE NUMBER | 4 |
| LOGICAL ADDRESS OF WRITE COMMAND | LOGICAL VOLUME NUMBER : 1<br>POSITION FROM HEAD OF STORAGE REGION IN LOGICAL VOLUME : 800 |
| SIZE OF WRITE DATA | 100 |
| LOGICAL ADDRESS OF JOURNAL LOGICAL VOLUME STORING WRITE DATA | LOGICAL VOLUME NUMBER : 4<br>POSITION FROM HEAD OF STORAGE REGION IN LOGICAL VOLUME : 2200 |

FIG. 24

| | | LOGICAL ADDRESS | |
| --- | --- | --- | --- |
| | | LOGICAL VOLUME NUMBER | POSITION FROM HEAD OF STORAGE REGION IN LOGICAL VOLUME |
| NEWEST UPDATE INFORMATION ADDRESS | | 1 | 200 |
| OLDEST UPDATE INFORMATION ADDRESS | | 1 | 0 |
| READ START ADDRESS | | 1 | 100 |
| RETRY START ADDRESS | | 1 | 50 |
| JOURNAL VOLUME #1 | UPDATE INFORMATION REGION HEAD ADDRESS | 1 | 0 |
| | WRITE DATA REGION HEAD ADDRESS | 1 | 700 |
| | NEWEST WRITE DATA ADDRESS | 1 | 1250 |
| | OLDEST WRITE DATA ADDRESS | 1 | 700 |
| JOURNAL VOLUME #2 | UPDATE INFORMATION REGION HEAD ADDRESS | 2 | 0 |
| | WRITE DATA REGION HEAD ADDRESS | 2 | 700 |
| | NEWEST WRITE DATA ADDRESS | 2 | 1200 |
| | OLDEST WRITE DATA ADDRESS | 2 | 700 |
| JOURNAL VOLUME #3 | UPDATE INFORMATION REGION HEAD ADDRESS | 3 | 0 |
| | WRITE DATA REGION HEAD ADDRESS | 3 | 700 |
| | NEWEST WRITE DATA ADDRESS | 3 | 850 |
| | OLDEST WRITE DATA ADDRESS | 3 | 700 |

| | LOGICAL ADDRESS | |
|---|---|---|
| | LOGICAL VOLUME NUMBER | POSITION FROM HEAD OF STORAGE REGION IN LOGICAL VOLUME |
| NEWEST UPDATE INFORMATION ADDRESS | 1 | 200 |
| OLDEST UPDATE INFORMATION ADDRESS | 1 | 0 |
| TAG#1 READ START ADDRESS | 1 | 0 |
| TAG#1 RETRY START ADDRESS | 1 | 0 |
| TAG#2 READ START ADDRESS | 1 | 50 |
| TAG#2 RETRY START ADDRESS | 1 | 50 |
| TAG#3 READ START ADDRESS | 1 | 100 |
| TAG#3 RETRY START ADDRESS | 1 | 100 |
| JOURNAL VOLUME #1 UPDATE INFORMATION REGION HEAD ADDRESS | 1 | 0 |
| JOURNAL VOLUME #1 WRITE DATA REGION HEAD ADDRESS | 1 | 700 |
| JOURNAL VOLUME #1 NEWEST WRITE DATA ADDRESS | 1 | 1250 |
| JOURNAL VOLUME #1 OLDEST WRITE DATA ADDRESS | 1 | 700 |
| JOURNAL VOLUME #2 UPDATE INFORMATION REGION HEAD ADDRESS | 2 | 0 |
| JOURNAL VOLUME #2 WRITE DATA REGION HEAD ADDRESS | 2 | 700 |
| JOURNAL VOLUME #2 NEWEST WRITE DATA ADDRESS | 2 | 1200 |
| JOURNAL VOLUME #2 OLDEST WRITE DATA ADDRESS | 2 | 700 |
| JOURNAL VOLUME #3 UPDATE INFORMATION REGION HEAD ADDRESS | 3 | 0 |
| JOURNAL VOLUME #3 WRITE DATA REGION HEAD ADDRESS | 3 | 700 |
| JOURNAL VOLUME #3 NEWEST WRITE DATA ADDRESS | 3 | 850 |
| JOURNAL VOLUME #3 OLDEST WRITE DATA ADDRESS | 3 | 700 |

| EXTENT # | #1 | | | | #2 | | | | #3 | | | |
|---|---|---|---|---|---|---|---|---|---|---|---|---|
| | START LOGICAL ADDRESS | | END ADDRESS | | START LOGICAL ADDRESS | | END ADDRESS | | START LOGICAL ADDRESS | | END ADDRESS | |
| | LOGICAL VOLUME NUMBER | POSITION FROM HEAD OF STORAGE REGION IN LOGICAL VOLUME | LOGICAL VOLUME NUMBER | POSITION FROM HEAD OF STORAGE REGION IN LOGICAL VOLUME | LOGICAL VOLUME NUMBER | POSITION FROM HEAD OF STORAGE REGION IN LOGICAL VOLUME | LOGICAL VOLUME NUMBER | POSITION FROM HEAD OF STORAGE REGION IN LOGICAL VOLUME | LOGICAL VOLUME NUMBER | POSITION FROM HEAD OF STORAGE REGION IN LOGICAL VOLUME | LOGICAL VOLUME NUMBER | POSITION FROM HEAD OF STORAGE REGION IN LOGICAL VOLUME |
| 0 | 1 | 700 | 1 | 1119 | 2 | 700 | 2 | 1119 | 3 | 700 | 3 | 1119 |
| 1 | 2 | 1200 | 2 | 1699 | 3 | 1200 | 3 | 1699 | 1 | 1200 | 1 | 1699 |
| 2 | 3 | 1700 | 3 | 2119 | 1 | 1700 | 1 | 2119 | 2 | 1700 | 2 | 2119 |
| 3 | 1 | 2200 | 1 | 2699 | 2 | 2200 | 2 | 2699 | 3 | 2200 | 3 | 2200 |

701 EXTENT INFORMATION

FIG. 29

| | | LOGICAL ADDRESS | |
| --- | --- | --- | --- |
| | | LOGICAL VOLUME NUMBER | POSITION FROM HEAD OF STORAGE REGION IN LOGICAL VOLUME |
| NEWEST UPDATE INFORMATION ADDRESS | | 1 | 250 |
| OLDEST UPDATE INFORMATION ADDRESS | | 1 | 0 |
| EXTENT #0 | NEWEST WRITE DATA ADDRESS | 1 | 1100 |
| | OLDEST WRITE DATA ADDRESS | 1 | 700 |
| | READ START ADDRESS | 1 | 0 |
| | RETRY START ADDRESS | 1 | 0 |
| EXTENT #1 | NEWEST WRITE DATA ADDRESS | 2 | 1300 |
| | OLDEST WRITE DATA ADDRESS | 2 | 1200 |
| | READ START ADDRESS | 1 | 50 |
| | RETRY START ADDRESS | 1 | 50 |
| EXTENT #2 | NEWEST WRITE DATA ADDRESS | 3 | 1700 |
| | OLDEST WRITE DATA ADDRESS | 3 | 2000 |
| | READ START ADDRESS | 1 | 100 |
| | RETRY START ADDRESS | 1 | 100 |
| EXTENT #3 | NEWEST WRITE DATA ADDRESS | 1 | 2200 |
| | OLDEST WRITE DATA ADDRESS | 1 | 2300 |
| | READ START ADDRESS | 1 | 150 |
| | RETRY START ADDRESS | 1 | 150 |
| JOURNAL VOLUME #1 | UPDATE INFORMATION REGION HEAD ADDRESS | 1 | 100 |
| | WRITE DATA REGION HEAD ADDRESS | 1 | 700 |
| JOURNAL VOLUME #2 | UPDATE INFORMATION REGION HEAD ADDRESS | 2 | 0 |
| | WRITE DATA REGION HEAD ADDRESS | 2 | 700 |
| JOURNAL VOLUME #3 | UPDATE INFORMATION REGION HEAD ADDRESS | 3 | 0 |
| | WRITE DATA REGION HEAD ADDRESS | 3 | 700 |

FIG. 31A

| Change JNL Group Option | | |
|---|---|---|
| Meta/Data Ratio: | 16 | ▼ |
| Extent: | 32 | ▼ |
| I/O Delay Execution: | ○ Yes | ● NO |
| Data Overflow Watch (0 to 600 sec): | 100 | |
| Cache Overflow Watch (0 to 600 sec): | 200 | |
| Initial Copy Rate (30 to 1600 MB/s): | 605 | |

[ Set ] [ Cancel ]

Java Applet Window

FIG. 31B

JNL Group Detail

| | |
|---|---|
| JNL Group : | 70 |
| Attribute : | Master |
| JNL Volumes : | 16 |
| Meta Data Ratio : | 16 |
| I/O Delay Execution: | Yes |
| Data Overflow Watch (sec): | 100 |
| Initial Copy Rate (MB/s): | 560 |

| | |
|---|---|
| JNL Size(GB) : | 137.54 |
| Extent : | 32 |
| Cache Overflow Watch(sec) : | 200 |

JNL Volumes

| PG | CU:LDEV | Size(GB) | Emulation |
|---|---|---|---|
| 1-1 | 00:11 | 6.87 | OPEN-9 |
| 1-1 | 00:12 | 6.87 | OPEN-9 |
| 1-1 | 00:13 | 6.87 | OPEN-9 |
| 1-1 | 00:14 | 6.87 | OPEN-9 |
| 1-1 | 00:15 | 34.38 | OPEN-9 |

5001

Mirrors

| Mirror ID | Status | CTG | S/N | Pair JNLG | Controller ID | Path Watch Threshold... | Path Watch Time |
|---|---|---|---|---|---|---|---|
| 00 | Initial | 01 | 12345 | 02 | 4 | 100 | 45 |

[ Previous ] [ Next ] [ Close ]

Java Applet Window

STORAGE SYSTEM AND DATA PROCESSING SYSTEM

CROSS-REFERENCE TO PRIOR APPLICATION

This application relates to and claims priority from continuation application U.S. application Ser. No. 11/473,827 filed on Jun. 23, 2006, now U.S. Pat. No. 7,296,126, which is a continuation of U.S. application Ser. No. 10/956,647 filed on Sep. 30, 2004, now U.S. Pat. No. 7,159,088, and Japanese Patent Application No. 2004-228203, filed on Aug. 4, 2004 the entire disclosures of which are incorporated herein by reference.

FIELD OF THE INVENTION

The present invention relates to data storage processing technology, for example, replication of data between a plurality of storage systems.

BACKGROUND OF THE INVENTION

In recent years, in order to provide continuous service to customers at all times, technology for replicating data between storage systems has become extremely important, in such a manner that a data processing system can still provide services even if a problem has occurred in a first storage system. One example of technology for replicating the information stored in the first storage system to a second and a third storage system is that disclosed in the following patent reference.

U.S. Pat. No. 5,170,480 discloses technology whereby a first computer device connected to a first storage system transfers the data stored in the first storage system to a second computer device, via a communications link between the first computer device and the second computer device, and the second computer device transfers this data to a second storage system connected to the second computer device.

SUMMARY OF THE INVENTION

The technology disclosed in U.S. Pat. No. 5,170,480 always uses a first computer device and a second computer device in order to replicate data. The first computer device performs normal tasks, and the load on the first computer device created by the data replication processing is not insignificant. Furthermore, there is a problem in that, since a communications link between the first computer device and the first storage system is used to transfer the data, the data for replication may conflict with data transfer required for normal tasks, thereby causing the data reference time and data update time required for normal tasks to increase.

Moreover, it would also appear to be desirable to improve the performance of replicating data from the first storage system to the second storage system (for example, by shortening the length of time required to replicate the data).

Furthermore, if a particular event occurs (for example, if the free storage space runs out at the destination for the replica data), then the process of replicating the data from the first storage system to the second storage system may be interrupted, but it would appear to be desirable to shorten the time period from the time at which the data replication process is interrupted until the time at which it restarts.

Consequently, it is an object of the present invention to perform data transfer or data replication between a plurality of storage systems, without affecting the top-level computer device of the storage system. It is a further object of the present invention to avoid affecting communications between the storage systems and the computer device.

It is a further object of the present invention to improve the performance of data replication from a first storage system to a second storage system.

It is a yet further object of the present invention to shorten the time period from the interruption of data replication from a first storage system to a second storage system, until the restarting of data replication.

Other objects of the present invention will become apparent from the following description.

The storage system according to a first aspect of the present invention is a storage system connected to another storage system storing received data; comprising: a data set storage region for storing a data set containing data and update data for managing the data; and a control section.

The control section generates the data set containing update data for managing the data, stores the generated data set in the data set storage region, and sends a data set in the data set storage region to the other storage system. The data set storage region is divided into a plurality of storage regions including a first storage region and a second storage region. The data comprises first data and second data. In this case, the control section generates a first data set containing the first data and first update data, being update data for the first data; stores at least the first data of the generated first data set in the first storage region; generates a second data set containing the second data and second update data, being update data for the second data; and stores at least the second data of the generated second data set in the second storage region, being a separate storage region from the first storage region.

The storage system and the other storage system may respectively be an actual storage device, or they may be systems comprising a plurality of storage devices. In the latter case, for example, the first storage region and the second storage region are respective logical volumes, and they may be storage regions provided in separate storage devices.

In the first mode of implementing the present invention, each of the plurality of storage regions is divided into an update data sub-region for storing the update data of the data set, and a data sub-region for storing the data of the data set. In this case, the control section stores the first data in the data sub-region of the first storage region, and stores the second data in the data sub-region of the second storage region.

In a second mode of implementing the present invention, in the first mode of implementation, the second data contained in the second data set is data stored subsequently to the first data contained in the first data set.

In a third mode of implementing the present invention, the other storage system generates a data set read command for reading out the data set, and sends the data set read command thus generated and a region identification code for identifying one of the plurality of storage regions, to the storage system. The control section receives the data set read command and the region identification code from the other storage system, reads out update data from the plurality of storage regions in response to the data set read command, further reads out data corresponding to the update data from the storage region corresponding to the received region identification code, of the plurality of storage regions, and sends the data set comprising the update data and the data thus read out, to the other storage system.

In a fourth mode of implementing the present invention, the storage system further comprises: a volume set constituted by one or a plurality of logical volumes for storing the data sets. The volume set is divided into a plurality of sub volume regions. Each of the plurality of storage regions is a sub volume region. Each of the plurality of sub volume regions extends over one or a plurality of logical volumes.

In a fifth mode of implementing the present invention, in the fourth mode of implementation, each of the one or plurality of logical volumes is divided into an update data region for storing the update data of the data sets, and a data region for storing the data of the data sets. At least the data region of the update data region and the data region is divided into a plurality of sub data regions. If there is one of the logical volumes, then each of the plurality of sub volume regions is a sub data region, whereas if there is a plurality of the logical volumes, then each of the plurality of sub volume regions is a sub data region group constituted by a group of a plurality of sub data regions respectively provided in the plurality of logical volumes.

In a sixth mode of implementing the present invention, in the fifth mode of implementation, the control section changes the storage destination for the data contained in the data set, for each sub volume region.

In a seventh mode of implementing the present invention, in the fourth mode of implementation, the number of the sub volume regions is equal to or greater than the number of the logical volumes.

In an eighth mode of implementing the present invention, the other storage system generates a data set read command for reading out the data set and sends same to the storage system. The control section receives the data set read command from the other storage system, reads out a plurality of data sets from the data set storage region in response to the data set read command, and sends same to the other storage system.

In a ninth mode of implementing the present invention, in the eighth mode of implementation, the control section reads out a plurality of data from consecutive regions of the data set storage region; reads outs a plurality of update data corresponding respectively to the plurality of data, from the data set storage region; generates the plurality of data sets comprising the plurality of data and the plurality of update data thus read out, and sends same to the other storage system.

In a tenth mode of implementing the present invention, the storage system further comprises a cache memory for temporarily storing data sets exchanged between the other storage system and the data set storage region. the other storage system generates a data set read command for reading out the data set and sends same to the storage system. In this case, the control section receives the data set read command from the other storage system, reads out a data set from the data set storage region to the cache memory, in response to the data set read command, sends the data set read out to the cache memory to the other storage system, reads out a data set from the data set storage region to the cache memory before receiving the next data set read command, and sends the data set stored in the cache memory to the other storage system, when the next data set read command is received.

In an eleventh mode of implementing the present invention, the other storage system comprises a secondary logical volume. The storage system further comprises: a primary logical volume for storing data, forming a pair with the secondary logical volume and provided with a plurality of sub-regions; and a differential information storage region for storing the differential information relating to the primary logical volume. The differential information includes a set value indicating whether or not there is a difference between the primary logical volume and the secondary logical volume, with respect to the data stored in each of the plurality of sub-regions in the primary logical volume. The control section refers to the differential information, and does not create the data set for particular data, if the set value corresponding to the data indicates that there is no difference.

The data processing system according to a second aspect of the present invention comprises: a first storage system for storing data; and a second storage system connected to the first storage system, for receiving and storing data from the first storage system. The first storage system comprises: a data set storage region for storing a data set containing the data and update data for managing the data; and a control section for generating the data set containing update data for managing the data, storing the generated data set in the data set storage region, and sending a data set in the data set storage region to the second storage system. The data set storage region is divided into a plurality of storage regions including a first storage region and a second storage region. The data comprises first data and second data. The control section generates a first data set containing the first data and first update data, being update data for the first data; stores at least the first data of the generated first data set in the first storage region; generates a second data set containing the second data and second update data, being update data for the second data; and stores at least the second data of the generated second data set in the second storage region, being a separate storage region from the first storage region.

The data processing method according to third aspect of the present invention is a data processing method implemented by a data processing system comprising a first storage system for storing data, and a second storage system connected to the first storage system, for receiving and storing data from the first storage system, comprising: a step whereby the first storage system generates a first data set containing first data and first update data, being update data for the first data; a step whereby the first storage system stores at least the first data of the generated first data set, in a first storage region of a plurality of storage regions constituting a data storage region; a step whereby the first storage system generates a second data set containing second data and second update data, being update data for the second data; a step whereby the first storage system stores at least the second data of the generated second data set in a second storage region contained in the plurality of storage regions, being a separate storage region to the first storage region; a step whereby the first storage system sends a first data set in the first storage region and a second data set in the second storage region, to the second storage system; and a step whereby the second storage system receives the first data set and the second data set from the first storage system, and stores the first data set and second data set thus received, in a data set storage region.

BRIEF DESCRIPTION OF THE DRAWINGS

FIG. 4 is a diagram showing an example of volume information in one mode of implementing the present invention;

FIG. 5 is a diagram showing an example of pair information in one mode of implementing the present invention;

FIG. 6 is a diagram showing an example of group information in one mode of implementing the present invention;

FIG. 7 is a diagram showing an example of pointer information in one mode of implementing the present invention;

FIG. 21 is a diagram showing an example of update information in one mode of implementing the present invention;

FIG. 22 is a diagram showing an example of update information in a journal creation process, according to one mode of implementing the present invention;

FIG. 24 shows an example of the composition of the pointer information 700A in the first embodiment of one mode of implementing the present invention;

FIG. 26 shows an example of the composition of the pointer information 700A in a first modification of the first embodiment of one mode of implementing the present invention;

FIG. 28 shows an example of the composition of extent information for managing a plurality of extents, in a second embodiment of one mode of implementing the present invention;

FIG. 29 shows an example of the composition of pointer information 700A corresponding to FIG. 27 and FIG. 28;

FIG. 31A shows a first GUI screen;
FIG. 31B shows a second GUI screen.

DETAILED DESCRIPTION OF THE PREFERRED EMBODIMENT

Below, one mode of implementing the present invention and several embodiments based on this mode of implementation are described with reference to the drawings. Firstly, the basic features of data processing using journals is described with reference to FIG. 1 to FIG. 22, as one mode of implementing the present invention. Thereupon, applications of this data processing will be described with reference to FIG. 23 onwards, as embodiments based on this mode of implementation.

Figure 1:
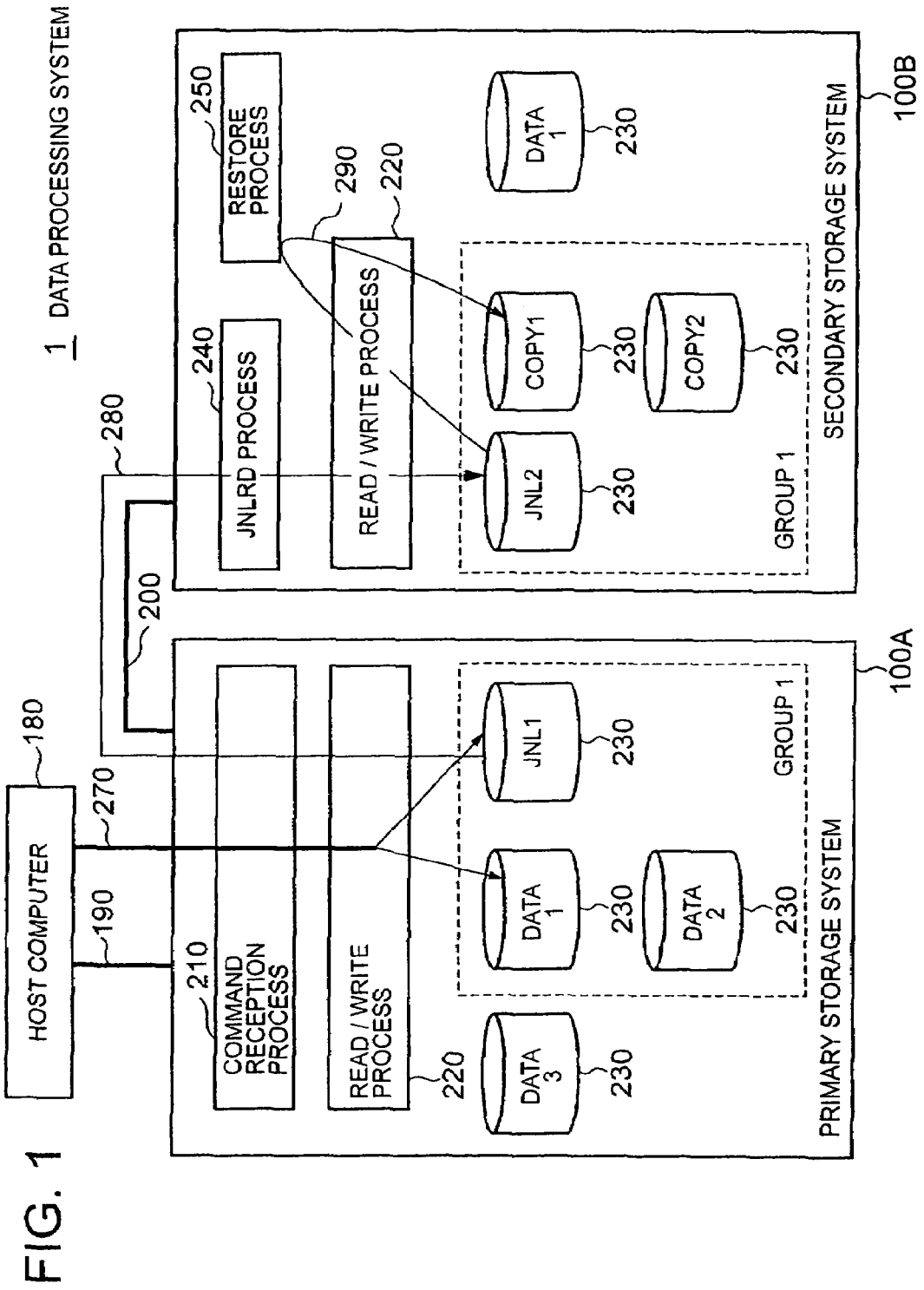
FIG. 1 is a block diagram showing the logical composition according to one mode of implementing the present invention.

FIG. 1 is a block diagram showing an overview of the logical composition of a data processing system relating to one mode of implementing the present invention.

The data processing system 1 is constituted by connecting a host computer 180 and a storage system 100A, by means of a connection path 190, and by connecting the storage system 100A and a storage system 100B for holding a replica of the data stored in the storage system 100A, by means of a connection path 200. In the following description, in order to make a ready distinction between the storage system 100A holding the data to be replicated (in other words, the original data), and the storage system 100B holding the replica data, the storage system 100A holding the data to be replicated is called the "primary storage system 100A", and the storage system 100B holding the replica data is called the "secondary storage system 100B". Furthermore, the term "storage system 100" may be used simply to refer to either 100A or 100B. Furthermore, the storage region of a storage system 100 is managed by dividing it up into separate regions, and these divided storage regions are called "logical volumes".

A storage system 100 comprises a plurality of logical volumes 230. The capacity of the logical volumes 230 and their physical storage positions (physical addresses) in the storage system 100 can be determined by means of a maintenance terminal, such as a computer connected to the storage system 100, or by means of the host computer 180. The physical address of each logical volume 230 is stored in volume information 400 (see FIG. 4), which is described hereinafter. The physical address comprises, for example, a number (storage device number) identifying a storage device inside the storage system 100 (for example, a hard disk drive), and a numerical value which uniquely identifies a storage region in that storage device, for example, a position from head position of the storage region of the storage device. In the following description, the physical address is taken to be a set comprising a storage device number and a position from the head of the storage region of the storage device. Furthermore, in the following description, the logical volume 230 is a storage region in one storage device, but it is also possible to make one logical volume correspond to storage regions in a plurality of storage devices, by converting (in other words, associating) the logical address and the physical address.

When referencing or updating data stored in a storage system 100, the number identifying a logical volume 230 (a logical volume number) and the numerical value uniquely identifying the storage region, for example, the position from the head of the storage region of the logical volume 230, can be specified universally, and hereinafter, a set comprising a logical volume number and a position from the head of the storage region of a logical volume 230 (the position at the logical address), is called the "logical address".

In the following description, in order to distinguish readily between the data to be replicated and the replica data, a logical volume storing data to be replicated is called a "primary logical volume" and a logical volume stored replica data is called a "secondary logical volume". Furthermore, a pair comprising a primary logical volume and a secondary logical volume is called a "pair". The relationships, states, and the like, of the primary logical volumes and the secondary logical volumes are included in path information 500 (see FIG. 5), described hereinafter.

In order to maintain the update sequence of the data between the respective logical volumes 230, management units known as groups are provided. For example, the host computer 180 updates first data in the primary logical volume (DATA1) 230 and then reads out that first data, and carries out processing for updating a second data in the primary logical volume (DATA2) 230, using the numerical value of the first data. If the replication processing for copying data from the primary logical volume (DATA1) 230 to the secondary logical volume (COPY1) 230 is carried out independently from the replication processing for copying data from the primary logical volume (DATA2) 230 to the secondary logical volume (COPY2) 230, then the replication processing for copying the second data to the secondary logical volume (COPY2) 230 may be carried out before the replication processing for copying the first data to the secondary logical volume (COPY1) 230. If the replication processing for copying the first data to the secondary logical volume (COPY1) 230 is halted due to a fault, or the like, between the replication processing for copying the second data to the secondary logical volume (COPY2) 230 and the replication processing for copying the first data to the secondary logical volume (COPY1) 230, then the data in the secondary logical volume (COPY1) 230 and the data in the secondary logical volume (COPY2) 230 will become mutually inconsistent. In order to maintain consistency between the data in the secondary logical volume (COPY1) 230 and the secondary logical volume (COPY2) 230 even in cases of this kind, the logical volumes 230 which are required to preserve the data update sequence are registered in the same group, and each time the data is updated, an update number is assigned in the group information 600 (see FIG. 6), described hereinafter, and data is replicated to the secondary logical volume in the order of the update numbers. For example, in FIG. 1, the logical volume (DATA1) 230 and the logical volume (DATA2) 230) of the primary storage system 100A constitute group 1. The logical volume (COPY1) 230, which is a replica of the logical volume (DATA1) 230, and the logical volume (COPY2) 230 which is a replica of the logical volume (DATA2) 230, constitute group 1 in the secondary storage system 100B.

In order to update the data in the secondary logical volume when the data in the primary logical volume is updated, the primary storage system 100A creates a journal (described hereinafter), which it stores in a logical volume 230 in the primary storage system 100A. In the present mode of implementation, in each group, a logical volume for saving only the journal for that group (hereinafter, called the "journal logical volume") 230 is provided. In FIG. 1, the journal logical volume (JNL1) 230 is allocated to group 1 in the primary storage system 100A, and the journal logical volume (JNL2) 230 is allocated to group 1 in the secondary storage system 100B.

The journal logical volume (JNL2) 230 stores a journal transferred from the primary storage system 100A to the secondary storage system 100B. By saving the journal in the journal logical volume (JNL2) 230, for example, if the load on the secondary storage system 100B is high, then it is possible to update the data in the secondary logical volume 100B after a time has passed and the load on the secondary storage system 100B has reduced, rather than updating the data in the secondary logical volume 100B when the journal is received. Moreover, if there are a plurality of connection paths 200, then multiple journals are transferred from the primary storage system 100A to the secondary storage system 100B in a superimposed fashion, in such a manner that the transfer capacity of the connection paths 200 can be used efficiently. In order to preserve the update sequence, it is possible that a large number of journals may accumulate in the secondary storage system 100B, but the cache memory (described hereinafter) can be released by withdrawing any journals that cannot be used immediately for updating the data in the secondary logical volume, to the journal logical volume (JNL2) 230.

A journal contains the same write data as that stored in other logical volumes apart from the journal logical volume (for example, the primary logical volume or the secondary logical volume), and update information. "Write data" means data to be written that is transmitted together with a write command from the host computer 180. "Update information" is information for managing that write data, and as illustrated in FIG. 21, for example, it includes the time at which the write command was received, the group number, the update data of the group information 600 (described hereinafter), the logical address of the write command, the data size of the write data, and the logical address of the journal logical volume storing the write data, and the like. The update information may also store only one of either the time at which the write command was received, or the update number. If there is a write command creation time in a write command from the host computer 180, then the creation time in this write command may be stored instead of the time at which the write command was received.

Figure 3:
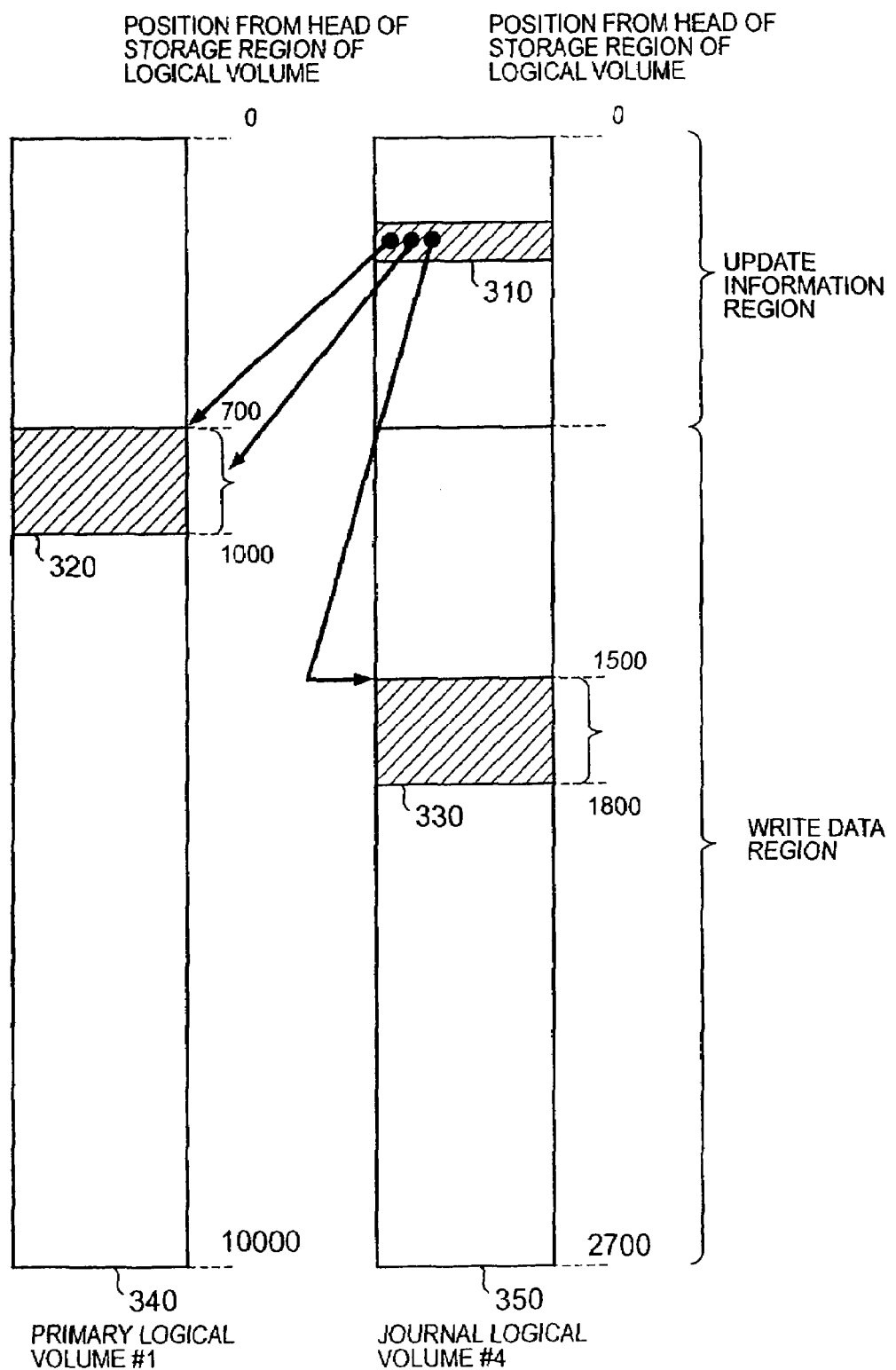
FIG. 3 is a diagram illustrating the relationship between update information and write data in one mode of implementing the present invention.

An example of the update information in a journal is described now with reference to FIG. 3 and FIG. 21. Below, the position from the head of a storage region of the logical volume 230 (in other words, a position with reference to the head position), is called an "address", for the sake of convenience.

According to the update information 310 illustrated in FIG. 21, it can be seen that a write command was received at 22:22:10 (hr:min:sec) on Mar. 17, 1999. Furthermore, it can also be gathered that this write command is a command indicating that the write data is to be written starting from the address 700 of the logical volume 230 having the logical volume number "1", and the data size of the write data is 300 Furthermore, it can also be seen that the write data contained in the journal is to be written starting from the address 1500 in the journal logical volume 230 having a logical volume number of "4". Moreover, it can also be gathered that the logical volume 230 having a logical volume number of "1" belongs to group 1, and that this update is the fourth data update since the start of data replication for group 1.

As shown in FIG. 3, for example, the journal logical volume is used by being divided into a storage region for storing update information (an update information region), and a storage region for storing write data (a write data region), (incidentally, the symbol "#4" indicates that the logical volume number is "4". The update information is stored in the update information region, in update number order, starting from the head of the update information region, and when the end of the update information region is reached, the update information having the next update number is stored, starting from the head of the update information region. Write data is stored in the write data region, in sequence, starting from the head of the write data region, and when the end of the write data region is reached, then the next write data is stored starting from the head of the write data region. The ratio of the size of the update information region to the size of the write data region may be a fixed ratio, or it may be a variable ratio set by means of a specific terminal, such as the maintenance terminal, the host computer 180, or the like. This information can be included in the pointer information 700 (see FIG. 7), which is described hereinafter. In the following description, the journal logical volume is divided into an update information region and a write data region for use, but it is also possible to adopt a method wherein the journal, in other words, a set of update information and write data, is stored in a continuous fashion, starting from the head of the logical volume.

Furthermore, one example of an operation for reflecting a data update made to a primary logical volume of the primary storage system 100A, in a secondary logical volume of the secondary storage system 100B, will be described broadly with reference to FIG. 1.

(1) When the primary storage system 100A receives a write command relating to the data in the primary logical volume (DATA1) 230, from the host computer 180, it updates the data in the primary logical volume (DATA1) 230 and saves a journal in the journal logical volume (JNL1) 230, by means of a command reception process 210 and a read/write process 220, which are described hereinafter (270 in FIG. 1).

(2) The secondary storage system 100B reads out the journal from the primary storage system 100A, by means of a journal read process 240, described hereinafter, and it saves the journal in the journal logical volume (JNL2) 230, by means of a read/write process 220 (280 in FIG. 1).

(3) When the primary storage system 100A receives a command for reading the journal from the secondary storage system 100B, it reads out the journal from the journal logical volume (JNL1) 230 and transmits it to the secondary storage system 100B, by means of a command reception process 210 and a read/write process 220, as described hereinafter (280 in FIG. 1).

(4) Using the pointer information 700, the secondary storage system 100B reads out the journal from the journal logical volume (JNL2) 230, in sequence with the update number, and updates the data in the secondary logical volume (COPY1) 230, by means of a restore process 250 and a read/write process 220 (290 in FIG. 1).

Figure 2:
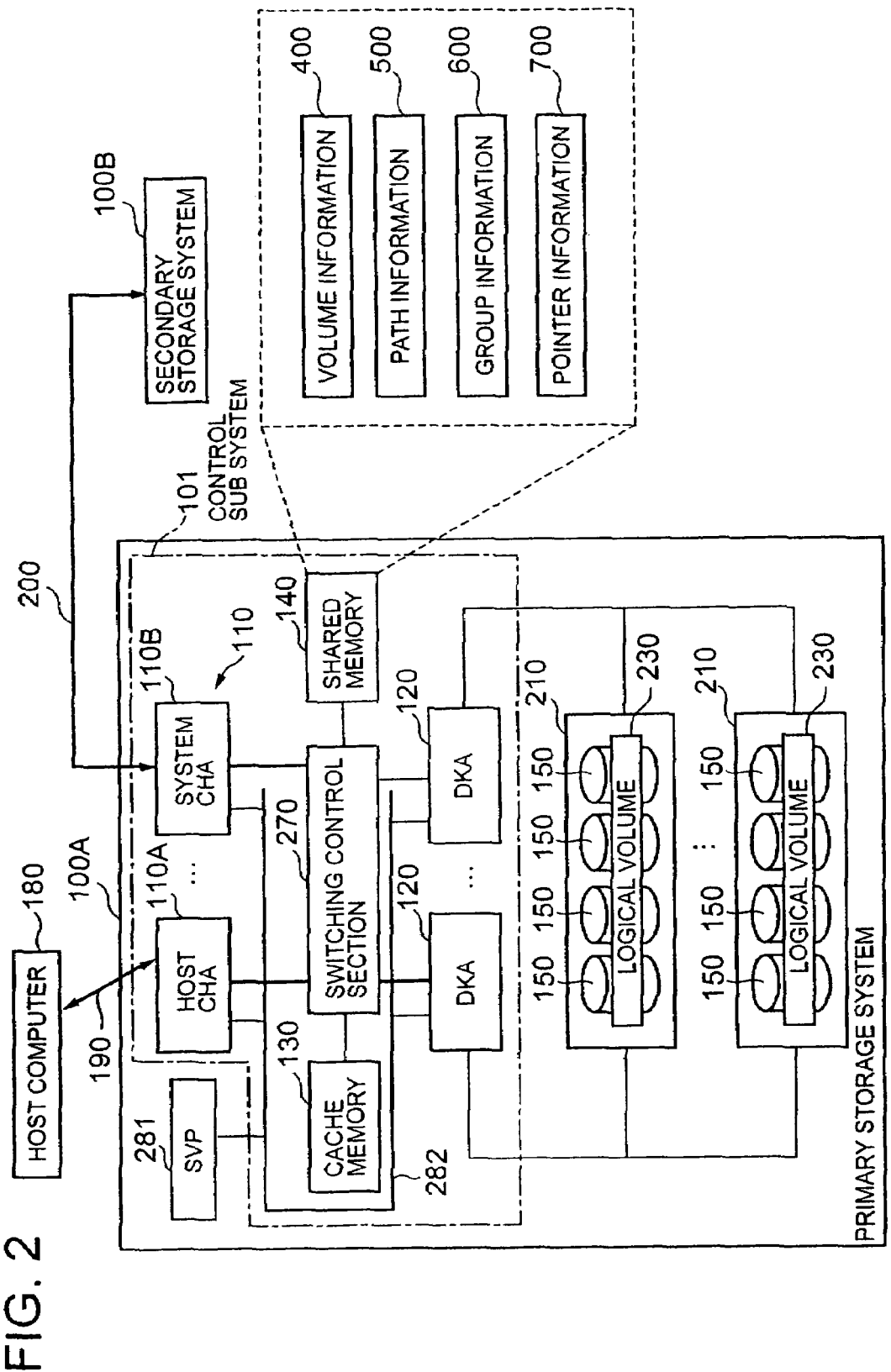
FIG. 2 is a block diagram of the storage system in one mode of implementing the present invention.

FIG. 2 is a block diagram showing an example of the composition of the primary storage system 100A. Below, for the sake of convenience, it is supposed that the primary storage system 100A and the secondary storage system 100B have similar compositions, and the primary storage system 100A is taken as a representative example to describe the composition of the storage systems 100. However, the primary storage system 100A and the secondary storage system 100B do not necessarily have to be of the same composition.

The primary storage system 100A is a disk array system, such as a RAID (Redundant Array of Independent Disks) system, for example. The primary storage system 100A comprises, for example, a control sub-system 101 for controlling the processing carried out by the primary storage system 100A, a RAID group 210, and a service processor (SVP) 281. The control sub-system 101 comprises, for example, a plurality of DKAs (hereinafter, DKA) 120, a plurality of channel adapters (hereinafter, CHA) 110, a cache memory 130, a shared memory 140 and a switching control section 270.

The RAID group 210 comprises a plurality of storage devices 150, for example, it provides redundant storage based on RAIDs, such as a RAID1 or RAID5 system. The respective storage devices 150 can be constituted by storage devices, such as a hard disk drive (or a disk device itself), a semiconductor memory device, a magneto-optical disk drive (or a magneto-optical disk itself), and the like. At least one or more logical volumes 230 forming logical storage regions can be set in the physical storage regions provided by the respective storage devices 150. A plurality of data used by the host computer 180 can be stored in the logical volumes 230. Moreover, it is also possible to store control information, and the like, in a separate logical volume 230, and to use same as a system region. Furthermore, the storage devices 150 do not all have to be positioned inside the frame of the primary storage system 100A. For example, it is possible to use a logical volume belonging to another storage system (not illustrated) as a logical volume of the primary storage system 100A. In the following description, there may be cases where logical volume is abbreviated to "volume".

The respective DKAs 120 control data transmission and reception between the respective storage devices 150. Each of the DKAs 120 may be constituted by a microcomputer system comprising a CPU, ROM, RAM, and the like, for example. A plurality of DKAs 120 are provided in the primary storage system 100A. The DKAs 120 transfer block-level data between the storage devices 150, on the basis of a SCSI or iSCSI protocol, or the like.

Similarly to the DKAs 120, each of the plurality of CHAs 110 may be constituted by a microcomputer system. A plurality of host CHAs 110A for performing data communications with the host computer 180 via the connection path 190, and one or more system CHA 110B for performing data communications with the other storage systems 100 via the connection path 200, are included in the plurality of CHAs 110. At least one of the connection paths 190 and 280 may be a communications network, or it may be a dedicated path line. Furthermore, the host CHAs 110A may be prepared respectively in accordance with the type of host computer 180 (for example, whether it is a server or a main frame device, or the like).

The cache memory 130 may be constituted by a volatile or a non-volatile semiconductor memory, for example. The cache memory 130 stores write data (data written to the logical volume) from the host computer 180. Moreover, the cache memory 130 stores data read out from the logical volume 230 (hereinafter, called "read data").

The shared memory 140 may be constituted by a non-volatile or volatile semiconductor memory, for example. The shared memory 140 stores, for example, various commands received from the host computer 180, and control information, and the like, used to control the primary storage system 100A. The commands and control information, and the like, may be stored in a redundant fashion by means of a plurality of shared memories 140. The cache memory 130 and the shared memory 140 may be constructed as mutually separate memories, or alternatively, a portion of a single memory may be used as a cache memory region and the remaining portion of the memory may be used as a shared memory region.

The switching control section 270 is connected respectively to the various DKAs 120, the host CHA 110A, the system CHA 110B, the cache memory 130, and the shared memory 140. The switching control section 270 may be constituted by an ultra-high-speed cross-bar switch, or the like, for example.

The SVP 281 gathers and monitors the states of the respective sections of the primary storage system 100A, via an internal network (such as a LAN) 282, for example. The SVP 280 may output the gathered data relating to the internal states, either directly as raw data, or as processed statistical data, to an external management terminal (not illustrated). Examples of information which may be gatherable by the SVP 280 include: the device composition, power supply alarms, temperature alarms, input/output speed, and the like. The system administrator can change the settings of the RAID composition, or implement processing for shutting off various types of packages (for example, the CHAs 110 and the DKAs 120), from the management terminal, via the SVP 280.

Next, one example of the processing carried out by the primary storage system 100A will be described. The host CHA 110A receives write commands and write data from the host computer 180, via the connection path 190. The write command thus received is stored in the shared memory 140, and the write data thus received is stored in the cache memory 130. The DKAs 120 refer to the shared memory 140 at regular intervals. When the DKA 120 discovers an unprocessed write command stored in the shared memory 140, then it reads out the write data from the cache memory 130, and performs address conversion, and the like, in accordance with this write command. The DKA 120 stores the write data in the respective storage devices 150 which constitute the logical volume 230 designated by the write command.

A case where a read command from the host computer 180 is processed is now described. When a host CHA 110A receives a read command from the host computer 180, it stores that read command in the shared memory 140. If the DKA 120 discovers an unprocessed read command in the shared memory 140, then it reads out data from the respective storage devices 150 constituting the logical volume 230 designated by the read command. The DKA 120 stores the data thus read out in the cache memory 130. Furthermore, the DKA 120 reports that read out of the requested data has been completed, to the host CHA 110A, via the shared memory 140. The host CHA 110A reads in data from the cache memory 130 and transmits this to the host computer 180.

One example of data replication (hereinafter, also called "remote copying" in some cases) performed between the primary storage system 100A and the secondary storage system 100B, via the connection path 200 (which may also be called a "remote copy line") will now be described. Remote copying does not involve a write command or a read command from the host computer 180, but rather is a data replication process carried out in response to write commands and read commands transmitted and received between the storage systems 100A and 100B, without requiring the intervention of the host computer 180.

More specifically, for example, if the control sub-system 101A of the primary storage system 100A is writing write data to the primary logical volume (DATA1) 230 which forms a pair with the secondary logical volume (COPY1) 230, then it transmits the write data and the corresponding write command to the secondary storage system 100B, via the connection path 200. Thereby, the updated data is stored in the secondary storage system 100B in synchronism with the updating of the data.

Furthermore, the control sub-system 101A of the primary storage system 100A generates, every time the primary logical volume (DATA 1) is updated, a journal as described above and stores it in the journal logical volume (JNL1) 230, for example, and if it receives a read command from the secondary storage system 100B (or if it has issued a write command to the secondary storage system 100B), then the journal in the journal logical volume (JNL1) 230 is transmitted to the secondary storage system 200B, via the connection path 200. Consequently, the journal is stored in the secondary storage system 100B in a non-synchronized fashion with respect to the storage of the journal in the primary storage system 100A. Furthermore, by carrying out a restore process in the secondary storage system 100B using this journal, the secondary logical volume (COPY1) 230 becomes a replica of the primary logical volume (DATA1) 230.

The foregoing provides an example of the composition of a storage device system 100 according to the present mode of implementation. Needless to say, it is not necessary to limit the storage system 100 to the aforementioned composition. For example, the control sub-system 101 is not limited to the aforementioned composition, and it may, for example, be constituted by a memory capable of storing control information, write data, and the like, an interface device for communicating with the host computer (hereinafter, abbreviated as "I/F"), an I/F for communicating with the other storage systems, an I/F for communicating with the storage devices 150, and a control section (for example, a CPU) for controlling communications via these I/F, and the like, on the basis of the information in the memory. Moreover, in the storage system 100, a first data transfer performed from the host computer 180 (or another storage system) to the cache memory 130, via a CHA 110 and the switching control section 270, and the second data transfer performed from the cache memory 130 to the host computer (or another storage system) via the switching control section 270 and a CHA 110, can be carried out simultaneously, provided that the CHA 110 controlling the first data transfer and the CHA 110 controlling the second data transfer are different and/or provided that the caches forming the transfer source and the transfer destination of the data are different (for example, provided that the cache memory address of the transfer source is different from the cache memory address of the transfer destination). Similarly, in the storage system 100, a third data transfer performed from a storage device 150 to the cache memory 130, via a DKA 120 and the switching control section 270, and a fourth data transfer performed from the cache memory 130 to a storage device 150 via the switching control section 270 and a DKA 120, can be carried out simultaneously, provided that the DKA 120 controlling the third data transfer and the DKA 120 controlling the fourth data transfer are different and/or provided that the caches forming the transfer source and the transfer destination of the data are different (for example, provided that the cache memory address of the transfer source is different from the cache memory address of the transfer destination). Moreover, the first data transfer or the second data transfer, and the third data transfer and/or the fourth data transfer can be carried out simultaneously, provided that the transfer destination in the first data transfer or the transfer source in the second data transfer is different from the transfer destination in the third data transfer and/or the transfer source in the fourth data transfer. Moreover, in order to perform synchronized transfer of this kind, the respective transmission paths (for example, the transmission path between the CHA 110 and the switching control section 270, the transmission path between the DKA 120 and the switching control section 270, and the transmission path between the switching control section 270 and the cache memory 130) must have suitable bandwidth (transmission speed). If, for example, one switching control section 270 is connected to two CHAs 110, two DKAs 120 and two cache memories 130, then if the bandwidth between the switching control section 270 and the cache memories 130 is not equal to or greater than the bandwidth between the CHAs 110 (or DKAs 120) and the switching control section 270, there will be no merit is using superimposed transmission, and hence it is desirable that this bandwidth is two or more times the bandwidth between the CHAs 110 (or DKAs 120) and the switching control section 270. Furthermore, the write speed and read out speed of the storage device 150 and the write speed and read out speed of the cache memory 130 should be faster speeds than the transfer speed on the path between the storage device 150 and the cache memory 130, and desirably, they are speeds which will not cause under-run errors or over-run errors between these elements.

The volume information 400, path information 500, group information 600 and pointer information 700 are stored as types of control information in a memory which can be referenced by the CHA 110 and the DKA 120, such as the shared memory 140, for example. These items are described below.

FIG. 4 shows an example of the composition of volume information 400.

The volume information 400 is information for managing a plurality of logical volumes 230, and comprises information elements indicating the logical volume number associated with each logical volume, the volume status, the volume format, the capacity (in units of gigabytes, for example), the pair number, and the physical address.

The volume status for each logical volume is an information element which indicates the status of that logical volume, for example: "normal", "primary", "secondary", "abnormal", "unused", or the like. A logical volume 230 having a volume status of "normal" or "primary" is a logical volume 230 which can be accessed normally by the host computer 180. A logical volume 230 having a volume status of "secondary" is a logical volume 230 to which access from the host computer 180 may be permitted. A logical volume 230 having a volume status of "primary" is a logical volume for which data replication is carried out (in other words, a primary logical volume) 230. A logical volume 230 having a volume status of "secondary" is a logical volume used to replicate data (in other words, a secondary logical volume) 230. A logical volume 230 having a volume status of "abnormal" is a logical volume 230 which cannot be accessed normally, due to a problem. Here, a "problem" means, for example, a problem in the disk drive 110 which holds the logical volume 230. A logical volume 230 having a volume status of "unused" indicates a logical volume 230 that is not being used.

The pair number for each logical volume is a number for identifying a pair consisting of a primary logical volume and a secondary logical volume. More specifically, the pair number for each logical volume is a pair number for identifying path information 500 (described hereinafter), which is valid when the volume status corresponding to that logical volume is "primary" or "secondary".

According to the volume information 400 illustrated in FIG. 4, for example, the logical volume 230 having a logical volume number of "1" is a primary logical volume (in other words, a logical volume whose data is replicated) having a format type of "OPEN3" and a storage capacity of 3 GB, which stores data from the head position of the storage region of the storage device 150 having a storage device number of "1", and which is accessible. In addition to containing information relating to the plurality of logical volumes 230 in the storage system 100 where that volume information 400 is provided, the volume information 400 may also record information relating to one or more logical volumes 230 in another storage system 100 connected to that storage system 100 via the connection path 200.

FIG. 5 shows an example of the composition of path information 500.

The path information 500 is information for managing pairs, which includes information elements indicating, for example, the pair number associated with each pair, the pair status, the primary storage system number, the primary logical volume number, the secondary storage system number, the secondary logical volume number, the group number, and the copied address.

The pair status for each pair is an information element indicating the status of that pair, which may be, for example, "normal", "abnormal", "unused", "not copied", "copying", or the like. A pair status of "normal" indicates that data replication of the primary logical volume 230 has been carried out normally. A pair status of "abnormal" indicates that replication of the primary logical volume 230 has not been carried out, due to a problem. Here, a "problem" means an interruption of the connection path 200, for example. A pair status of "unused" indicates that the pair number information corresponding to that pair status is not valid. A pair status of "copying" indicates that initial copy processing, as described below, is in progress. A pair status of "not copied" indicates that initial copy processing, as described below, has not yet been carried out.

The primary storage system number for each pair is a number indicating the primary storage system 100A holding the primary logical volume 230 constituting that pair.

The secondary storage system number for each pair is a number indicating the secondary storage system 100B holding the secondary logical volume 230 constituting that pair.

If the storage system 100 providing the path information 500 is the primary storage system 100A, then the group number for the pair will be the group number of the group to which the primary logical volume 230 constituting that pair belongs, and if the storage system 100 providing the path information 500 is a secondary storage system, then it will be the group number of the group to which the secondary logical volume 230 constituting that pair belongs.

The copied address for each pair is described hereinafter with reference to the initial copy processing.

According to the path information 500 illustrated in FIG. 5, for example, the pair having a pair number of "1" is a pair constituted by a primary logical volume having a logical volume number of "1" and a secondary logical volume having a logical volume number of "1", and it can be seen that data replication processing has been carried out normally.

FIG. 6 shows an example of the composition of group information 600.

The group information 600 is information for managing one or more groups constituted by a plurality of logical volumes 230, and it contains information elements indicating, for example, the group number associated with each group, the group status, the set of pairs, the journal logical volume number and the update number.

The group status for each group is an information element which indicates the status relating to that group, for example: "normal", "abnormal", "unused", or the like. A group status of "normal" indicates that the pair status of at least one of the pairs identified by the pair set associated with that group is "normal". A group status of "abnormal" indicates that the pair status of all of the pairs identified by the pair set associated with that group is "abnormal". A group status of "unused" indicates that the group number information for the corresponding group is not valid.

The pair set for each group includes the pair numbers of the pairs formed by the respective logical volumes in that group. If the storage system 100 having this group information 600 is a primary storage system 100A, then the pair set includes all of the pair numbers corresponding respectively to all of the primary logical volumes belonging to that group. If, on the other hand, the storage system 100 having this group information 600 is a secondary storage system 100B, then the pair set includes all of the pair numbers corresponding respectively to all of the secondary logical volumes belonging to that group.

The journal logical volume number for each group indicates a number for identifying the journal logical volume belonging to that group.

The update number for each group is a number set in the update information of the journal, which is used in order to preserve the data update sequence, in the secondary storage system 100B. The update number of a group has an initial value of 1, but if data is subsequently written to a primary logical volume in that group, then 1 is added to the update number corresponding to that group only.

Supposing that the group information 600 illustrated in FIG. 6 is group information provided in a primary storage system 100A, for example, then according to this group information, it can be seen that the group having a group number of "1" contains a primary logical volume constituting a pair having a pair number of "1", a primary logical volume constituting a pair having a pair number of "2", and a journal logical volume having a logical volume number of "4". Moreover, it can also be seen that data replication processing for the group having a group number of "1" has been carried out normally.

Figure 8:
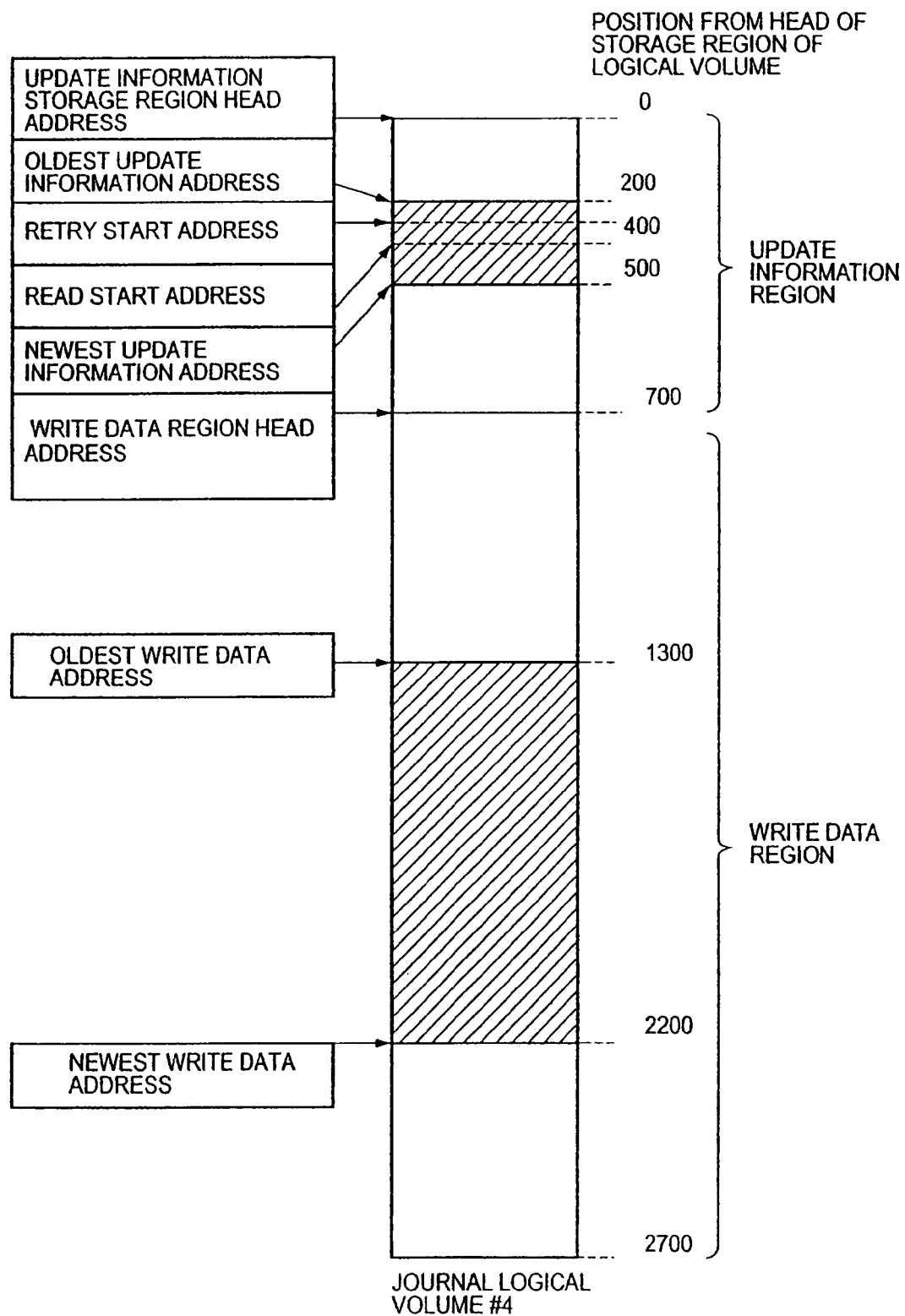
FIG. 8 is a diagram showing the structure of a journal logical volume in one mode of implementing the present invention.

FIG. 7 shows an example of the composition of pointer information 700. FIG. 8 shows the contents that are identified by the pointer information 700 shown in FIG. 7.

As illustrated in FIG. 7, the pointer information 700 is prepared for each group, and is used to manage the journal logical volume contained in the corresponding group. The pointer information 700 contains information elements indicating, for example, an update information region head address, a write data region head address, a newest update information address, an oldest update information address, a newest write data address, an oldest write data address, a read start address, and a retry start address.

The update information region head address is the logical address of the head position of the storage region storing the update information of the journal logical volume (the update information region).

The write data region head address is the logical address of the head position of the storage region storing the write data of the journal logical volume (the write data region).

The newest update information address is the logical address of the head position used to store the update information in a journal, when the next journal is stored (in other words, information indicating where to start writing the update information contained in the next journal).

The oldest update information address is the logical address of the head position of the region where the update information of the oldest journal (namely, the journal having the smallest update number) is stored.

The newest write data address is the logical address of the head position used to store the write data in a journal, when the next journal is stored (in other words, information indicating where to start writing the write data contained in the next journal).

The oldest write data address is the logical address of the head position of the region where the write data in the oldest journal (namely, the journal having the smallest update number) is stored.

The read start address and the retry start address are information elements used only by the primary storage system 100A. This information is used in journal read reception processing, which is described hereinafter. A detailed description of the read start address and the retry start address is given below.

According to the pointer information 700 illustrated in the example in FIG. 7 and FIG. 8, it can be seen that the region for storing the update information in the journal (the update information region) is the range from address 0 (the head position) of journal logical volume #4 to address 699 of same, and the region for storing the write data in the journal (the write data region) is the range from address 700 of journal logical volume #4 to address 2699 of same. Moreover, it can also be seen that the update information of a journal is stored in the range between address 200 and address 499 of journal logical volume #4, and the update information of the next journal is written from address 500 of journal logical volume #4 onwards. Furthermore, it can also be seen that the write data of the journal is stored in the range between address 1300 and address 2199 of journal logical volume #4, and the write data of the next journal is written from address 2200 of journal logical volume #4 onwards.

The foregoing provides an example of the composition of the pointer information 700. In the description of the present mode of implementation, a configuration is described wherein one journal logical volume is allocated to each group, but it is also possible to allocate a plurality of journal logical volumes to one group. More specifically, for example, it is also possible to allocate two journal logical volumes to one group, provide pointer information 700 for each journal logical volume (or include information elements relating to the plurality of journal logical volumes in the pointer information 700), and store journals in the journal logical volumes in alternating fashion. Thereby, it is possible to distribute the task of writing journals to the hard disk 150, and hence improved performance can be anticipated. Moreover, journal read out performance can also be improved. As a further concrete example, it is also possible to allocate two journal logical volumes to one group, only one of the journal logical volumes being used in normal conditions, and the other journal logical volume being used in cases where the performance of the first journal logical volume in use has declined. An example of a decline in performance is a case where the journal logical volume is constituted by a plurality of storage devices 150, data being stored by a RAID5 method, and one of that plurality of storage devices 150 suffers a fault.

Furthermore, the volume information 400, path information 500, group information 600 and pointer information 700, and the like, described above can be stored in the shared memory 140. However, the invention is not limited to this, and this information may also be stored in a concentrated or distributed fashion, in at least one of the cache memory 130, the CHAs 110, the DKA 120, and the storage devices 150, for example. Moreover, each storage system 100 may be provided with control information relating at least to the other storage systems 100 with which it is able to communicate, (for example, at least one of the volume information 400, path information 500, group information 600, and pointer information 700), in addition to the control information relating to itself. In this case, moreover, each time the control information in one of the other storage systems 100 is updated, the updated contents may be reflected in the control information corresponding to that other storage system 100, which is provided in the first storage system 100.

Figure 9:
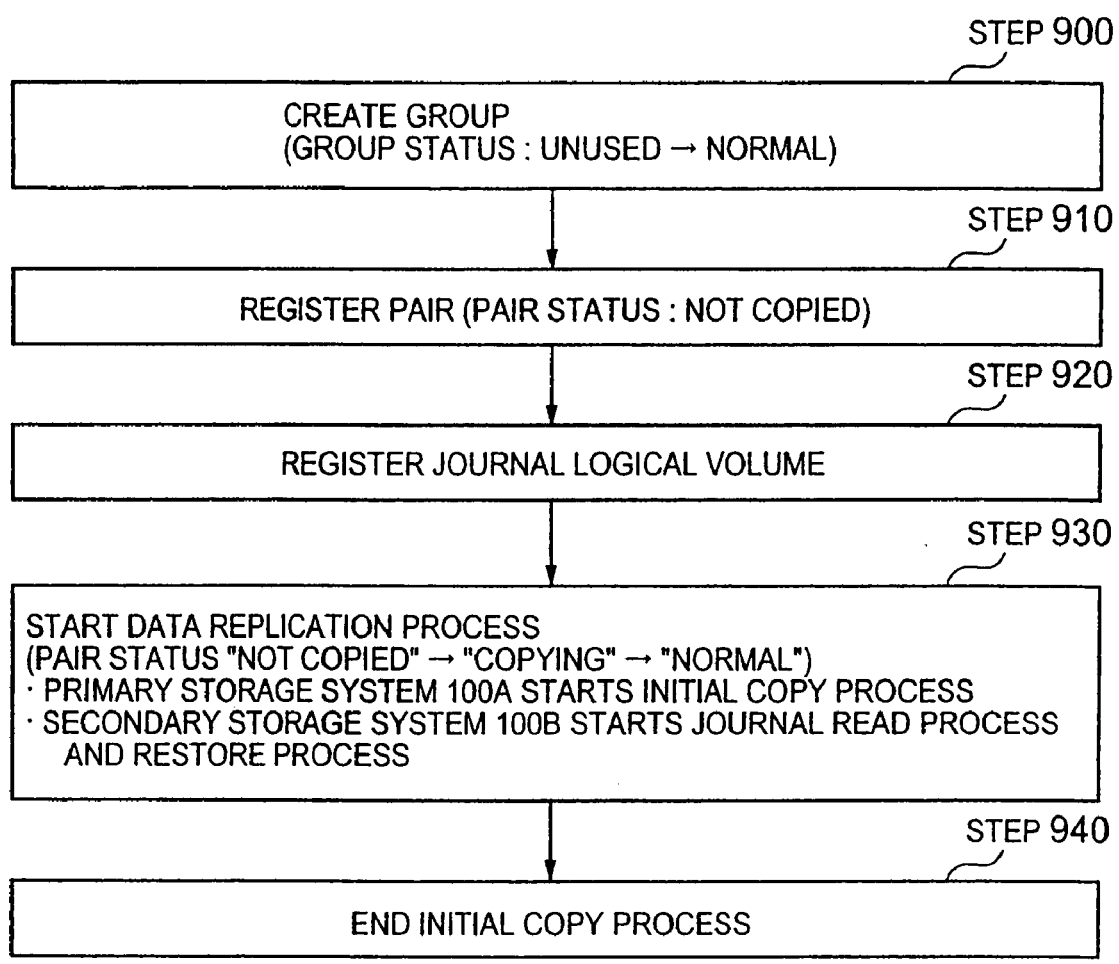
FIG. 9 is a flowchart showing a procedure for starting replication of data according to one mode of implementing the present invention.

Next, one example of a procedure for starting data replication from a primary storage system 100A to a secondary storage system 100B is described with reference to FIG. 9.

(1) A Group Creation Step (Step 900) is Now Described.

The user refers to the group information 600 of the primary storage system 100A, by means of a maintenance terminal or the host computer 180, and acquires a group number A that has a group status of "unused". The user designates the group number A and issues a group creation instruction to the primary storage system 100A, by means of the SVP 281 or the host computer 180. Upon receiving the group creation instruction, the primary storage system 100A changes the group status of the designated group number A (the group status in the group information 600 held by primary storage system 100A) to "normal".

Similarly, the user refers to the group information 600 of the secondary storage system 100B and acquires a group number B having a group status of "unused". The user designates the secondary storage system number and the group number B, and issues a group creation instruction to the primary storage system 100A, by means of the SVP 281 or the host computer 180. The primary storage system 100A receives this secondary storage system number, the group number B and the group creation instruction, and it transfers the group number B and the group creation instruction thus received to the secondary storage system 100B specified by the secondary storage system number thus received. The secondary storage system 100B receives the group creation instruction and in response to this instruction, changes the group status of the received group number B (the group status in the group information 600 held by the secondary storage system 100B) to "normal". In a modification example, the user may also designate a group number B and issue a group creation instruction to the secondary storage system 100B, by means of the SVP 281 of the secondary storage system 100B, or by means of a host computer 180 connected to the secondary storage system 100B.

(2) A Pair Registration Step (Step 910) is Now Described.

The user issues a pair registration instruction, specifying information indicating a data replication object and information indicating a data replication destination, to the primary storage system 100A, by means of the SVP 281 or the host computer 180. The "information indicating the data replication object" is, for example, information containing the group number A of the group of the data replication object (in other words, the data replication source), and the primary logical volume number of the corresponding primary logical volume. The "information indicating the data replication destination" is, for example, information containing the secondary storage system number of the secondary storage system 100B holding the replica data, the secondary logical volume number of the secondary logical volume holding the replica data, and group number B of the group to which this secondary logical volume belongs.

Upon receiving this pair registration instruction, the primary storage system 100A acquires a pair number having a pair status of "unused", from the path information 500, and carries out the following processing with respect to the various information elements corresponding to the pair number thus acquired (the various information elements constituting the path information 500 in the primary storage system 100A). In other words, the primary storage system 100A changes the information element "pair status" from "unused to "not copied", sets the primary storage system number indicating the primary storage system 100A in the information element "primary storage system number", sets the designated primary logical volume number in the information element "primary logical volume number", sets the designated secondary storage system number in the information element "secondary storage system number", sets the designated secondary logical volume number in the information element "secondary logical volume number", and sets the designated group number A in the information element "group number". Furthermore, the primary storage system 100A refers to the group information 600 provided inside that primary storage system 100A, adds the pair number acquired above to the pair set corresponding to the designated group number A, and changes the volume status corresponding to the designated primary logical volume number (the volume status in the volume information 400 provided in the primary storage system 100A) to "primary".

The primary storage system 100A transmits the primary storage system number indicating the primary storage system 100A, and the group number B, primary logical volume number and secondary logical volume number designated by the user, to the secondary storage system 100B corresponding to the secondary storage system number specified by the user. The secondary storage system 100B acquires an unused pair number from the path information 500, and carries out the following processing with respect to the various information elements corresponding to the pair number thus acquired (the various information elements constituting the path information 500 in the secondary storage system 100B). In other words, the secondary storage system 100B sets the information element "pair status" to "not copied", sets the primary storage system number indicating the primary storage system 100A in the information element "primary storage system number", sets the designated primary logical volume number in the information element "primary logical volume number", sets the secondary storage system number indicating the secondary storage system B in the information element "secondary storage system number", sets the designated secondary logical volume number in the information element "secondary logical volume number", and sets the designated group number B in the information element "group number". Furthermore, the secondary storage system 100B refers to the group information 600 provided inside that secondary storage system 100B, adds the pair number acquired above to the pair set corresponding to the designated group number B, and changes the volume status corresponding to the designated secondary logical volume number (the volume status in the volume information 400 provided in the secondary storage system 100B) to "secondary".

The processing in step 910 described above is carried out for the pairs of all of the data replication objects.

In the foregoing description, the registration of a logical volume in a group and the setting of pairs of logical volumes are carried out simultaneously, but these processes may also be carried out respectively at different times.

(3) A Journal Logical Volume Registration Step (Step 920) is Now Described.

The user issues an instruction for registering a logical volume used for storing a journal (a journal logical volume) in a group (a journal logical volume registration instruction), to the primary storage system 100A, by means of the SVP 281 or the host computer 180. The journal logical volume registration instruction comprises a group number and a logical volume number, for example.

The primary storage system 100A registers the designated logical volume number as the journal logical volume number of the group information 600 of the designated group number. The volume status of the volume information 400 of this logical volume is set to "normal".

Similarly, the user refers to the volume information 400 of the secondary storage system 100B, by means of the SVP 281 or host computer 180, and issues a journal logical volume registration instruction to the primary storage system 100A, specifying a secondary storage system number, a group number B and a logical volume number to be used as the journal logical volume, to the primary storage system 100A. The primary storage system 100A transfers the journal logical volume registration instruction, the group number B and the logical volume number thus received, to the secondary storage system 100B identified by the designated secondary storage system number. The secondary storage system 100B refers to the group information 600 provided in that secondary storage system 100B, and registers the received logical volume number as the information element "journal logical volume number" corresponding to the received group number B. Furthermore, the secondary storage system 100B refers to the volume information 400 provided in that secondary storage system 100B, and sets the information element "volume status" corresponding to the received logical volume number, to "normal".

The user may also designate the group number and the logical volume number to be used as the journal logical volume, and issue a journal logical volume registration instruction to the secondary storage system 100B, by means of a SVP 281 of the secondary storage system 100B or by means of a host computer 180 connected to the secondary storage system 100B.

The processing in step 920 above is carried out with respect to all of the logical volumes used as journal logical volumes. The sequence of step 910 and step 920 does not have to a random sequence.

(4) A Replication Process Start Step (Step 930) is Now Described.

The user designates a group number for starting a data replication process, and issues a data replication process start instruction, to the primary storage system 100A, by means of the SVP 281 or the host computer 180. The primary storage system 100A refers to the pair information 400 provided in that primary storage system 100A, and sets all of the copied addresses for the designated group number to "0".

The primary storage system 100A instructs the secondary storage system 100B specified by the secondary storage system number corresponding to the designated group number, to start a journal read process and a restore process, which are described hereinafter.

The primary storage system 100A starts an initial copy process described hereinafter.

(5) An Initial Copy Completion Step (Step 940) is Now Described.

When initial copying has finished, the primary storage system 100A reports the end of the initial copy process, to the secondary storage system 100B specified in step 930. The secondary storage system 100B refers to the path information 500 held in that secondary storage system 100B, and changes all of the pair statuses corresponding to the designated group number (the pair statuses of the secondary logical volumes) to "normal".

Figure 10:
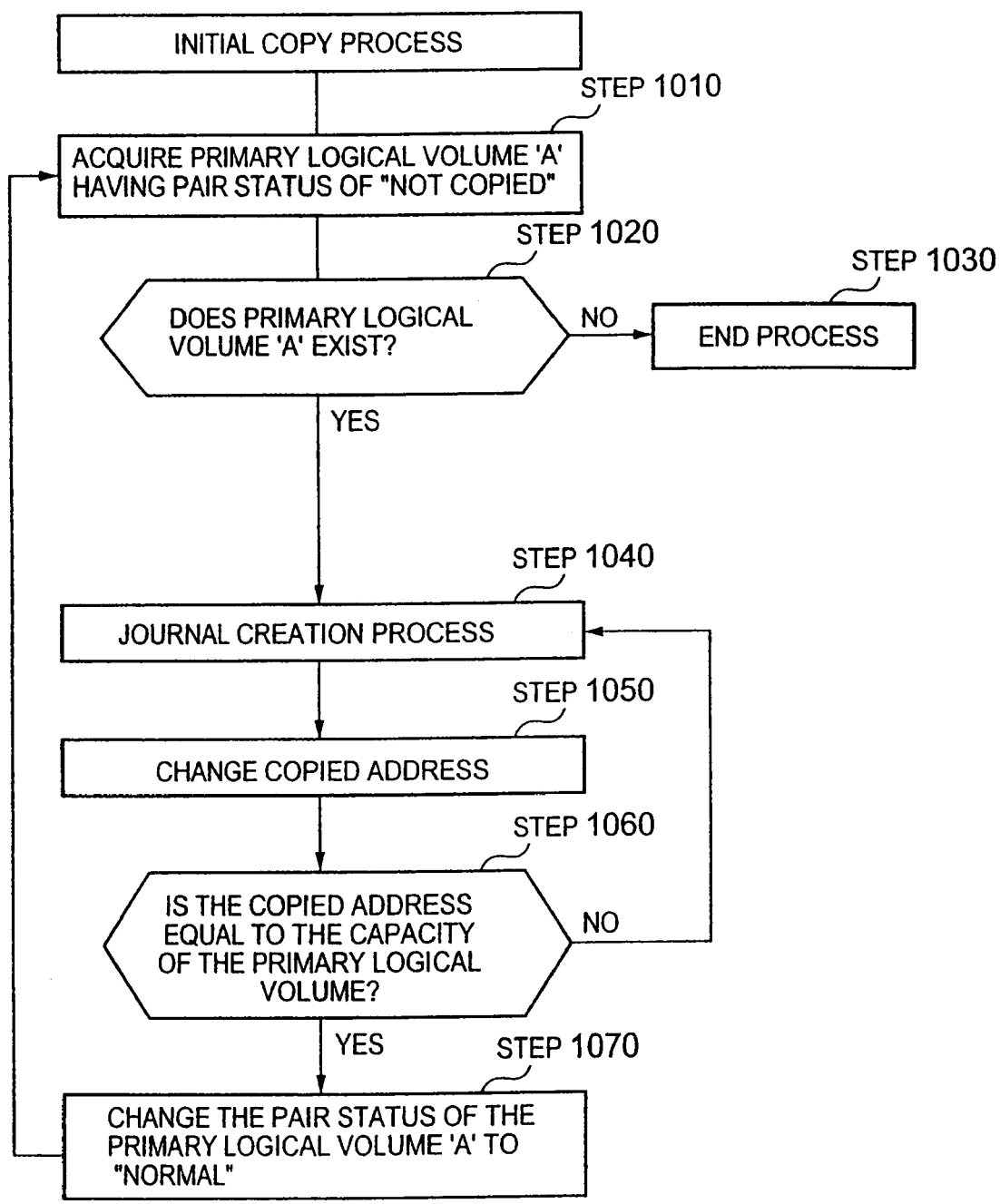
FIG. 10 is a flowchart for describing an initial copy process in one mode of implementing the present invention.

FIG. 10 is a flowchart of an initial copy process.

In the initial copy process, journals are created in unit sizes for the whole storage region of the primary logical volume forming the data replication object, in sequence from the head position of the storage region, using the copied addresses in the path information 500. The copied address has an initial value of 0, and each time a journal is created, the data volume thus created is added to this value. In the initial copy process, journals are created from the head position of the storage region of the logical volume, until the address immediately before the copied address. By carrying out an initial copy process, it is possible to transfer data that has not been updated in the primary logical volume, to the secondary logical volume. In the following description, the host CHA 110A in the primary storage system 100A is described as implementing this processing, but it may also be implemented by the DKA 120 instead.

(1) The host CHA 110A in the primary storage system 100A finds a primary logical volume having a pair status of "not copied" in a pair belonging to the group being processed (hereinafter, called "primary logical volume A"), on the basis of the group information 600 and the path information 500 in the primary storage system 100A, and it updates the pair status relating to the primary logical volume A thus found, to "copying", and then repeats the subsequent processes (steps 1010 and 1020). If primary logical volume A does not exist, then the host CHA 110A ends processing (step 1030).

(2) At step 1020, if the logical volume A does exist, then the host CHA 110A creates a journal for a unit size of data (for example, 1 MB of data). The journal creation process is described below (step 1040).

(3) The host CHA 110A adds the data size of the created journal to the copied address (step 1050).

(4) The aforementioned processing is repeated until the copied address reaches the capacity of the primary logical volume A (step 1060). If the copied address is not equal to the capacity of the primary logical volume A, then this means that a journal has been created for the whole storage region of the primary logical volume A, and hence the pair status is updated to "normal" and processing of another primary logical volume is started (step 1070).

In the aforementioned flowchart, the primary logical volumes are described as being handled independently, but it is also possible for journals to be processed simultaneously for a plurality of data stored respectively in a plurality of primary logical volumes.

Figure 11:
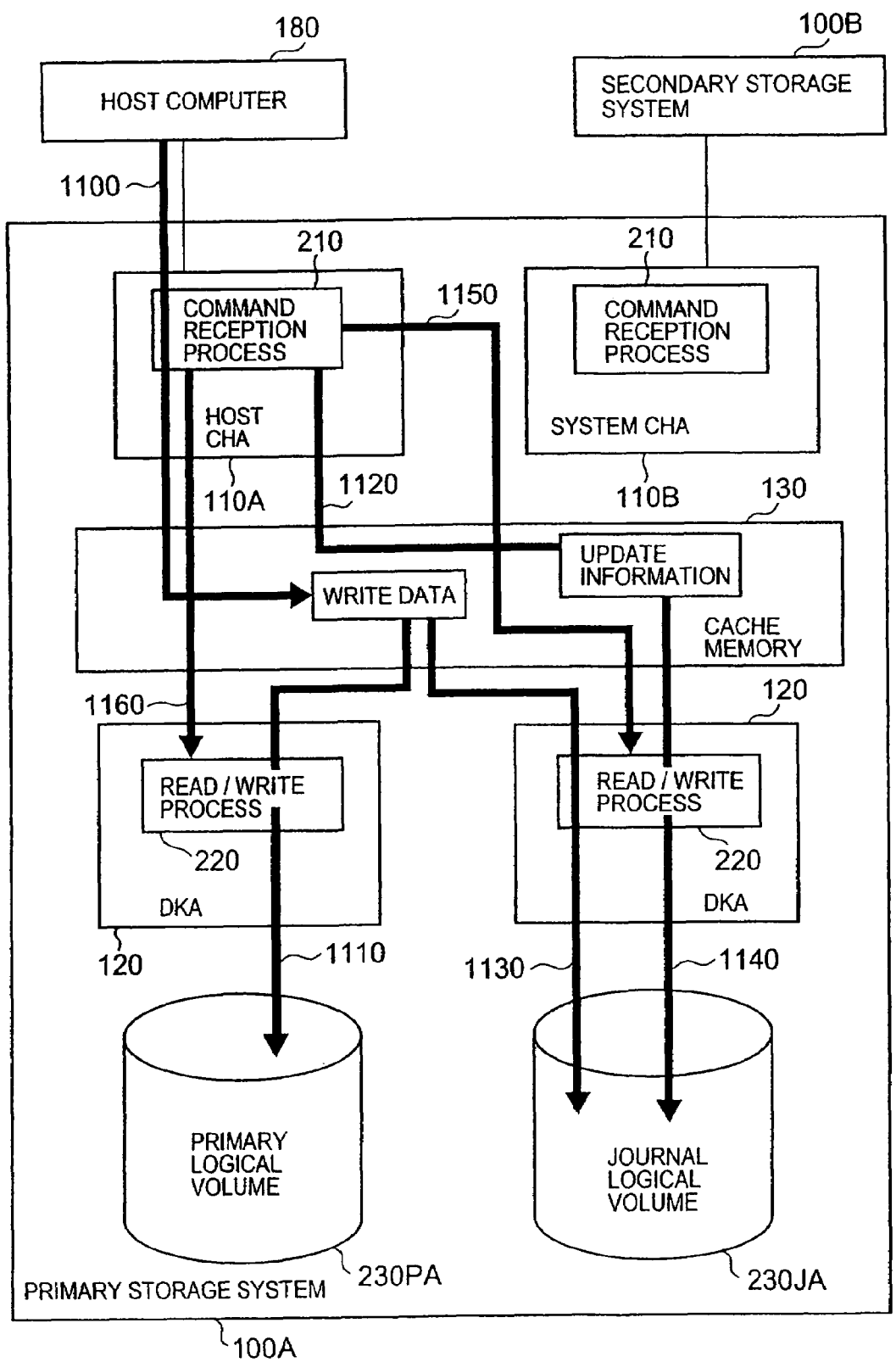
FIG. 11 is a diagram for describing a command reception process in one mode of implementing the present invention.
Figure 12:
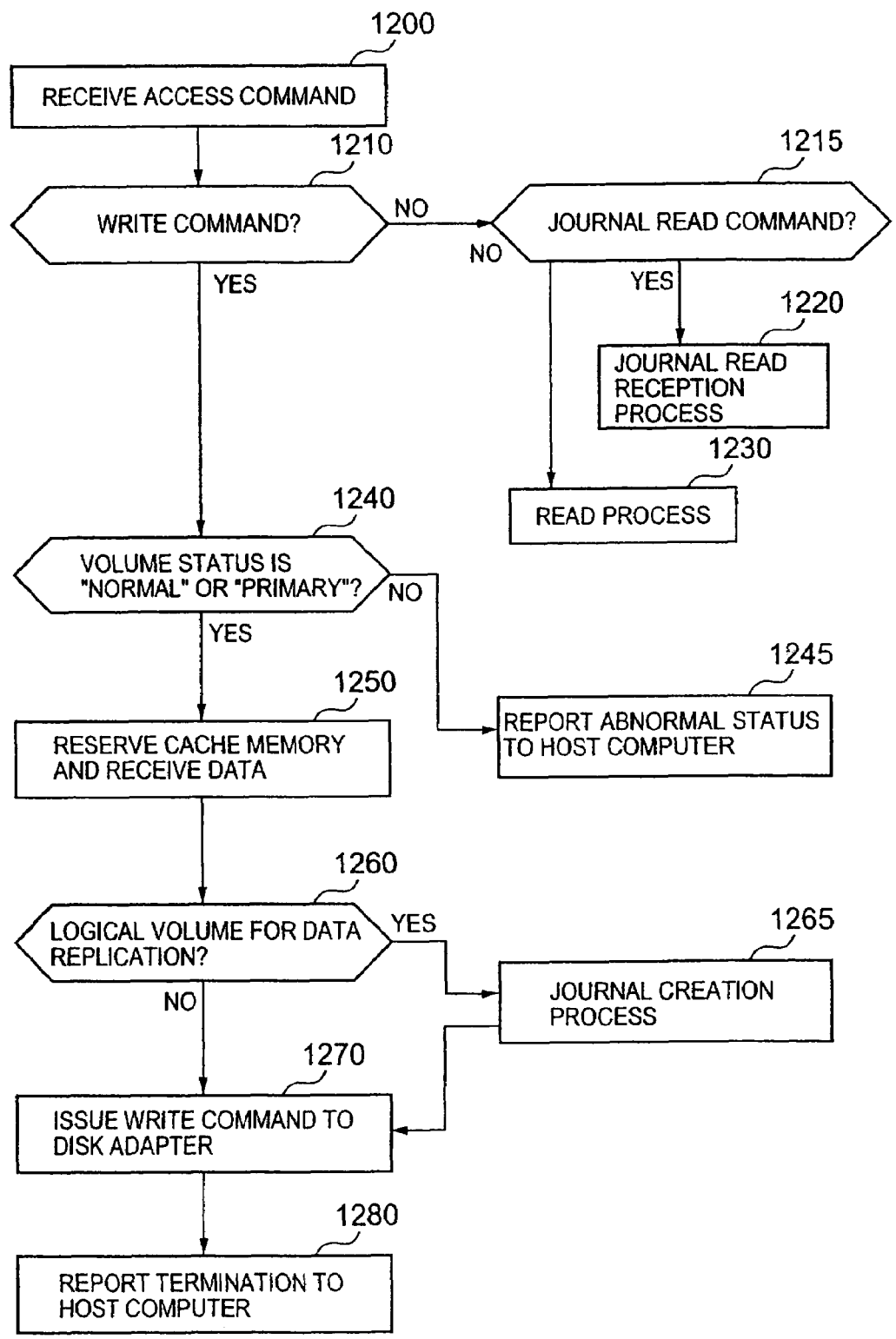
FIG. 12 is a flowchart of a command reception process in one mode of implementing the present invention.
Figure 13:
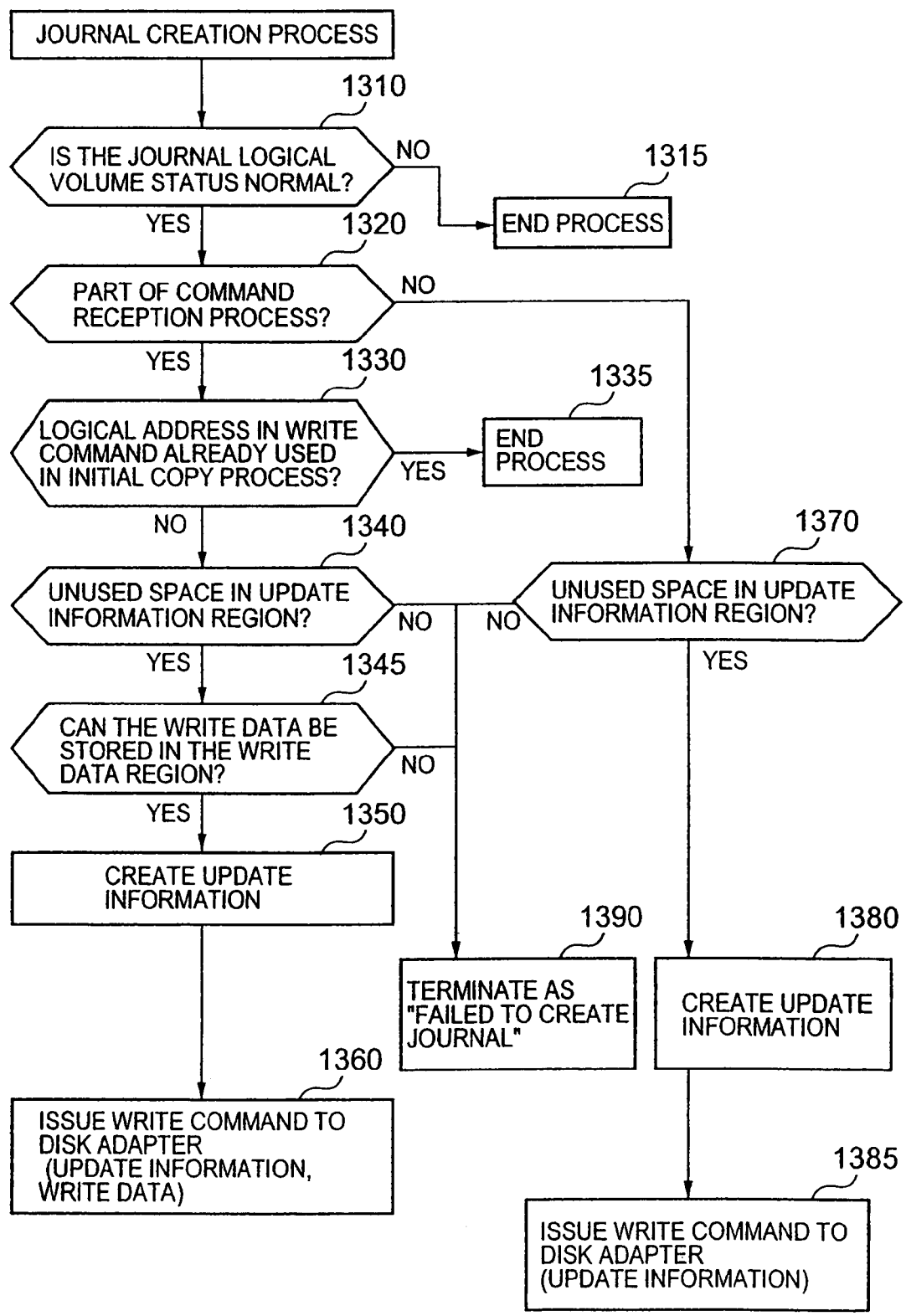
FIG. 13 is a flowchart of a journal creation process in one mode of implementing the present invention.

FIG. 11 illustrates the sequence of a command reception process 210, and FIG. 12 is a flowchart of a command reception process 210. FIG. 13 is a flowchart of a journal creation process. Below, an operation where the primary storage system 100A receives a write command from the host computer 180 to the primary logical volume 230 forming a data replication object will be described with reference to FIGS. 11 to 13. Moreover, in the following description, it is assumed that there is one primary logical volume and one journal logical volume belonging to a particular group of the primary storage system 100A, the primary logical volume being called "primary logical volume 230PA" and the journal logical volume being called "journal logical volume JA".

(1) The host CHA 110A in the primary storage system 100A receives an access command from the host computer 180 (step 1200). The access command contains a command, such as a read, write or journal read command (described hereinafter), a logical address relating to the command, a data volume, and the like. Below, the logical address in the access command is called logical address A, the logical volume number is called logical volume number A, the position in the logical volume is called logical volume position A, and the data volume is called data volume A. Moreover, the logical volume designated by the logical volume number A is called logical volume A.

(2) The host CHA 110A examines the access command (steps 1210 and 1215). If the access command is found to be a journal read command in the investigation in step 1215, the journal read reception processing described below is carried out (step 1220). If the access command is a command other than a journal read command or a write command, for example, a read command, then read processing is carried out in accordance with that read command (step 1230).

(3) If the access command is found to be a write command in the investigation in step 1210, then the host CHA 110A refers to the volume information 400 and examines the volume status of the logical volume A (step 1240). In the investigation in step 1240, if the volume status of the logical volume A is any status other than "normal" or "primary", then this means that access to the logical volume A is not possible, and hence the host CHA 110A reports an abnormal termination to the host computer 180 (step 1245).

(4) If the volume status of the logical volume A is found to be "normal" or "primary" in the investigation in step 1240, then the host CHA 110A reserves the cache memory 130 (or a storage region of a prescribed size in that memory 130), and reports that preparations for data reception has been completed to the host computer 180. The host computer 180 receives this report and transmits write data to the primary storage system 100A. The host CHA 110A receives the write data and stores it in the cache memory 130 (step 1250, and 1100 in FIG. 11).

(5) The host CHA 110A refers to the volume status in the logical volume A, and investigates whether or not the logical volume A is a data replication object (in other words, whether it is a primary logical volume) (step 1260). If the volume status is found to be "primary" in the investigation in step 1260, then this means that the logical volume A is a data replication object, and hence the host CHA 110A performs journal creation processing, as described hereinafter (step 1265).

(6) If the volume status is found to be "normal" in the investigation in step 1260, or if the journal creation process in step 1265 has completed, then the host CHA 110A issues a command to the DKA 120 in order to issue the write data to the storage device 150 providing the logical volume A (1140 in FIG. 11), and it reports completion to the host computer 180 (steps 1270 and 1280). Thereupon, the DKA 120 receiving the write command for the write data stores the write data in the storage device 150 providing the logical volume A, by means of a read/write process 220 (1110 in FIG. 11).

Next, journal creation processing will be described.

(1) The host CHA 110A investigates the volume status of the journal logical volume 230 JA belonging to the group number corresponding to the logical volume number A, on the basis of the volume information 400, path information 500 and group information 600 (step 1310). If the volume status of the journal logical volume is found to be "abnormal" in the investigation in step 1310, then this means that the journal cannot be stored in that journal logical volume, and therefore the host CHA 110A changes the group status to "abnormal" and terminates processing (step 1315). In this case, the host CHA 110A may carry out processing for changing the journal logical volume to a normal logical volume, for example.

(2) If the journal logical volume is found to be normal in the investigation in step 1310, then the host CHA 110A continues the journal creation process. The contents of the journal creation process vary depending on whether it is implemented as part of an initial copy process, or as part of a command reception process (step 1320). If the journal creation process is part of a command reception process, then the host CHA 110A implements the processing from step 1330 onwards. If the journal creation process is part of an initial copy process, then the host CHA 110A implements the processing from step 1370 onwards.

(3) If the journal creation process is part of a command reception process, then the host CHA 110A investigates whether or not the logical address A that is to be written to has been processed in the initial copy process (step 1330). If the pair status of the logical volume A is "not copied", then this means that the journal creation process is to be carried out later in an initial copy process, and therefore the host CHA 110A terminates the process without creating a journal (step 1335). If the pair status of the logical volume A is "copying", or if the copied address is equal to or lower than the logical address position A, then this means that the journal creation process is to be carried out later in an initial copy process, and therefore the host CHA 110A terminates the process without creating a journal (step 1335). In cases other than the foregoing, in other words, if the pair status of the logical volume A is "copying" and the copied address is higher than the logical address position A, or if the pair status of the logical volume A is "normal", then this means that the initial copy process has already been completed, and therefore the host CHA 110A continues the journal creation process.

(4) Next, the host CHA 110A investigates whether or not a journal can be stored in the journal logical volume. More specifically, using the pointer information 700, the host CHA 110A examines whether or not there exists unused space in the update information region (step 1340). If the newest update information address and the oldest update information address in the pointer information 700 are equal, then this means that there is no unused space in the update information region, and therefore the host CHA 110A terminates the process as "failed to create journal" (step 1390).

If, in the investigation in step 1340, there is unused space in the update information region, then the host CHA 110A examines whether or not it is possible to store write data in the write data region, on the basis of the pointer information 700 (step 1345). If the sum of the newest write data address and the data volume A is equal to or greater than the oldest write data address, then this means that the write data cannot be stored in the write data region, and therefore the host CHA 110A terminates the process as "failed to create journal" (step 1390).

(5) If a journal can be stored, then the host CHA 110A acquires the update number corresponding to the group in question (the group to which the journal logical volume JA1 belongs) (the update number contained in the group information 600), the logical address for storing the update information and the logical address for storing the write data, and it creates update information in the cache memory 130. Furthermore, the host CHA 110A sets a numerical value equal to the acquired update number plus 1, in the group information 600, as the new update number. The logical address for storing the update information is the newest update information address in the pointer information 700, and the host CHA 110A sets the value of this address plus the size of the update information, as a fresh newest update information address in the pointer information 700. The logical address for storing the write data is the newest write data address in the pointer information 700, and the host CHA 110A sets the value of the newest write data address plus the data volume A, as a fresh newest write data address in the pointer information 700.

The host CHA 110A sets the values and the group number acquired above, the timing at which the write command was received, the logical address A in the write command, and the data volume A, in the update information (step 1350, 1120 in FIG. 11). For example, in the case of the group information 600 shown in FIG. 6 and the pointer information 700 shown in FIG. 7, if a write command of data size 100 is received at the position of the address 800 of the primary logical volume #1 belonging to group 1, then update information such as that illustrated in FIG. 22 is created. The update number in the group information is 5, the newest update information address in the pointer information is 600 (taking the size of the update information to be 100), and the newest write data address is 2300.

(6) The host CHA 110A commands the DKA 120 to write the update information and the write data in the journal to the storage device 150, and then terminates normally (step 1360; 1130, 1140, 1150 in FIG. 11).

(7) If the journal creation process is part of an initial copy process, then the host CHA 110A implements the processing from step 1370 onwards. The host CHA 110A investigates whether or not a journal can be created. More specifically, using the pointer information 700, the host CHA 110A examines whether or not there exists unused space in the update information region (step 1370). If the newest update information address and the oldest update information address in the pointer information 700 are equal, then this means that there is no unused space in the update information region, and therefore the host CHA 110A terminates the process as "failed to create journal" (step 1390). In the initial copy process described in the present mode of implementation, the write data in the journal is read from the primary logical volume, and since the write data region is not used, then it is not necessary to check for unused space in the write data region.

(8) If it is found from the investigation in step 1370 that a journal can be created, then the host CHA 110A acquires the numerical value established in the update information and creates update information in the cache memory 130. The update number is acquired from the group information 600 for the group in question, and the host CHA 110A establishes a value equal to this update number plus one, as a new update number in the group information 600. The logical address for storing the update information is the position of the newest update information address in the pointer information 700, and the host CHA 110A sets the value of this address plus the size of the update information, as the fresh newest update information address in the pointer information 700.

The host CHA 110A sets the values and group number acquired above, the start time of the process, the logical address used in the initial copy process, the amount of data processed per operation in the initial copy process, the logical address of the journal logical volume storing the write data, and the logical address used in the initial copy process, in the update information (step 1380; 1120 in the FIG. 11).

(9) The host CHA 110A commands the DKA 120 to write the update information to the storage device 150 (in other words, it commands the DKA 120 to write the information starting from the aforementioned fresh newest update information address in the journal logical volume 230 JA), and terminates normally (step 1385; 1140 and 1160 in FIG. 11).

The foregoing was a description relating to FIG. 11 to FIG. 13. In the foregoing description, the update information is stored temporarily in the cache memory 130, but it may also be stored temporarily in the shared memory 140, or the like.

Furthermore, the writing of the write data to the storage device 150 does not have be asynchronous, in other words, it does not have to be performed immediately after step 1360 and step 1385. If the host computer 180 has implemented another write command to the logical address A, then the write data in the journal is overwritten, and therefore, before the write data is received from the host computer 180, the write data in the journal must be written to the storage device 150 corresponding to logical address of the journal logical volume storing the update information. Alternatively, it may be withdrawn to a separate cache memory, and written later to the storage device 150 corresponding to the logical address of the journal logical volume storing the update information.

Moreover, in the journal creation process described above, journals are saved in the storage device 150 (in other words, the journal logical volume 230 JA), but it is also possible to prepare cache memories 130 of a prescribed size for storing the journals, in advance, and then to save the journals to a storage device 150 when all of the cache memories have been used. The volume of the cache memory for the journals may also be specified via a SVP 281, for example.

Furthermore, the read/write process 220 is a process implemented by the DKA 120 in response to a command received by the DKA 120 from a CHA 110 or another DKA 120. More specifically, for example, the read/write process 220 is a process whereby the data in a designated cache memory 130 is written to the storage region of the storage device 150 corresponding to a designated logical address, or a process whereby data is read out to a designated cache memory 130, from the storage region in the storage device 150 corresponding to a designated logical address. The read/write process 220 may, for example, be carried out by means of the CPU in the DKA 120 reading out a particular computer program.

Figure 14:
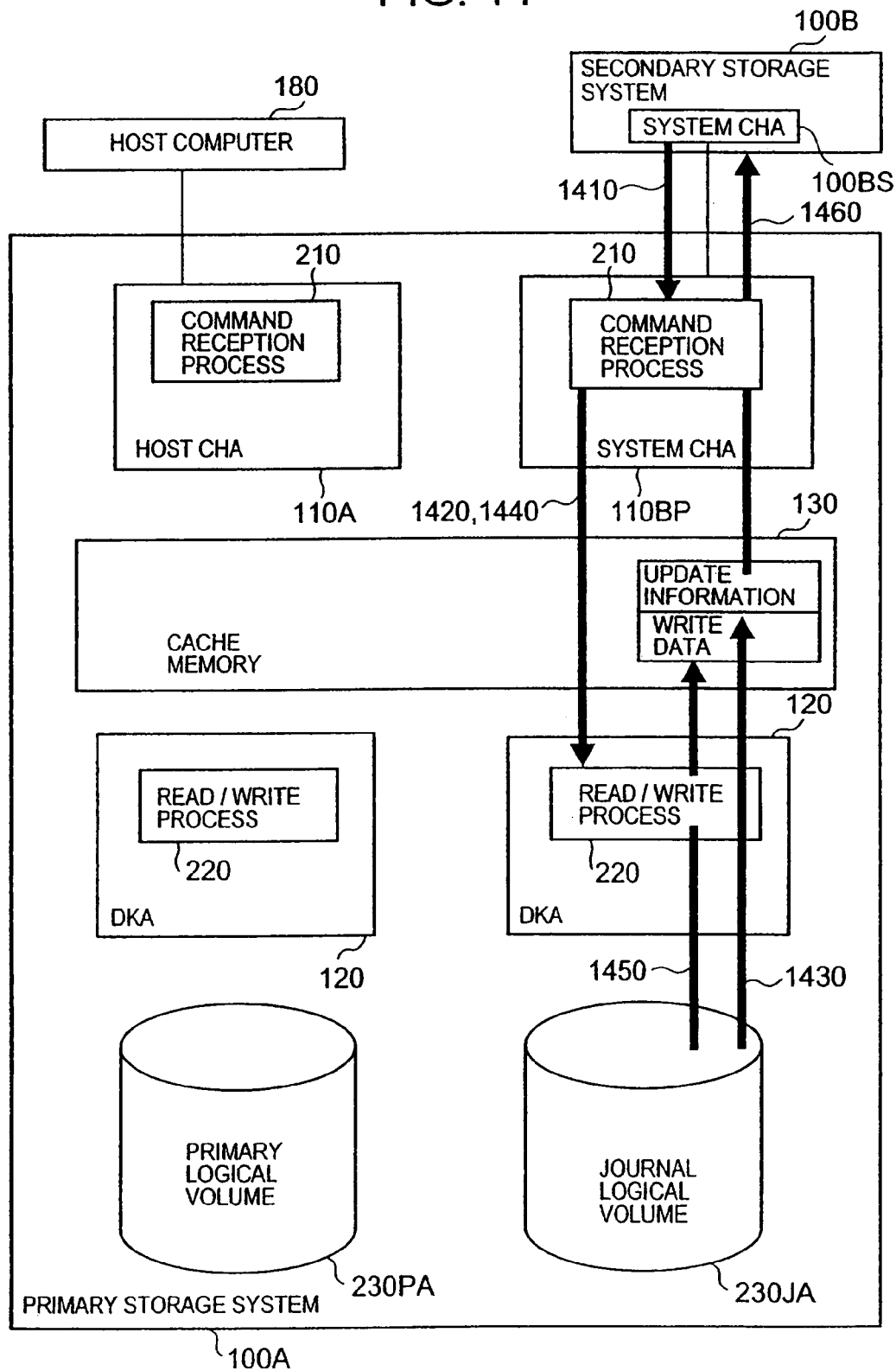
FIG. 14 is a diagram for describing a journal read reception process in one mode of implementing the present invention.
Figure 15:
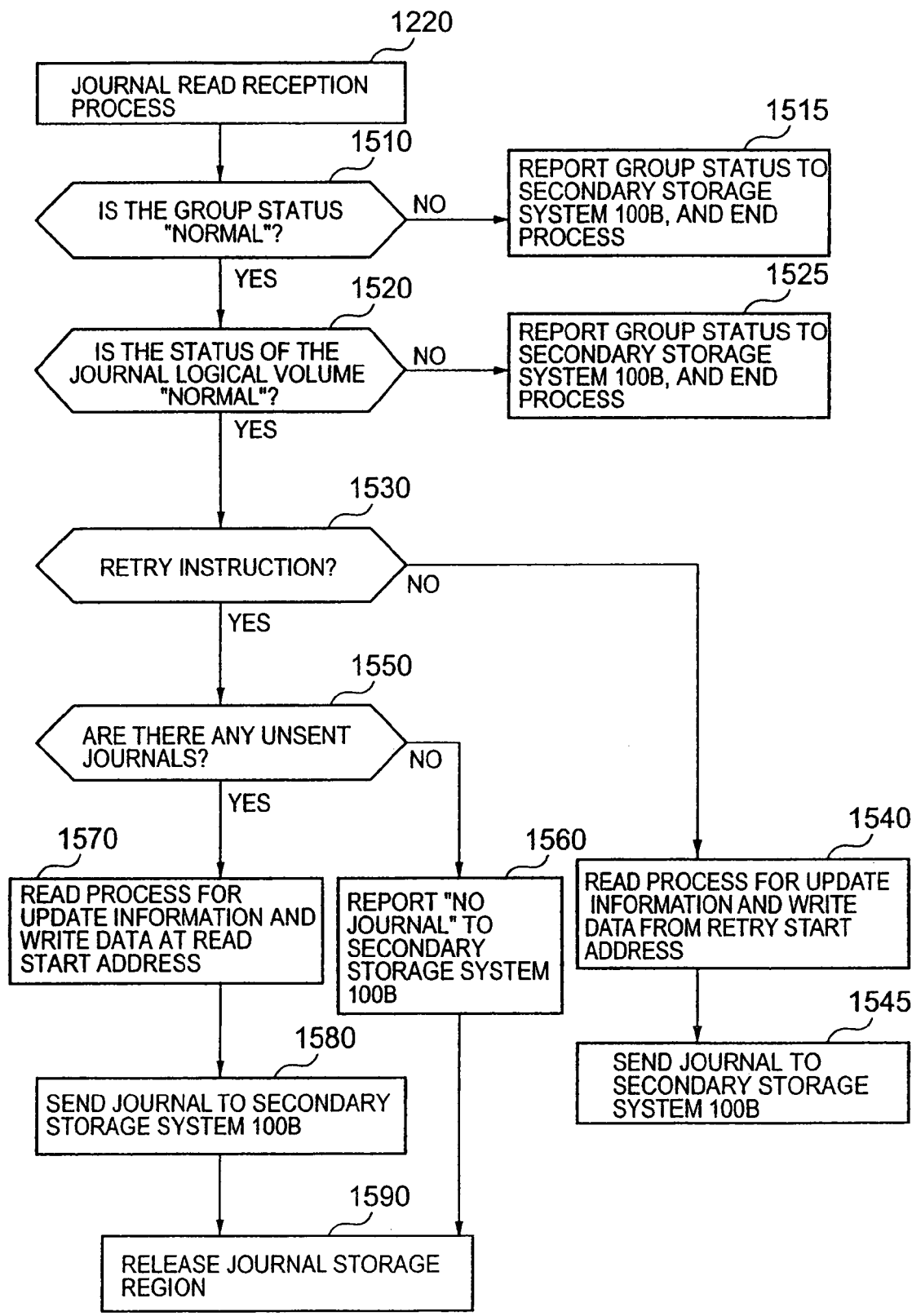
FIG. 15 is a flowchart of a journal read reception process in one mode of implementing the present invention.

FIG. 14 is a diagram for describing the operation of the host CHA 110A of the primary storage system 100A which has received a journal read command (namely, for describing a journal read reception process), and FIG. 15 is a flowchart of a journal read reception process. Below, an operation where the primary storage system 100A receives a journal read command from the secondary storage system 100B is described with reference to FIGS. 14 and 15. In the following description, the system CHA 110B in the primary storage system 100A is called the "system CHA 110BP" and the system CHA110B in the secondary storage system 100B is called the "system CHA 110BS".

(1) The system CHA 110BP receives an access command from the system CHA 110BS. The access command contains an identifier for indicating that it is a journal read command, a group number relating to the command, and an indicator indicating the presence or absence of a retry instruction. Below, the group number in the access command is taken to be group number A (step 1220; 1410 in FIG. 14).

(2) The system CHA 110BP refers to the group information 600 and investigates whether or not the group status for the group number A is "normal" (step 1510). If the group status is a status other than "normal", for instance, "problem", in step 1510, then the system CHA 110BP reports the group status to the system CHA 110BS and terminates processing. The system CHA 110BS carries out processing in accordance with the group status thus received. For example, if the group status is "problem", then the system CHA 110BS terminates the journal read process (step 1515).

(3) If the group status of group number A is "normal" in the investigation in step 1510, then the system CHA 110BP investigates the status of the journal logical volume (step 1520). If the volume status of the journal logical volume is not "normal" in the investigation at step 1520, for example, if the status is "problem", then the system CHA 110BP changes the group status to "problem", reports the changed group status to the system CHA 110BS, and terminates processing. The system CHA 110BS carries out processing in accordance with the group status thus received. For example, if the group status is "problem", then the system CHA 110BS terminates the journal read process (step 1525).

(4) If the volume status of the journal logical volume is found to be "normal" in the investigation in step 1520, then the system CHA 110BP examines whether or not the journal read command is a retry instruction (step 1530).

(5) If the journal read command is found to be a retry instruction in the investigation in step 1530, then the system CHA 110BP sends the previously transmitted journal to the secondary storage system 100B, again. The system CHA 110BP reserves the cache memory 130, and commands the DKA 120 to write information corresponding to the size of the update information, to the cache memory, starting from the retry start address indicated in the pointer information 700 (1420 in FIG. 14).

The read/write process 220 in the DKA 120 (for example, a computer program read into the CPU of the DKA 120) reads in the update information from the storage device 150 (in other words, the journal logical volume 230 JA), saves this information in the cache memory 130, and reports the end of the read process to the system CHA 110BP that originated the command (1430 in FIG. 14).

The system CHA 110BP receives the report indicating the end of the update information read process, acquires the logical address of the write data and the size of the write data, and then reserves a cache memory 130 and commands the DKA 120 to write the write data to the reserved cache memory 130, starting from the logical address acquired as described above (step 1540; 1440 in FIG. 14).

By means of the read/write process 220, the DKA 120 reads in the write data from the storage device 150 (more specifically, the designated logical address), saves the write data in the reserved cache memory 130, and reports the end of the read process to the system CHA 110BP that originated the command (1450 in FIG. 14).

The system CHA 110BP receives the report indicating the end of the write data read process, sends the update information and the write data to the secondary storage system 100B, releases the cache memory 130 holding the journal, and then terminates processing (step 1545; 1460 in FIG. 14).

(6) If the command is found not to be a retry instruction in the investigation in step 1530, then the system CHA 110BP examines whether or not there is a journal that has not been sent, and if there is, then it sends this journal to the secondary storage system 100B. The system CHA 110BP compares the read start address in the pointer information 700 with the newest update information address (step 1550).

If the read start address is equal to the newest update information address, then this means that all of the journals have been sent to the secondary storage system 100B, and therefore the system CHA 110BP sends a "no journals" message to the secondary storage system 100B (step 1560), and when the next journal read command is received, it releases the storage region of the journals that have been sent to the secondary storage system 100B (step 1590).

In the process for releasing the journal storage region, the system CHA 110BP sets the retry start address to the oldest update information address in the pointer information 700. If the oldest update information address has reached the head address of the write data region, then the system CHA 110BP sets the oldest update information address to zero. The system CHA 110BP changes the oldest write data address in the pointer information 700 to the existing value plus the size of the write data sent in accordance with the previous read journal command. If the oldest write data address has reached a logical address equal to or exceeding the capacity of the journal logical volume, then the system CHA 110BP corrects the address by subtracting the head address of the write data region.

(7) If, at step 1550, there is a journal that has not been sent, then the system CHA 110BP reserves a cache memory 130, and commands the DKA 120 to write the update information to the cache memory 130 thus reserved, from the read start address in the pointer information 700 (in other words, to read out information of the prescribed size, from the read start address) (1420 in FIG. 14).

By carrying out a read/write process 220 in response to this command, the DKA 120 reads in the update information from the storage device 150 (in other words, the journal logical volume 230 JA), saves this information in the cache memory 130, and reports the end of the read process to the system CHA 110BP that originated the command (1430 in FIG. 14).

The system CHA 110BP receives the report indicating the end of the update information read process, acquires the logical address of the write data and the size of the write data, from the update information read out, and then reserves a cache memory 130 and commands the DKA 120 to read in write data of the acquired data size, from the acquired logical address to the reserved cache memory 130 (step 1570; 1440 in FIG. 14).

By means of the read/write process 220, the DKA 120 reads in the write data from the storage device 150 (more specifically, the designated logical address of the journal logical volume 230JA) in accordance with this command, saves the write data in the reserved cache memory 130, and reports the end of the read process to the system CHA 110BP (1450 in FIG. 14).

The system CHA 110BP receives the report indicating the end of the write data read process, sends the update information and the write data to the secondary storage system 100B (step 1580), and releases the cache memory 130 holding the journal (1460 in FIG. 14). The system CHA 110BP then sets the read start address as the retry start address in the pointer information 700, and sets a value obtained by adding the read start address to the update information size of the transmitted journal, as the new read start address in the pointer information 700.

(8) When the previous journal read command has been processed, the system CHA 110BP releases the storage region of the journals that have been sent to the secondary storage system 100B (step 1590).

The foregoing was a description relating to FIG. 14 to FIG. 15. In the journal read reception process described above, the primary storage system 100A transmitted the journals to the secondary storage system 100B, one at a time, but it is also possible to send a plurality of journals to the secondary storage system 100B, simultaneously. The number of journals that can be sent by means of one journal read command may be specified by the secondary storage system 100B in the journal read command, or it may be specified to the primary storage system 100A or the secondary storage system 100B by the user at a prescribed time, for instance, when the group is registered. Moreover, it is also possible for the primary storage system 100A or the secondary storage system 100B to change the number of journals sent by a single journal read command in a dynamic fashion, depending on the transmission capacity, load, or the like, of the connection path 200 between the primary storage system 100A and the secondary storage system 100B. Furthermore, the journal transfer volume may be specified, rather than the number of journals, by taking account of the size of the write data in the journals. This transfer volume may also be changed dynamically.

Furthermore, in the journal read reception process described above, the journals are read in from the storage device 150 to the cache memory 130, but if they are situated in the cache memory 130, then the aforementioned processing does not have to be carried out.

Moreover, the process for releasing the storage region of the journal in the journal read reception process was described as being implemented when the next journal read command is processed, but it may also be implemented immediately after the journals have been sent to the secondary storage system 100B. Furthermore, the secondary storage system 100B may establish an update number at which the storage region may be released in the journal read command, the primary storage system 100A releasing the journal storage region in accordance with this instruction.

Figure 16:
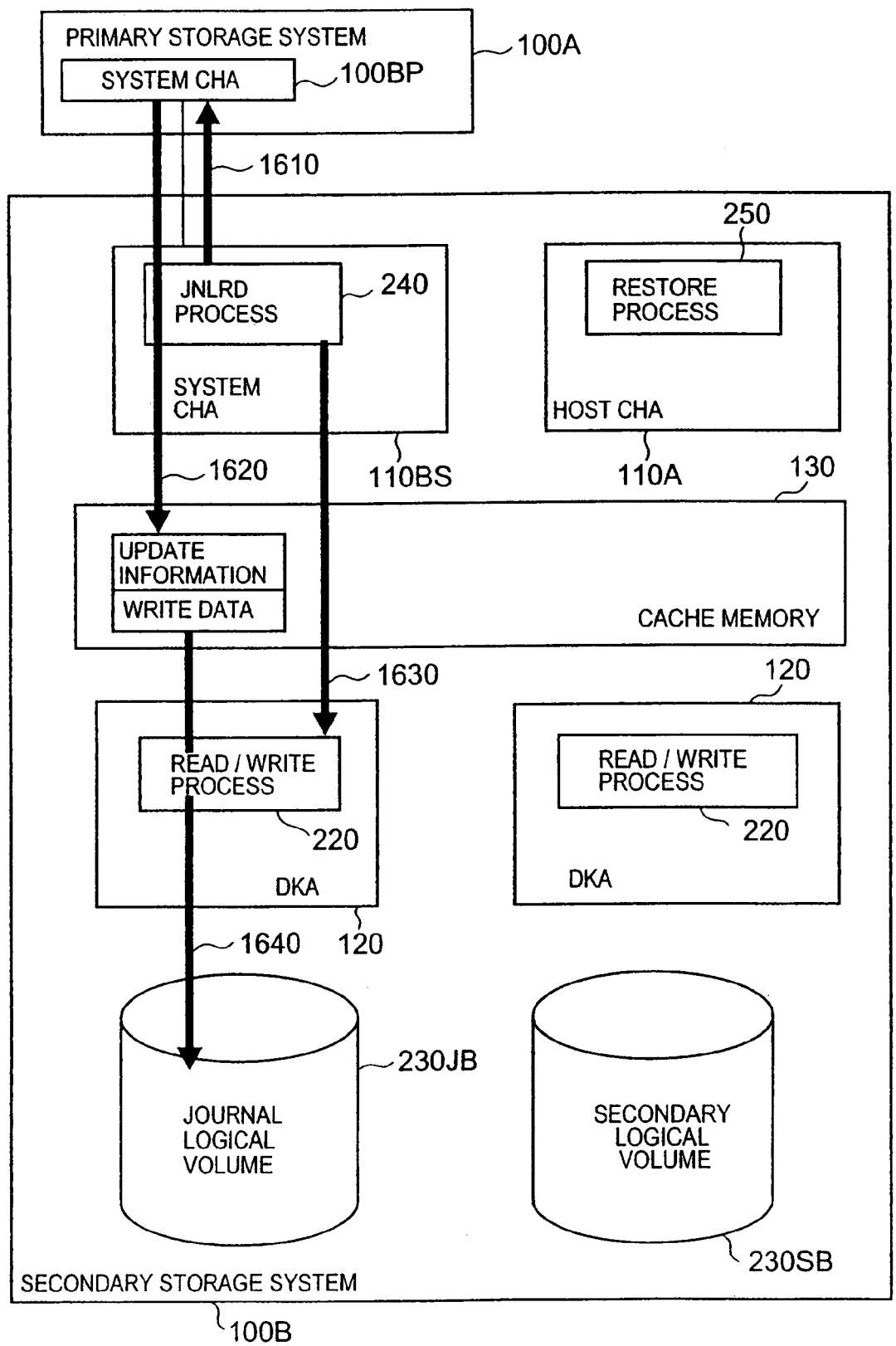
FIG. 16 is a diagram for describing a journal read command process in one mode of implementing the present invention.
Figure 17:
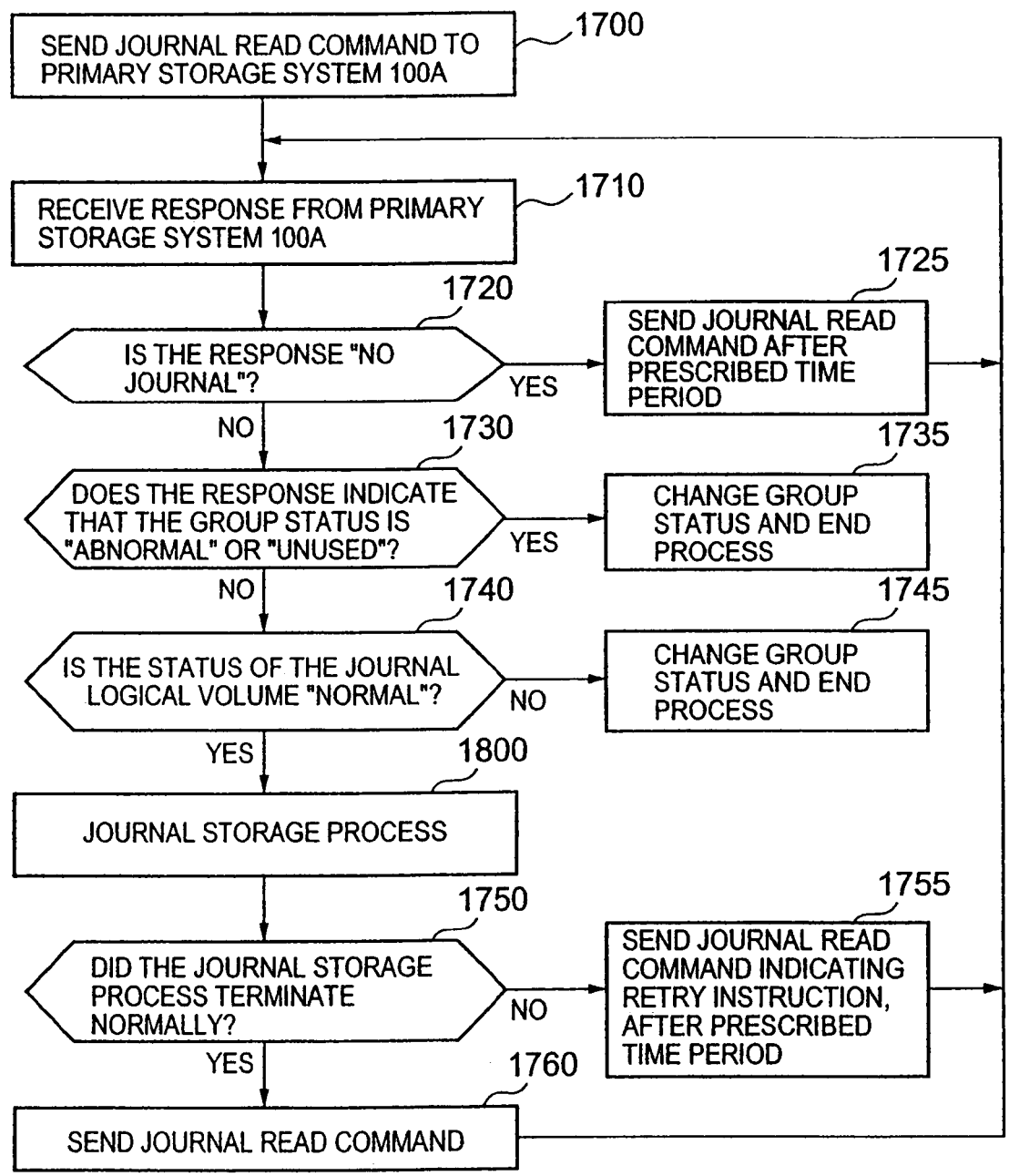
FIG. 17 is a flowchart of a journal read command process in one mode of implementing the present invention.
Figure 18:
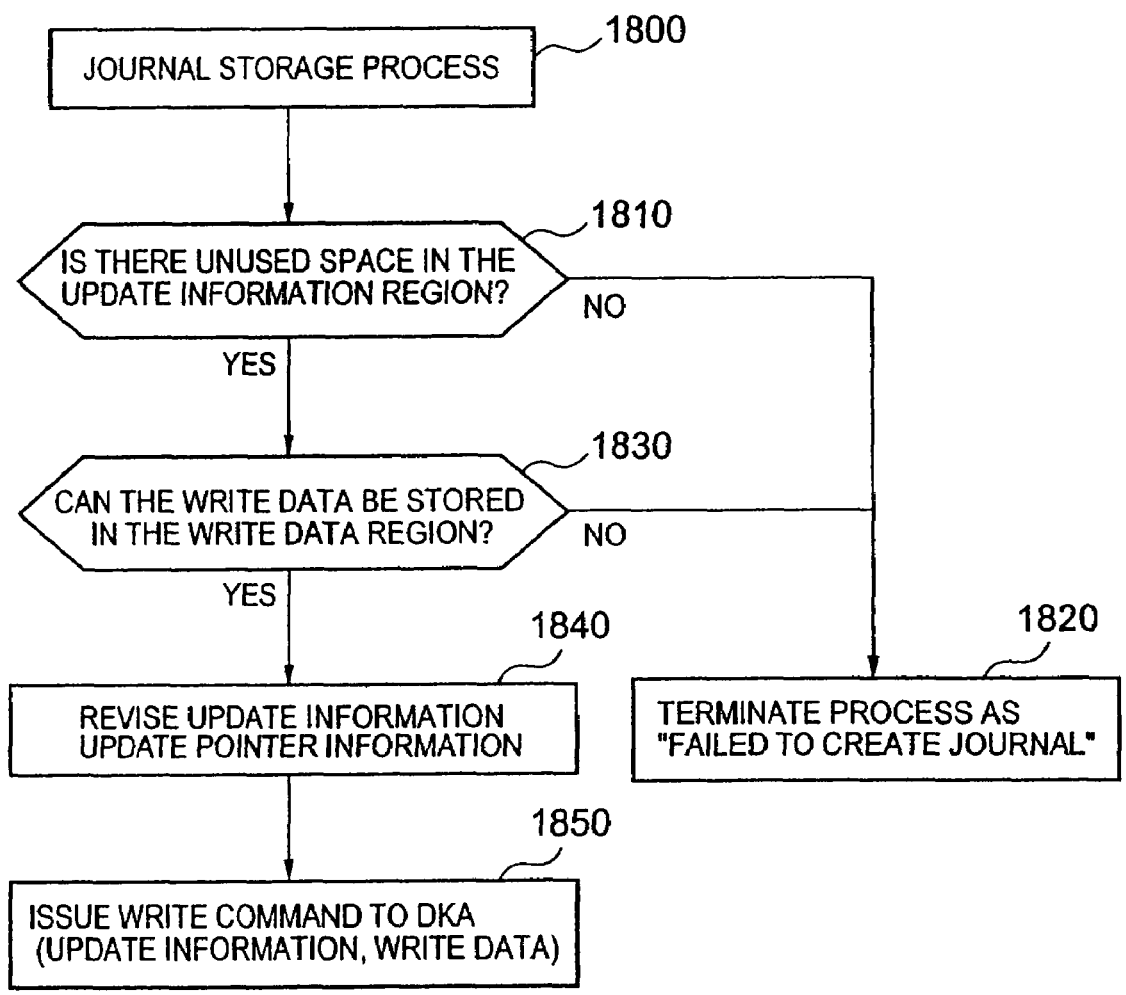
FIG. 18 is a flowchart of a journal storage process in one mode of implementing the present invention.

FIG. 16 illustrates the sequence of a journal read command process 240, and FIG. 17 is a flowchart of a journal read command process 240. FIG. 18 is a flowchart of a journal storage process. Below, an operation is described wherein the system CHA 110BS of the secondary storage system 100B reads out a journal from the primary storage system 100A, and stores that journal in a journal logical volume in the secondary storage system 100B (hereinafter, called the "journal logical volume 230 JB"). Furthermore, in FIG. 16, the journal read command process 240 is referred to as "JNLRD process 240").

(1) The system CHA 110BS reserves the cache memory 130 for storing the journal, generates an access command containing an identifier indicating that it is a journal read command, the group number in the primary storage system 100A relating to that command, and an indicator showing whether or not it is a retry instruction. The system CHA 110BS sends this access command to the primary storage system 100A. Below, the group number in the access command is taken to be group number A (step 1700; 1610 in FIG. 16). The group number A can be acquired, for example, by means of the system CHA 110BS referring to the group information 600, path information 500, or the like, held in the secondary storage system 100B, identifying the primary logical volume number corresponding to the secondary logical volume number contained in the group number to which the journal logical volume 230JB belongs, and then making an inquiry to the primary storage system 100A with regard to the group number to which the identified primary logical volume number belongs.

(2) The system CHA 110BS receives a response and a journal from the primary storage system 100A (1620 in FIG. 16). The system CHA 110BS examines the response thus received, and if the response is "no journals", then this means that there are no journals in the group of the primary storage system 100A corresponding to the designated group number A. Therefore, after a prescribed time period has elapsed, the system CHA 110BS sends a read journal command to the primary storage system 100A (steps 1720 and 1725).

(4) If the response of the primary storage system 100A is "group status indicates abnormal" or "group status indicates unused", then the system CHA 110BS changes the group status in the secondary storage system 100B (the group status of the group to which the journal logical volume 230JB belongs) to the status thus received, and it then terminates the journal read process (steps 1730 and 1735).

(5) If the response of the primary storage system 100A is any response other than the above, in other words, if it indicates normal termination, then the system CHA 110BS refers to the volume information 400 and investigates the volume status of the journal logical volume 230JB (step 1740). If the volume status of the journal logical volume 230JB is "abnormal", then this means that the journal cannot be stored in the journal logical volume 230JB, and therefore the system CHA 110BS changes the group status corresponding to the group to which the journal logical volume 230JB belongs, to "abnormal", and it then terminates the process (step 1745). In this case, the system CHA 110BS may carry out processing for changing the journal logical volume to a normal logical volume, for example, and it may return the group status to "normal".

(6) If the volume status of the journal logical volume is found to be "normal" in the investigation in step 1740, then the system CHA 110BS carries out journal storage processing 1800 as described below. If the journal storage process 1800 terminates normally, then the system CHA 110BS sends the next journal read command (step 1760). Instead of this, it is also possible for the system CHA 110BS to generate and send the next journal read command, when a certain time period has elapsed after normal termination of the journal storage process 1800. The system CHA 110BS may send subsequent journal commands in a periodic fashion, at prescribed time intervals, or alternatively, it may determine the timing for sending the next journal command on the basis of the number of journals received, the transmission volume in the connection path 200, and the storage capacity of the journal logical volume held in the secondary storage system 100B, or the load on the secondary storage system 100B, or the like, or on the basis of the journal storage capacity held by the primary storage system 100A (or the pointer information 700 of the primary storage system 100A), acquired from the primary storage system 100A. The aforementioned transfer of information may be implemented by means of a special command, or it may be included in a response to the journal read command. Subsequent processing is the same as that from step 1710 onwards.

(7) If the journal storage process at step 1800 does not terminate normally, then this means that there is insufficient free space in the journal logical volume, and therefore the system CHA 110BS discards the received journal, and sends a journal read command indicating a retry instruction, when a prescribed time period has elapsed (step 1755). Alternatively, the system CHA 110BS may retain the journal in a cache memory 230 and carry out journal storage processing again, when a prescribed time period has elapsed. This is because there is a possibility that the unused space in the journal logical volume will have increased when the prescribed time period has elapsed, due to a restore process 250 (described hereinafter) having been implemented. In the case of this method, an indicator showing whether or not the command is a retry instruction does not have to be included in the journal read command.

Next, the journal storage process 1800 illustrated in FIG. 18 will be described.

(1) The system CHA 110BS investigates whether or not a journal can be stored in the journal logical volume 230JB. More specifically, using the pointer information 700 held in the secondary storage system 100B, the system CHA 110BS investigates whether or not there is unused space in the update information region (step 1810). If the newest update information address and the oldest update information address in the pointer information 700 are equal, then this means that there is no unused space in the update information region, and therefore the system CHA 110BS terminates the process as "failed to create journal" (step 1820).

(2) If, in the investigation in step 1810, there is unused space in the update information region, then the system CHA 110BS examines whether or not it is possible to store write data in the write data region, on the basis of the pointer information 700 (step 1830). If the sum of the newest write data address and the data volume of the write data is equal to or greater than the oldest write data address, then this means that the write data cannot be stored in the write data region, and therefore the system CHA 110BS terminates the process as "failed to create journal" (step 1820).

(3) If the journal can be stored, then the system CHA 110BS changes the group number contained in the update information of the journal received by means of the journal read process 240, and the logical address for the write data in the journal logical volume (hereinafter, called the "journal write data address"). More specifically, the system CHA 110BS changes the group number in the update information to the group number of the secondary storage system 100B (the group number of the group to which the journal logical volume 230JB belongs), and it changes the journal write data address in the update information to the newest write data address in the pointer information 700 provided by the secondary storage system 100B. The system CHA 110BS changes the newest update information address in the pointer information 700 to the value of the existing newest update information address plus the size of the update information. The system CHA 110BS also changes the newest write data address in the pointer information 700 to the value of the existing newest write data address plus the size of the write data (step 1840).

(4) The system CHA 110BS reserves the cache memory 130, stores the update information and the write data in the reserved cache memory 130, commands the DKA 120 to write the update information and the write data to a storage device 150 (in other words, to the journal logical volume 230JB), and then terminates the process as "journal created successfully" (step 1850; 1630 in FIG. 16). Thereupon, by means of the read/write process 220, the DKA 120 writes the update information stored in the cache memory 130 and the write data to the storage device 150, and it then releases the cache memory 130 that was reserved 1640 in FIG. 16).

Moreover, in the journal storage process described above, journals are saved in the storage device 150, but it is also possible to prepare cache memories 130 of a prescribed size for storing the journals, in advance, and then to save the journals to a storage device 150, from all of the cache memories, when all of the cache memories have been used. The cache memory volume used for the journals may also be specified via a SVP 281, for example.

Figure 19:
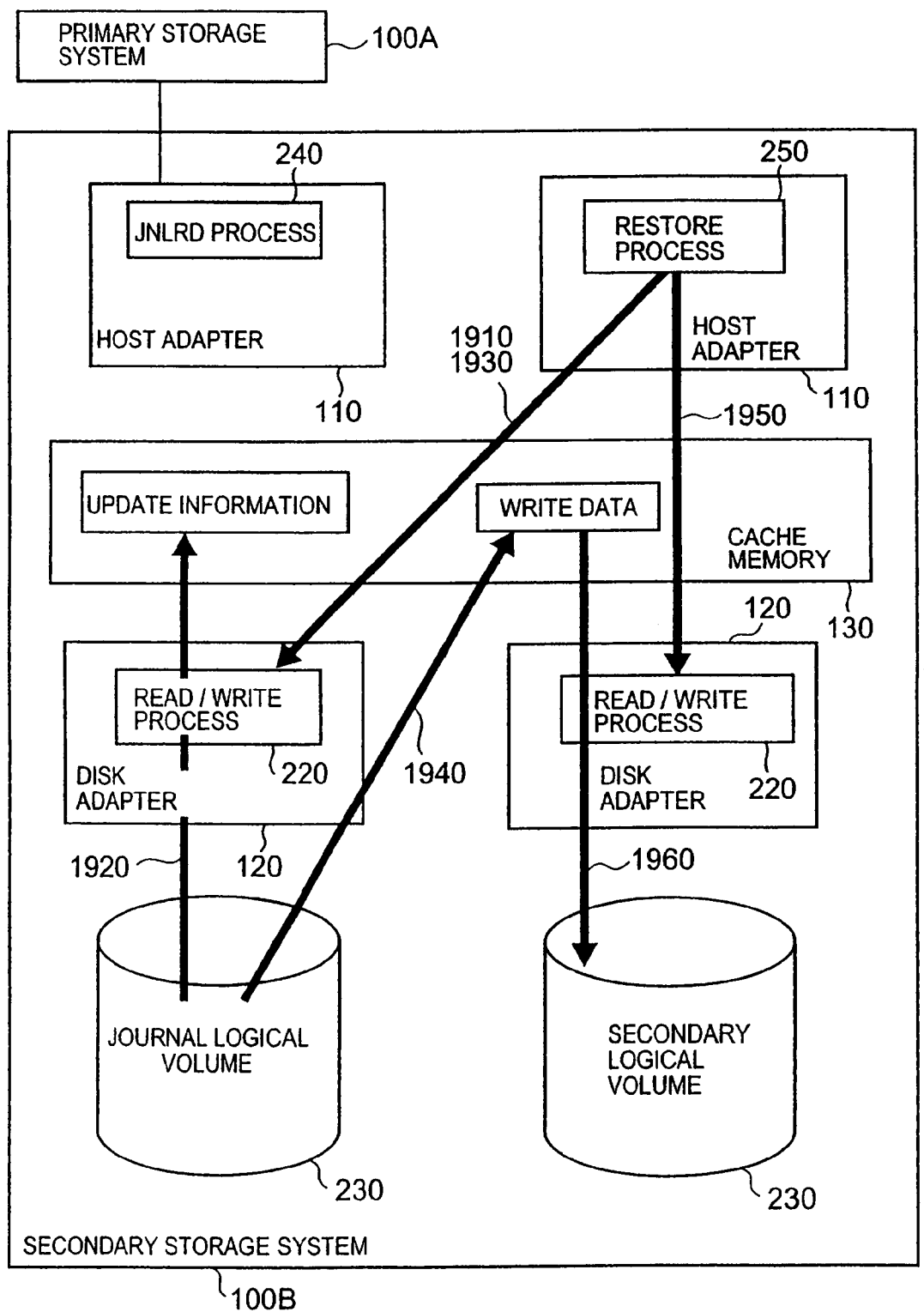
FIG. 19 is a diagram for describing a restore process in one mode of implementing the present invention.
Figure 20:
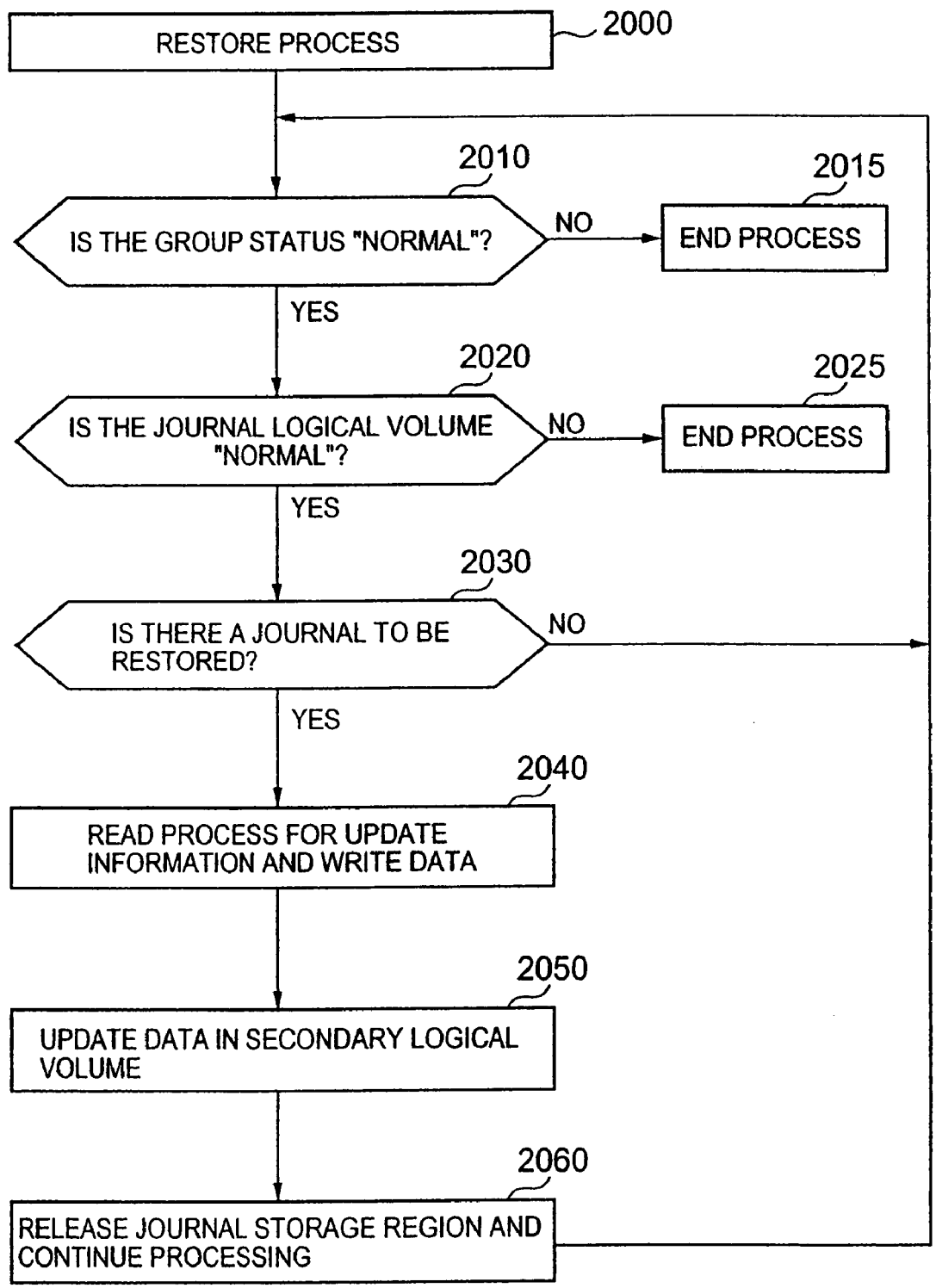
FIG. 20 is a flowchart of a restore process in one mode of implementing the present invention.

FIG. 19 is a diagram for describing a restore process 250, and FIG. 20 is a flowchart of this restore process 250. Below, an operation wherein the host CHA 110A of the secondary storage system 100B updates data by using a journal is described with reference to FIG. 19 and FIG. 20. The restore process 250 may be performed by a separate CHA 110 (for example, the system CHA 110BS), or it may be performed by the DKA 120 of the secondary storage system 100B.

(1) The host CHA 110A refers to the group information 600 and investigates whether or not the group status of the group number selected from a plurality of group numbers is "normal" (step 2010). If the group status is found to be a status other than "normal", for example, "problem", in the investigation at step 2010, then the host CHA 110A ends the restore process 250 (step 2015).

(2) If the group status is found to be "normal" in step 2010, then the host CHA 110A refers to the group information 600, the volume information 400, and the like, and examines the volume status corresponding to the journal logical volume number belonging to the selected group number (step 2020). If the volume status of the journal logical volume 230JB is found to be "abnormal" in the investigation in step 2020, then this means that that logical volume cannot be accessed, and therefore the host CHA 110A changes the group status corresponding to the selected group number to "abnormal" and terminates processing (step 2025).

(3) If the volume status of the journal logical volume 230JB is found to be "normal" at step 2020, then the host CHA 110A investigates whether or not there exists a journal that is to be restored. More specifically, the host CHA 110A acquires the oldest update information address and the newest update information address in the pointer information 700, and it compares these addresses. If the oldest update information address and the newest update information address are equal, then this means that no journal is present, and hence the host CHA 110A temporarily ends the restore process, and once a prescribed period of time has elapsed, it restarts the restore process (step 2030).

(4) If there is a journal to be restored, as a result of the investigation in step 2030, then the host CHA 110A carries out the following processing with respect to the journal having the oldest (smallest) update number. The update information in the journal having the oldest (smallest) update number is saved, starting from the oldest update information address indicated in the pointer information 700. The host CHA 110A reserves a cache memory 130 and commands the DKA 120 to read information corresponding to the update information size (in other words, the update information itself), from the oldest update information address to the cache memory 130 (1910 in FIG. 19).

The read/write process 220 performed by the DKA 120 involves reading the update information from the storage device 150 (in other words, the journal logical volume 230JB), saving that update information to the reserved cache memory 130, and then reporting completion of the read operation to the host CHA 110 (1920 in FIG. 19).

The host CHA 110A receives the report indicating completion of the update information read process, acquires the logical address of the write data and the size of the write data, and then reserves a cache memory 130 and commands the DKA 120 to read data corresponding that data size (in other words, one item of write data), from the acquired logical address to the cache memory 130 (1930 in FIG. 19).

The read/write process 220 performed by the DKA 120 involves reading the write data from the storage device 150 (in other words, from the designated logical address), saving that write data to the cache memory 130, and then reporting completion of the read operation to the host CHA 110 (step 2040; 1940 in FIG. 19).

(5) The host CHA 110A determines the logical address of the secondary logical volume to be updated (in other words, the logical address of the write command (see FIG. 21)), from the update information, and commands the DKA 120 to write the write data to the address of the secondary logical volume 230 SB identified by that logical address (step 2050; 1950 in FIG. 19). The read/write process 220 performed by the DKA 120 involves writing the write data stored in the cache memory 130, to the storage region of the storage device 150 corresponding to the logical address in the secondary logical volume (the logical address of the write command), and then releasing the cache memory 130 and reporting completion of the write operation to the host CHA 110A (1960 in FIG. 19).

(6) The host CHA 110A receives the write process completion report and releases the journal storage region. In the process for releasing the journal storage region, the host CHA 110A changes the oldest update information address in the pointer information 700 provided in the secondary storage system 100B, to a value equal to the current oldest update information address plus the update information size. If the oldest update information address has reached the head address of the write data region, the host CHA 110A sets the head address of the write data region to 0. The host CHA 110A changes the oldest write data address in the pointer information 700 to a value equal to the existing oldest write data address plus the size of the write data that has been written. If the oldest write data address has reached a logical address equal to or exceeding the capacity of the journal logical volume, then the host CHA 110A corrects the address by subtracting the head address of the write data region. Thereupon, the host CHA 110A starts the next restore process (step 2060).

The foregoing was a description relating to FIG. 19 to FIG. 20. Furthermore, in the restore process 250 described above, the journals are read in from the storage device 150 to the cache memory 130, but if they are situated in the cache memory 130, then the aforementioned processing does not have to be carried out.

Furthermore, in the journal read reception process and the journal read command process 240 described above, the journal to be sent is determined by the primary storage system 100A in accordance with the pointer information 700, but the journal to be sent may also be determined by the secondary storage system 100B. For example, the system CHA 110BS adds an update number to the journal read command. In this case, in order that the system CHA 110BP receiving the journal read command may determine the logical address of the update information having the update number designated by the secondary storage system 100B, in the journal read reception process, a table or index may be provided in the shared memory 140 of the primary storage system 100A, for determining the logical address at which the update information is stored on the basis of the update number.

Furthermore, in the journal read reception process and the journal read command process 240 described above, a journal read command was used, but it is also possible to use a normal read command. For example, the group information 600 and the pointer information 700 in the primary storage system 100A may be transferred previously to the secondary storage system 100B, and the secondary storage system 100B may then read the data in the journal logical volume of the primary storage system 100A (in other words, the journal).

Furthermore, in the journal read reception process described above, the journals are sent from the primary storage system 100A to the secondary storage system 100B in the order of their update numbers, but they do not have to be sent in update number order. Furthermore, it is also possible for a plurality of journal read commands to be send from the primary storage system 100A to the secondary storage system 100B. In this case, in order to process the journals in update number order in the restore process, a table or index may be provided in the secondary storage system 100B in such a manner that the logical address at which the update information is stored can be determined from the update number.

In the data processing system 1 described above, the primary storage system 100A generates journals and transmits these journals to the secondary storage system 100B, and the secondary storage system 100B replicates data on the basis of the journals it receives from the primary storage system 100A. In this way, no burden is placed on the host computer 180 connected to the primary storage system 100A by the data replication process, and hence the connection path 190 between the primary storage system 100A and the host computer 180 does not have to be used.

The foregoing was a description of a mode of implementation relating to basic data processing using journals. Below, several embodiments relating to the application of data processing using journals will be described.

Embodiment 1

Figure 23:
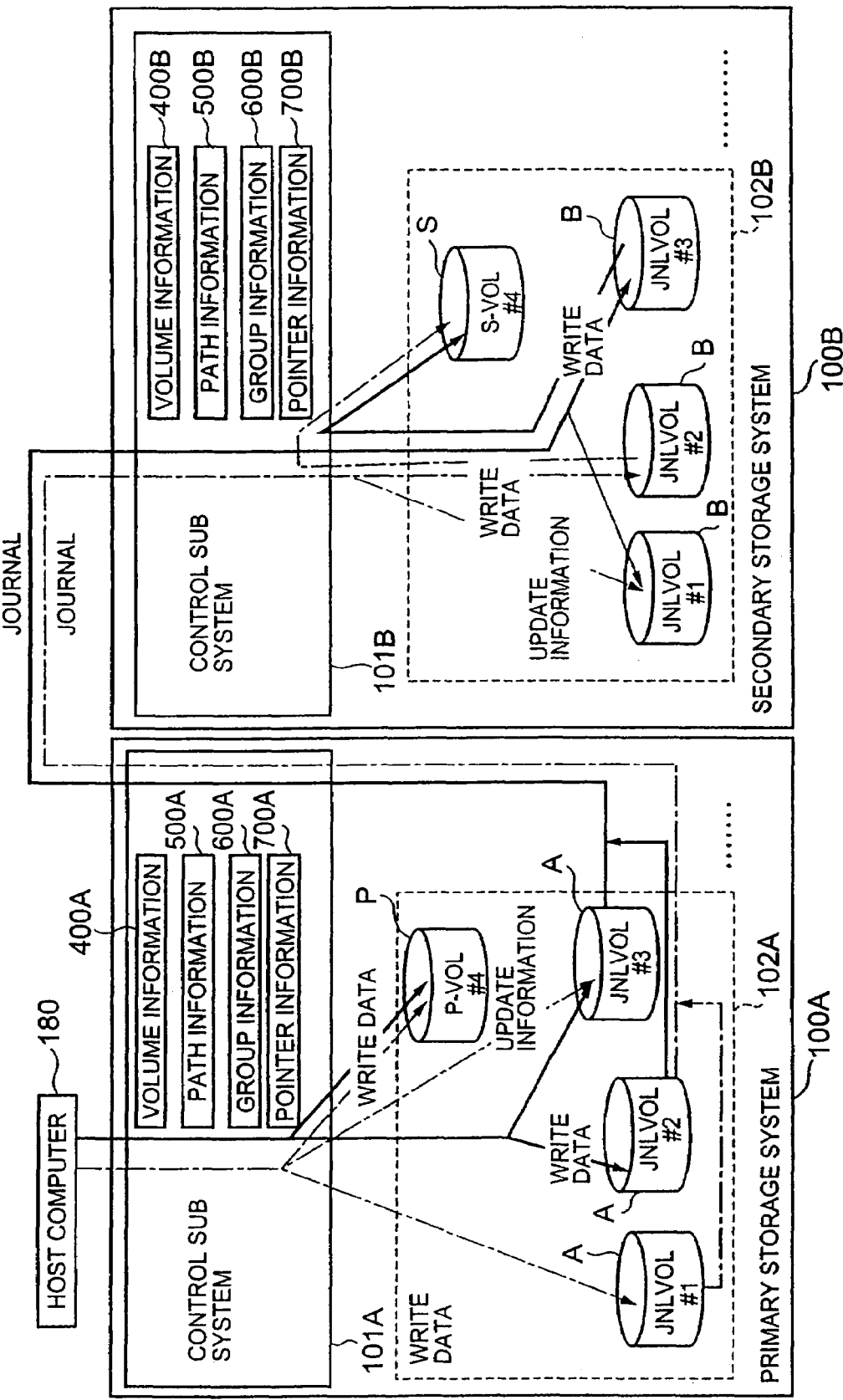
FIG. 23 shows an overview of a compositional example of a data processing system relating to a first embodiment of one mode of implementing the present invention.

FIG. 23 shows an overview of a compositional example of a data processing system relating to a first embodiment of one mode of implementing the present invention. The following description focuses principally on the points of difference with respect to the aforementioned mode of implementation, and points which are common with the aforementioned mode of implementation are explained briefly or omitted from this description. Moreover, in the following description, the reference numeral 101A is appended to the control sub-system of the primary storage system 100A, and the reference numeral 101B is appended to that of the secondary storage system 100B. Moreover, the volume information, path information, group information and pointer information provided in the primary storage system 100A contain information relating to the primary storage system 100A, and are appended with the suffix A. At least one of the volume information 400A, the path information 500A, the group information 600A and the pointer information 700A may be located in the control sub-system 101B, and similarly, at least one of the volume information 400B, path information 500B, group information 600B and pointer information 700B may be located in the control sub-system 101A. Moreover, in this case, if one of the information elements is updated (for example, the path information 500A), then the updated contents may be reflected in the same information (for example, path information 500A) held in the other control sub-system, by means of the connection path 200. Moreover, the volume information, path information, group information and pointer information provided in the secondary storage system 100B contain information relating to the secondary storage system 100B, and are appended with the suffix B. In FIG. 23, the "#" symbol in a logical volume indicates the logical volume number. Moreover, the reference symbol "P" is appended to the primary logical volume (shown as "P-VOL"), the reference symbol "S" is appended to the secondary logical volume (shown as "S-VOL"), the reference symbol "A" is appended to the journal logical volumes in the primary storage system 100A (shown as "JNLVOL"), and the reference symbol "B" is appended to the journal logical volumes in the secondary storage system 100B. Below, when referring to a logical volume, in order to make the description easier to understand, a combination of the # appended to the logical volume and the aforementioned reference symbol will be used, instead of reference numbers such as "230".

A plurality of journal logical volumes, for example, three journal logical volumes, #1A, #2A and #3A are included in a particular group 102A of the plurality of groups established in the primary storage system 100A. Furthermore, the group 102 also contains one primary logical volume, #4P, for example, which is a logical volume where journals are not stored and only write data is stored.

A plurality of journal logical volumes, for example, three journal logical volumes, #1B, #2B and #3B are included in a particular group 102B of the plurality of groups established in the secondary storage system 100B. Furthermore, the group 102 also contains one secondary logical volume, #4S, for example, which is a logical volume where journals are not stored and only write data is stored. In order to make the contents of the present embodiment easier to understand, the number of journal logical volumes contained in group 102A and the number of journal logical volumes contained in group 102B are taken to be the same, but these numbers may be different. Moreover, the respective storage capacities of the journal logical volumes #1A, #2A and #3A may also be different. The same applies to the journal logical volumes #1B, #2B and #3B.

If the control sub-system 101A has received a write command and write data for the primary logical volume #4P, from the host computer 180, then it stores the write data in the primary logical volume #4P in accordance with that write command. Moreover, the control sub-system 101A refers to the group information 600, ascertains the update number corresponding to the group number of the group 102A (hereinafter, also referred to as the "SEQ#"), and generates a journal containing the update number thus ascertained, and the like. The control sub-system 101A selects a first journal logical volume forming a storage destination for the update information in the journal, and a second journal logical volume forming a storage destination for the write data in the journal, from the plurality of journal logical volumes #1A, #2A and #3A. It stores the update information contained in the generated journal in the first journal logical volume thus selected, and it stores the write data contained in the generated journal, in the second journal logical volume thus selected. A more concrete description is given below.

Figure 25:
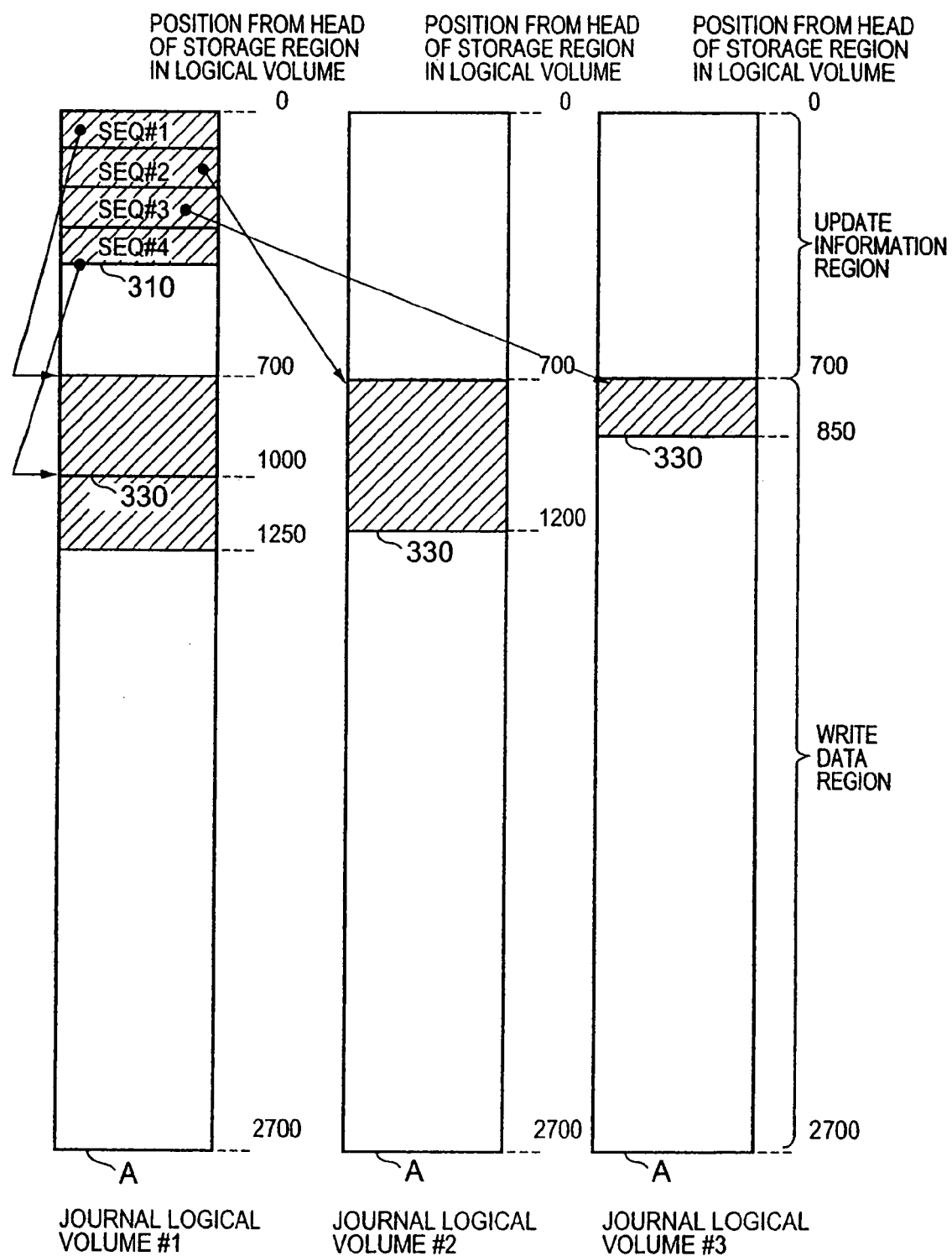
FIG. 25 shows the composition of the pointer information 700A illustrated in FIG. 24, showing the composition of this information in a plurality of journal logical volumes #1A, #2A, #3A.

FIG. 24 shows an example of the composition of the pointer information 700A in the first embodiment of one mode of implementing the present invention. FIG. 25 shows the composition of the pointer information 700A illustrated in FIG. 24, and this information is constituted in a plurality of journal logical volumes #1A, #2A, #3A. Below, the composition of the pointer information 700A in the primary storage system 100A and the plurality of journal logical volumes #1A, #2A and #3A are described with reference to FIG. 24 and FIG. 25, but this description can also be applied to the secondary storage system 100B.

Of the plurality of information elements in the pointer information 700A, the head address of the update information region, the head address of the write data region, the newest write data address and the oldest write data address are registered for each of the journal logical volumes located in the corresponding group.

According to the example in FIG. 24 and FIG. 25, the update information and the write data constituting the same journal are stored in a separate journal logical volume. More specifically, it is possible to store the update information and the write data respectively by means of the following methods, for example.

(Method for Storing Update Information in the Journal)

The control sub-system 101A selects a journal logical volume from the plurality of journal logical volumes, for example, the journal logical volume #1A having the most recent number, stores the update information 310 starting from the head position of the selected journal logical volume #1A, and then proceeds to update the information elements corresponding to journal logical volume #1 which are contained in the pointer information 700A, each time an update arises. Consequently, if the control sub-system 101A detects that the selected journal logical volume #1A has been used to the end of the update information region (the head address of the write data region), it selects a separate journal logical volume, for example, the journal logical volume #2A having the next most recent number, and stores the update information 310 from the head position of the selected journal logical volume #2A. Thereafter, similarly, if the storage region up to the end of the update information region (the head address of the write data region) in the journal logical volume #2 has been used, then the control sub-system 101A selects another journal logical volume, for example, the journal logical volume #3 and stores the update information 310 starting from the head position of this journal logical volume. If the storage region has been used up to the end of the update information region of journal logical volume #3 (up to the head address of the write data region), and there is no other unused journal logical volume, then the control sub-system 101A stores the update information 310 starting from the head position of the initially selected journal logical volume #1A. In storing the update information, the plurality of journal logical volumes may be selected in accordance with a previously determined sequence (for example, a sequence established in the shared memory 260, or the like), or it may be selected in a random manner. Furthermore, similarly to the method for storing write data described below, first and second update information having adjacent update numbers (for example, having consecutive update numbers) may be divided between separate journal logical volumes rather than being stored in the same journal logical volume.

(Method for Storing Write Data in the Journal)

The control sub-system 101A changes the journal logical volume forming the storage destination for the write data, for each journal. More specifically, for example, if there are N journal logical volumes (for example, 3 journal logical volumes) in the group 102A, the control sub-system 101A divides the update number in the update information forming a pair with the write data that is to be stored (for example, 5), by N (for example, 3), and stores the write data that is to be stored in the journal logical volume corresponding to the remainder value (for example, 2), namely, journal logical volume #2A. The storage destination address for the write data in the journal logical volume (for example, #2A) forms the newest write data address corresponding to that journal logical volume in the pointer information 700A. The first and second write data having adjacent update numbers are not necessarily stored in the same journal logical volume, but according to requirements, they may be stored in the same journal logical volume (for example, if the write data regions of the other journal logical volumes are full). Moreover, similarly to the update information storage method described above, the first and second write data having adjacent update numbers may be stored in the same journal logical volume, and if this journal logical volume becomes full, then they may be stored in another journal logical volume.

The foregoing description related to a method for storing the update information and the write data in the journal. If this storage method is adopted, the following processing can be carried out in the journal creation process (for example, step 1345 in FIG. 13 and step 1830 in FIG. 18) described in the aforementioned mode of implementation, for example.

The control sub-system 101A selects the journal logical volume forming the storage destination for the write data, from a plurality of journal logical volumes, and judges whether or not write data can be stored in that logical volume, on the basis of the various information elements corresponding to the selected journal logical volume (the information elements registered in the pointer information 100A). More specifically, for example, the control sub-system 101A divides the update number in the update information forming a pair with the write data that is to be stored (for example, 5), by the number of journal logical volumes N existing in group 102A (for example, 3), and it judges whether or not the write data can be stored in the journal logical volume corresponding to the remainder of this division operation (for example, 2), (namely, the journal logical volume #2A). If a negative judgment result is obtained, then the control sub-system 101A terminates the process as "failed to create journal" (step 1390 in FIG. 13, and step 1830 in FIG. 18). Rather than terminating the process, the control sub-system 101A may also search for a journal logical volume having sufficient free space to store the write data, on the basis of the data size of the write data and the pointer information 700A, and the like, and then store the write data in the free space of the journal logical volume found by this search.

According to the first embodiment described above, a plurality of journal logical volumes are prepared for one group, and a first and a second write data having adjacent update numbers (for example, consecutive update numbers) are stored in separate journal logical volumes. Thereby, it is possible to make the writing of the write data overlap with the reading of the journal (in a "pipeline" fashion), and hence copying performance is improved. More specifically, if there is one journal logical volume, then the read (or write) performance for the write data is dependent on the performance of the storage device 150 providing that journal logical volume. In the present embodiment, a plurality of journal logical volumes are prepared and the write data in journals having adjacent update numbers is stored in different journal logical volumes. Therefore, it is possible to use a plurality of storage devices 150 simultaneously, and hence the journal read (or write) performance can be enhanced. In order to achieve such improved performance in a satisfactory manner, it is desirable that the plurality of journal logical volumes are provided in separate storage devices 150. Furthermore, if each journal logical volume is provided over a plurality of storage devices 150, then when providing a plurality of journal logical volumes, it is desirable that all or a part of the plurality of storage devices 150 providing one journal logical volume do not overlap with all or a part of the plurality of storage devices 150 providing another journal logical volume.

In the first embodiment described above, after step 1580 in FIG. 15 and before receiving a journal read command from the secondary storage system 100B, the control sub-system 101A may implement a read process autonomously in order to read one or more subsequent journals (in other words, the journal having the next update number onwards, in the journals sent at step 1580). Thereby, when the next journal read command is received, in the read process in step 1570 there will be an increased possibility that the journal corresponding to that command will already be situated in the cache memory 130, and therefore the time from receiving the journal read command until sending a journal to the secondary storage system 100B in accordance with that command can be reduced. Here "one or more subsequent journals" can be taken to mean journals up to the update number equal to the sum of previous update data plus the number of journal logical volumes, n, for example. In this case, in the secondary storage system 100B, the write data in the journal is stored continuously in the same journal logical volume.

Moreover, in the first embodiment, as described above, the first and second update information having adjacent update numbers (for example, consecutive update numbers), may be stored in separate journal logical volumes, similarly to the method for storing the write data.

Moreover, in this first embodiment, the plurality of journal logical volumes belonging to the same group do not have to have the same storage capacity.

Furthermore, in the first embodiment, it is also possible to implement the following, as a modification example.

(A) First Modification of First Embodiment

The control sub-system 101B of the secondary storage system 100B superimposes m journal read commands (where m is an integer of 2 or above) and it sends the m superimposed journal read commands to the primary storage system 100A. The control sub-system 101B inserts a number (hereinafter, called a "TAG#") for identifying the journal read command in each of the m superimposed journal read commands. The TAG# ranges from 1 to m. More specifically, for example, if there are three superimposed journal read commands, then the control sub-system 101B inserts a TAG#1 into the first journal read command of the three superimposed journal read commands, inserts a TAG#2 in the second journal read command, inserts a TAG#3 in the third journal read command, and then sends the three superimposed journal read commands to the primary storage system 100A. In this case, in the primary storage system 100A, as illustrated in FIG. 26, specific information elements in the pointer information 700A (for example, the read start address and the retry start address) are provided in equal number to the number of superimposed commands, m, in other words, they are provided for each TAG#. The number of superimposed commands, m, may be the same as the number of journal logical volumes provided in the group 102A, for example. Furthermore, according to the pointer information 700A illustrated in FIG. 26, if the write data is read out from the journal logical volume #1A corresponding to TAG#1, then the read start address and the retry start address corresponding to the TAG#1 are the address "150" from the head position in logical volume number "1".

A more concrete description of this first modification example is given below.

The control sub-system 101B of the secondary storage system 100B implements the journal read command processing illustrated in FIG. 17 for each TAG#.

When the control sub-system 101A of the primary storage system 100A has received a journal read command, it implements the journal reception processing described with reference to FIG. 15. In the journal reception process, the control sub-system 101A reads out the update information 310 from the logical address indicated by the retry start address and the read start address corresponding to the TAG# (the information elements included in the pointer information 700A) (steps 1570 and 1540). By means of the journal reception process, a journal containing update information is sent to the secondary storage system 100B. In this case, in order to identify the journal read command on the basis of which the journal was acquired, the control sub-system 101A appends the TAG# in the corresponding journal read command to the acquired journal and sends the journal with the appended TAG# to the secondary storage system 100B.

If the control sub-system 101B of the secondary storage system 100B receives a journal, then it implements the journal storage processing described with reference to FIG. 18. In this case, the control sub-system 101B calculates the logical address for storing the update information in the journal, on the basis of the TAG# and update number in the received journal and the pointer information 700B, and investigates whether or not update information can be stored in the journal logical volume identified by the TAG#, on the basis of the calculated logical address and the size of the update information (step 1810 in FIG. 18). Furthermore, the control sub-system 101B investigates whether or not write data can be stored in the identified journal logical volume, on the basis of the data size of the write data in the update information, and the pointer information 700B (step 1830 in FIG. 18). The journal logical volume where the update information and the write data are stored is the journal logical volume corresponding to the TAG#.

In this way, even greater copy performance can be achieved by sending journal read commands in a superimposed fashion.

(A) Second Modification of First Embodiment

The second modification is a further modification of the first modification example, wherein the primary storage system 100A acquires a plurality of journals and sends them to the secondary storage system 100B, in response to one journal read command. A more concrete description is given below.

In the journal reception process described with respect to FIG. 15, the control sub-system 101A of the primary storage system 100A acquires and sends the write data stored in consecutive storage regions of the same journal logical volume. More specifically, for example, in FIG. 25, the control sub-system 101A ascertains from the pointer information 700A, and the like, that the two write data registered in consecutive regions of the journal logical volume #1A correspond respectively to update number 1 and update number 4. Thereby, it generates update information including the update number 1 and a journal containing write data corresponding to same, and update information including the update number 4 and a journal containing write data corresponding to same, in response to one journal read command, and transmits them to the secondary storage system 100B. After the processing in step 1590 (or 1545) in FIG. 15, the control sub-system 101A determines the logical address for storing the two or more update information contained respectively in the two or more journals that are to be generated subsequently. In this case, the logical address is equal to the read start address plus the value obtained by multiplying the number of TAG#, m, by the update information size.

The control sub-system 101B of the secondary storage system 100B having received the journals implements the journal storage processing described with respect to FIG. 18, but in this case, the write data in the received journal is stored from the newest write data address in the journal logical volume corresponding to the TAG# appended to the received journal. In the example in FIG. 25, if the control sub-system 101B has received two journals having update number 1 and update number 4, then it writes the write data in the journal having update number 1 to the journal logical volume #1, starting from the logical address 700, and it then stores the write data in the journal having update number 4, in a continuous fashion following this write data.

Embodiment 2

Next, a second embodiment of one mode of implementing the present invention will be described. The second embodiment is further example of application of the first embodiment described above. The following description focuses principally on the points of difference with respect to the aforementioned first embodiment, and points which are common with the aforementioned first embodiment are explained briefly or omitted.

In the second embodiment, the write data region in the journal logical volume is divided into a plurality of sub write regions. The plurality of sub write regions may respectively have the same storage capacity or they may have different storage capacities. In this second embodiment, they each have the same storage capacity. In other words, in the second embodiment, the write data region in the journal logical volume is divided equally into a plurality of sub write regions. Hereinafter, the individual sub write regions are called "extents".

Figure 27:
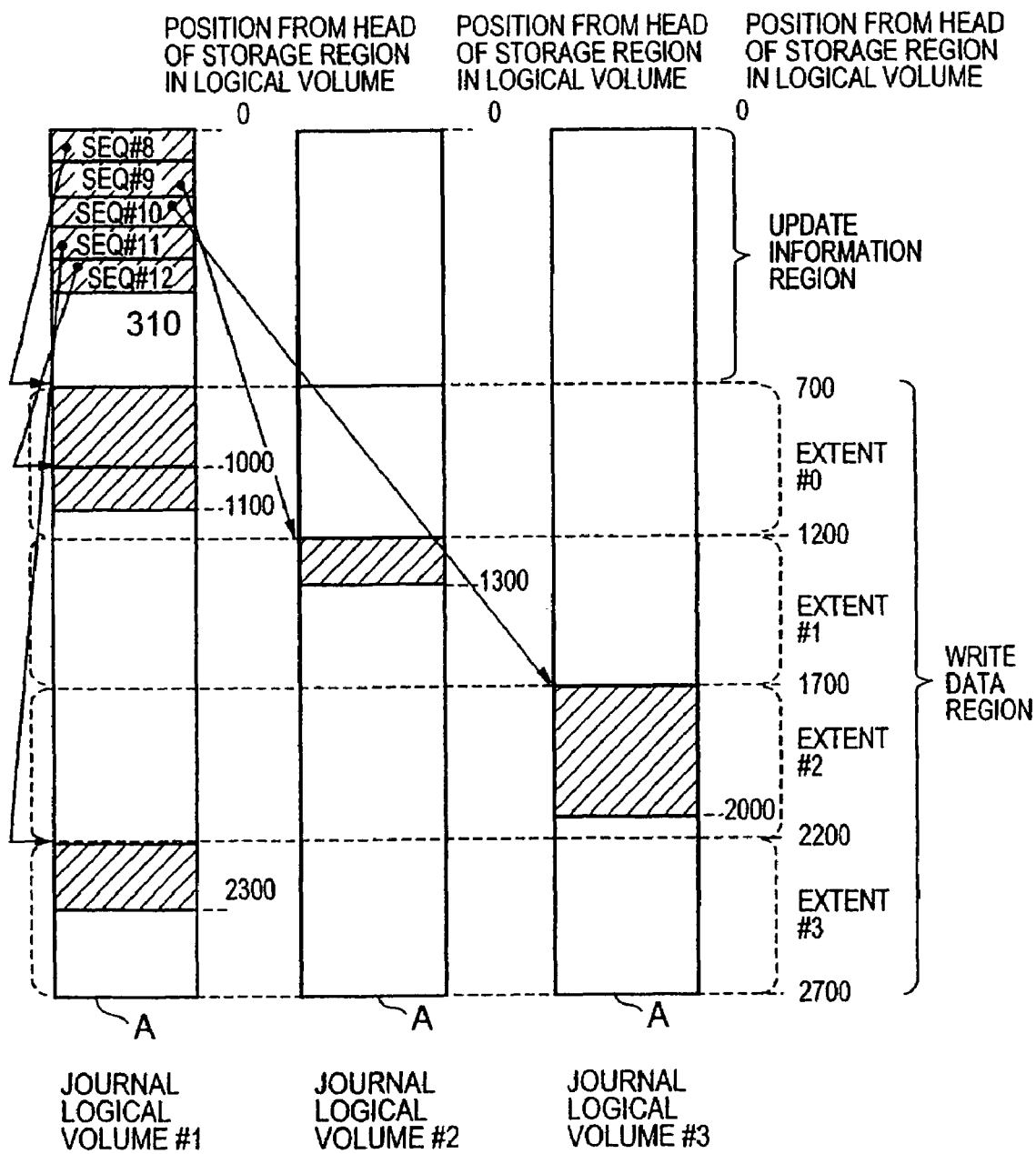
FIG. 27 shows an example of the composition of a plurality of journal logical volumes, #1A, #2A, #3A in a second embodiment of one mode of implementing the present invention.

FIG. 27 shows an example of the composition of a plurality of journal logical volumes, #1A, #2A, #3A. FIG. 28 shows an example of the composition of extent information for managing a plurality of extents. FIG. 29 shows an example of the composition of pointer information 700A corresponding to FIG. 27 and FIG. 28. Below, a plurality of journal logical volumes #1A, #2A and #3A in the primary storage system 100A, the extent information 701 and the pointer information 700A are described with reference to FIG. 27 to FIG. 29, but this description can also be applied to the secondary storage system 100B.

As shown in FIG. 27, the write data region in the plurality of journal logical volumes #1A, #2A and #3A is divided equally into a plurality of extents (for example, four extents). An extent number for identifying the extent in the journal logical volume (for example, #0-#3) is appended to each of the extents in each of the journal logical volumes.

Moreover, as shown in FIG. 27, the write data regions of all of the journal logical volumes are also divided respectively into a plurality of extents, in a similar fashion. In other words, each of the journal logical volumes #1A, #2A and #3A has a write data region of the same storage size and containing the same number of extents. Therefore, at least the plurality of write data regions of the plurality of journal logical volumes #1A, #2A and #3A are each of the same size (the plurality of update information regions may each be of the same size, or of different sizes).

Furthermore, as shown in FIG. 27, the same extent number is not used twice in each individual journal logical volume, but in the plurality of journal logical volumes #1A, #2A and #3A (in other words, within the same group 102A), common extent numbers are used. More specifically, in each of the journal logical volumes #1A, #2A and #3A, there are four extents respectively labeled with the extent numbers, #0-#4. In other words, each write data region of each journal logical volume is divided into a plurality of sub write regions, and one extent is constituted by each sub write region of the plurality of journal logical volumes. Stated alternatively, by specifying one extent number (for example, #0), one sub write region is identified in each of the plurality of journal logical volumes #1A, #2A and #3A, and the set of identified sub write regions forms one extent corresponding to the specified extent number. Stated in yet another way, each extent extends over a plurality of logical volumes #1A-#3A belonging to the same group 102A.

An example of the composition of the extent information 701 for managing extents of this kind is illustrated in FIG. 28. More specifically, the extent information 701 registers, for each extent #, which of the plurality of journal logical volumes #1A-#1C the extent corresponding to that extent # is located in. The location of the extent is indicated by a set comprising the start logical address and the end address, and such sets exist in equal number to the number of journal logical volumes #1A-#1C belonging to the same group 102A. The start logical address indicates the logical address at which storage of the write data starts, and end logical address indicates the logical address at which storage of the write data ends. Furthermore, in the extent information 701, the numbers #1-#3 registered respectively against the plurality of sets of start logical address and end logical address indicate the storage order of the write data.

It is possible to ascertain the following, for example, from the extent information 701 of this kind.

It can be seen that in the extent having the extent #0, initially, storage of write data starts from the address 700 in journal logical volume #1A, and if write data has been stored up to the position of address 1119 in volume #1A, then storage of write data subsequently starts from the position of address 700 in journal logical volume #2A. If the write data has been stored up to the position of address 1119 in journal logical volume #2A, then subsequently, storage of storage device is started from the position of address 700 in journal logical volume #3A.

It can be seen that in the extent having the extent #2, initially, storage of write data starts from the address 1200 in journal logical volume #2A, and if write data has been stored up to the position of address 1699 in volume 2A, then storage of write data subsequently starts from the position of address 1200 in journal logical volume #23A.

In this way, by changing the journal logical volume at which the storage of the write data starts initially, for each extent #, it is possible to cause all of the journal logical volumes #1A-#3A to function in parallel.

If write data is to be stored in the respective journal logical volumes #1A-3A on the basis of the extent information 701 described above, then the pointer information 700A will have the composition illustrated in FIG. 29. In other words, the head address of the update information region and the head address of the write data region are prepared for each journal logical volume #, and the newest write data address, the oldest write data address, the read start address and the retry start address are prepared for each extent #. By adjusting the newest write data address, the oldest write data address, the read start address and the retry start address, it is possible to write a plurality of write data having adjacent (for example, consecutive) update numbers, in separate extents.

In this second embodiment, the method for storing the update information is the same as that of the first embodiment, but the method for storing write data is different.

For example, for each journal, the control sub-system 101A changes the extent where the write data in that journal is stored. More specifically, if there are n extents (where n=4, for instance), then the control sub-system 101A divides the update number in the journal (for example, 12) by the number of extents (for example, 4), and stores the write data contained in the journal in the extent corresponding to the remainder of this division operations (for example, 0) (namely, extent #0). The storage destination address in that extent is the newest write data address corresponding to the number of the extent (the newest write data address registered in the pointer information 700A). The control sub-system 101A is able to detect whether the storage destination address has reached the end address (for example, address 1200) of one part of a certain extent (for example, #0) provided in a certain journal logical volume (for example, #1A), on the basis of the pointer information 700A and the extent information 701. Furthermore, in this case, the control sub-system 101A uses the extent information 701 to locate the start address of another part of the same extent provided in another journal logical volume that is to be set as the next storage destination address (for example, it determines that the address 700 of the journal logical volume #2A is to be the next storage destination address). The control sub-system 101A is then able to set this storage destination address as the newest write data address and store write data from that start address.

If this write data storage method is adopted, the following processing can be carried out in the journal creation process (for example, step 1345 in FIG. 13 and step 1830 in FIG. 18) described in the aforementioned mode of implementation, for example.

The control sub-system 101A divides the update number in the journal (for example, 12) by the number of extents, n, (for example, 4), and judges whether or not it is possible to store the write data contained in the journal, in the extent corresponding to the remainder of the division operation (for example, 0), (namely, the extent #0). If a negative judgment result is obtained, then the control sub-system 101A terminates the process as "failed to create journal" (step 1390 in FIG. 13, and step 1830 in FIG. 18). Rather than terminating the process, the control sub-system 101A may also search for a further extent having sufficient free space to store the write data, on the basis of the data size of the write data and the pointer information 700A, and the like, and then store the write data in the free space of the extent found by this search.

According to the second embodiment described above, the write data regions of the journal logical volumes are divided into a plurality of extents, and the write data in journals having adjacent (for example, consecutive) update numbers is stored in a distributed fashion in different extents. Thereby, it is possible to improve copying performance, regardless of the number of journal logical volumes belonging the same group (in other words, even if there is one journal logical volume in a group). For example, the time during which a storage device 150 cannot receive a read (or write) command can effectively be eliminated, and hence the performance of the storage device can be utilized more beneficially. In order to achieve such improved performance in a satisfactory manner, it is desirable that the plurality of journal logical volumes are provided in separate storage devices 150. Furthermore, if each journal logical volume is provided over a plurality of storage devices 150, then when providing a plurality of journal logical volumes, it is desirable that all or a part of the plurality of storage devices 150 providing one journal logical volume do not overlap with all or a part of the plurality of storage devices 150 providing another journal logical volume. Furthermore, it is also desirable that the plurality of extents are provided in separate storage devices 150.

In the second embodiment described above, after step 1580 in FIG. 15 and before receiving a journal read command from the secondary storage system 100B, the control sub-system 101A may autonomously implement a read process for the journal that is expected to be transmitted next. Thereby, when the next journal read command is received, in the read process in step 1570 there will be an increased possibility that the journal corresponding to that command will already be situated in the cache memory 130, and therefore the time from receiving the journal read command until sending a journal to the secondary storage system 100B in accordance with that command can be reduced. Here, the "journal that is expected to be transmitted next" can be taken to mean the journal having an update number equal to the previously processed update number plus the number of extents, p, for example. In this case, in the secondary storage system 100B, the write data in the journal is stored continuously in the same sub write region of the same journal logical volume.

Furthermore, in the second embodiment, the update information regions of the plurality of journal logical volumes (or the one journal logical volume) belonging to the same group may be divided respectively into a plurality of sub-regions (extents), in a similar fashion to the write data regions. In this case, the first and second update information having adjacent update numbers (for example, consecutive update numbers) may be stored in separate sub-regions (extents), similarly to the method for storing the write data.

Moreover, in the second embodiment, there is no limit on the number of extents, p, but in order to issue a read (or write) command to all of the journal logical volumes belonging to the same group, desirably, the number of extents, p, is equal to or greater than the number of journal logical volumes, n, (in other words, p>=n).

Furthermore, in the second embodiment, it is also possible to implement the following, as a modification example.

(A) First Modification of Second Embodiment

The control sub-system 101B of the secondary storage system 100B issues multiple journal read commands. The control sub-system 101B inserts an extent number into each of the superimposed journal read commands. The control sub-system 101B carries out the journal read command processing described with reference to FIG. 17, independently, for each extent number.

When the control sub-system 101A of the primary storage system 100A has received a journal read command, it implements the journal reception processing described with reference to FIG. 15. In the journal reception process, the control sub-system 101A refers to the pointer information 700A, and reads out the update information 310 from the logical address indicated by particular information elements corresponding to the extent number (namely, the retry start address and the read start address) (steps 1570 and 1540).

If the control sub-system 101B of the secondary storage system 100B receives a journal, then it implements the journal storage processing described with reference to FIG. 18. In this case, the control sub-system 101B calculates the logical address for storing the update information in the journal, on the basis of the extent number and update number in the received journal and the pointer information 700B, and investigates whether or not update information can be stored in the specified journal logical volume, on the basis of the calculated logical address and the size of the update information (step 1810 in FIG. 18). Furthermore, the control sub-system 101B investigates whether or not write data can be stored in the identified journal logical volume, on the basis of the data size of the write data in the update information, and the pointer information 700B (step 1830 in FIG. 18). The journal logical volume where the update information and the write data are stored is the journal logical volume corresponding to the extent. At step 1830 in FIG. 18, the control sub-system 101B may investigate whether or not write data can be stored in the extent corresponding to the extent number.

(B) Second Modification of Second Embodiment

The second modification is a further modification of the first modification example, wherein the primary storage system 100A acquires a plurality of journals and sends them to the secondary storage system 100B, in response to one journal read command. A more concrete description is given below.

In the journal reception process described with respect to FIG. 15, the control sub-system 101A of the primary storage system 100A acquires and sends the write data stored in consecutive storage regions of the same extent. More specifically, for example, in FIG. 27, the control sub-system 101A ascertains from the pointer information 700A, and the like, that the two write data registered in consecutive regions of the sub write region logical volume #1A correspond respectively to update number 8 and update number 12. Thereby, it generates update information including the update number 8 and a journal containing write data corresponding to same, and update information including the update number 12 and a journal containing write data corresponding to same, in response to one journal read command, and transmits them to the secondary storage system 100B. After the processing in step 1590 (or 1545) in FIG. 15, the control sub-system 101A determines the logical address for storing the two or more update information contained respectively in the two or more journals that are to be generated subsequently. In this case, the logical address is equal to the read start address plus the value obtained by multiplying the number of extents, p, by the update information size.

The control sub-system 101B of the secondary storage system 100B having received the journals implements the journal storage processing described with respect to FIG. 18, but in this case, the write data in the received journal is stored from the newest write data address in the extent corresponding to the extent number appended to the received journal. In the example in FIG. 27, if the control sub-system 101B has received two journals having update number 8 and update number 12, then it writes the write data in the journal having update number 1 to the journal logical volume #8, starting from the logical address 700, and it then stores the write data in the journal having update number 12, in a continuous fashion following this write data.

Third Embodiment

Next, a third embodiment of one mode of implementing the present invention will be described. This third embodiment relates to processing carried out by the primary storage system 100A in a case where the update information or the write data in the journal cannot be stored. A concrete description is given below.

In the journal creation processing described with reference to FIG. 13, if the control sub-system 101A in the primary storage system 100A cannot store the update information or the write data, then copying cannot be continued in the group relating to that process (1390 in FIG. 13). In this case, the control sub-system 101A changes the group status in the group information 600A to "suspend", and implements the following processing. A group status of "suspend" means that the journal creation process has been suspended and consistency between the data in the primary logical volume P and the secondary logical volume S has not been achieved.

In this third embodiment, the control sub-system 101A provides differential information. The differential information is information indicating whether or not there is a difference between the primary logical volume and the secondary logical volume, for each storage region of a prescribed size (for example, for each kB, for each logical address, for each storage volume corresponding to the data volume processed in one initial copy operation, or for a factor or measure of same). Differential information is required for all of the primary logical volumes P. The differential information is stored in a prescribed storage area, for example, a memory which can be consulted by the channel control section 110 and the DKA 120 (more specifically, a shared memory 140).

(A: Processing Implemented when a Journal Cannot be Stored (Group Status: Suspend))

Before the group status of a certain group becomes "suspend", the control sub-system 101A previously sets the value of the differential information for the primary logical volume P in the group to "no differential". The control sub-system 101A reads out the oldest journal from the journal logical volumes in that group, on the basis of the pointer information 700A, and sets the value relating to the oldest journal in the differential information (for example, the value corresponding to the logical address of the oldest journal) to "differential". The control sub-system 101A then discards the oldest journal from the journal logical volume. The control sub-system 101A carries out this process for all of the journals.

(B: Processing Implemented when a Journal Cannot be Stored (Group Status: Suspend))

In the processing described above (A: Processing implemented when a journal cannot be stored (group status:suspend)), if the control sub-system 101A has received a write command and write data from the host computer 180, then rather than creating a journal for that write data, it sets the value in the differential information to "differential". More specifically, for example, the control sub-system 101A refers to the group status at step 1265 in FIG. 12, and if the group status is "suspend", then it sets the corresponding logical address (the corresponding location in the differential information) to "differential", without creating a journal.

(C: Restart of Copying after Suspension of Copying (Suspend State))

Figure 30:
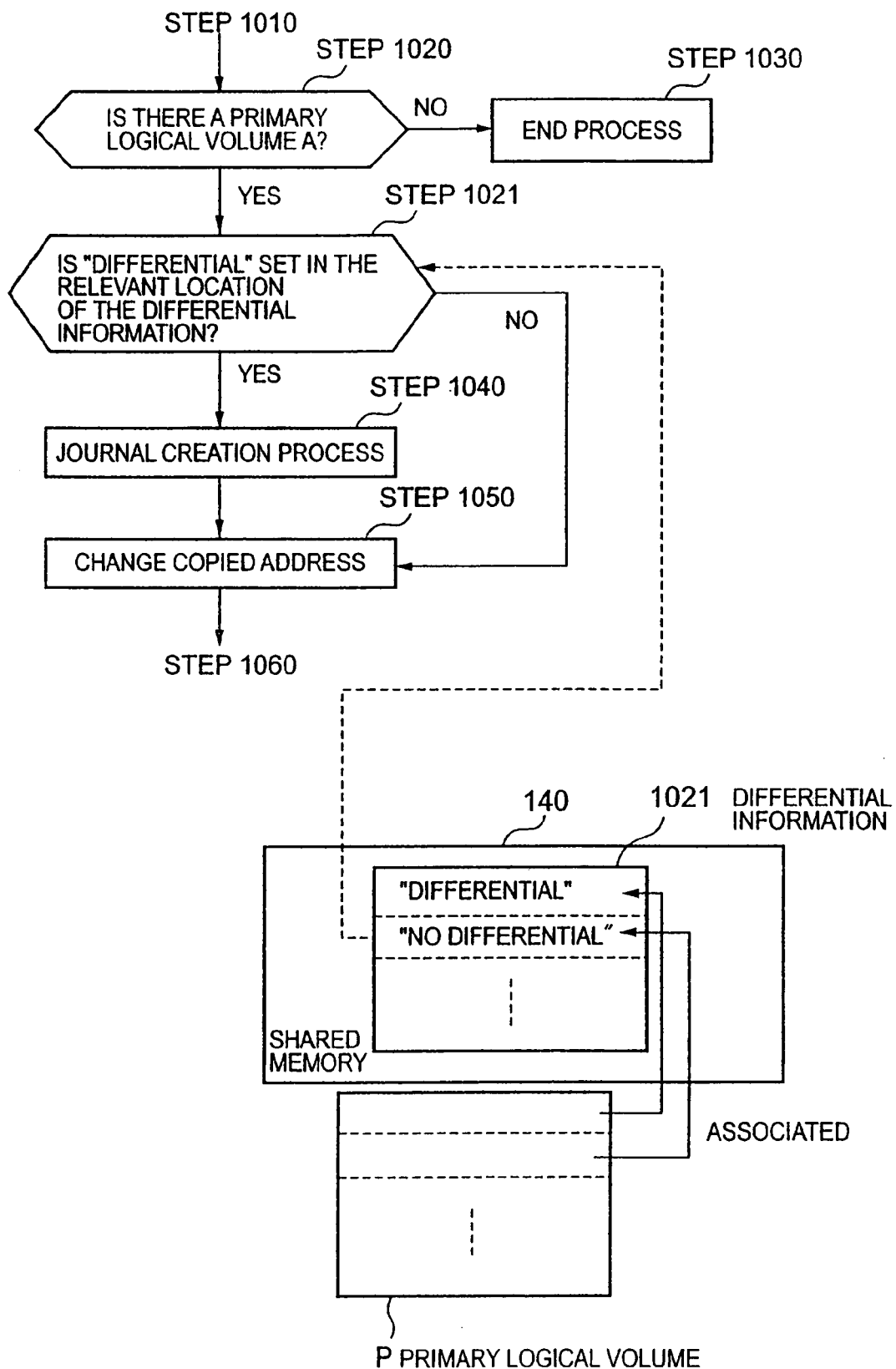
FIG. 30 shows a portion of an initial copy process in a third embodiment of one mode of implementing the present invention.

The control sub-system 101A receives a specified group number and a copy restart command from the host computer 180 or the maintenance terminal, and in response to this copy restart command, it restarts the copy process for the group corresponding to the specified group number. One example or a specific processing sequence is described below. In other words, when the processing described above (A: Processing implemented when a journal cannot be stored (group status: suspend)) has finished, the control sub-system 101A changes the group status of the group specified for copy restart processing to "not copied". The control sub-system 101A then implements an initial copy process as described in FIG. 10. In this initial copy process, as illustrated in FIG. 30, after step 1020, the control sub-system 101A checks each location of the differential information 1021 corresponding to the primary logical volume which is the object of the initial copy process (for example, the locations corresponding to each logical address), to confirm whether they indicate "differential" or "no differential" (step 1021). If "differential" is set in the differential information, then the control sub-system 101A carries out a journal creation process in step 1040, and if "no differential" is set, then it carries out the processing in step 1050. When the pair status for all of the primary logical volumes in the designated group has become "normal", as a result of this processing, then the control sub-system 101A returns the group status to "normal". Thereupon, all of the values set in the differential information are changed to "no differential", and normal operation is resumed, in other words, a journal is created whenever data is updated.

According to this third embodiment described above, differential information 1021 is used to identify whether or not the write data for which a journal is to be created is write data containing a difference between the primary logical volume P and the secondary logical volume S, and if the write data contains no such difference, then no journal is created. Consequently, journals are not created unnecessarily, and the time required until the secondary logical volume S coincides with the primary logical volume P can be shortened.

Embodiment 4

Next, a fourth embodiment of one mode of implementing the present invention will be described. This fourth embodiment relates to an example of a method for setting various information for achieving at least one of the aforementioned mode of implementation and the aforementioned first to third embodiments. Below, a GUI (graphical user interface) screen used when this method example is adopted will be described. The GUI screen described below is taken to be a GUI screen provided by software installed in the SVP 281, and it can be displayed on a variety of computers connected to the SVP 281.

FIG. 31A shows one example of a first GUI screen.

The first GUI screen is a screen for establishing the update information region, the write data region and the number of extents, and this screen is provided for each group, for example.

More specifically, for example, in the "Meta/Data Ratio" box, it is possible to set the ratio of storage capacity between the update information region and the write data region. In the example in FIG. 31A, the ratio is set to "16", which means that if the storage capacity of a journal logical volume is 170 GB, for instance, then the update information region will be 10 GB and the write data region will be 160 GB. The values set for particular information elements of the pointer information 700A are determined on the basis of the values set on this screen.

Moreover, the number of extents can be set in the "Extent" box. In the example in FIG. 31A, this number is set to "32", which means that 32 extents are established in one or a plurality of write data region(s).

FIG. 31B shows one example of a second GUI screen.

This second GUI screen is a screen on which the user can confirm certain settings.

More specifically, the group number (for example, "70") is displayed in the column corresponding to "JNL Group", for example.

Information relating to the group status is displayed in the column corresponding to "Attribute". More specifically, for example, if the group status is "normal", then the group corresponding to the aforementioned group number (for instance, "70") is displayed as either a copy source (Master) or a copy destination (Restore). If the group status is "suspend", then "Suspend" is displayed, and if initial copying is in progress, then "Copy" is displayed.

The box "JNL Size (GB)" indicates the total storage capacity of the journal logical volumes.

The box "JNL Volumes" indicates the number of journal logical volumes.

Furthermore, the journal logical volumes allocated to the group number are listed, for example, in the display region indicated by the reference number 5001.

Figure 32A:
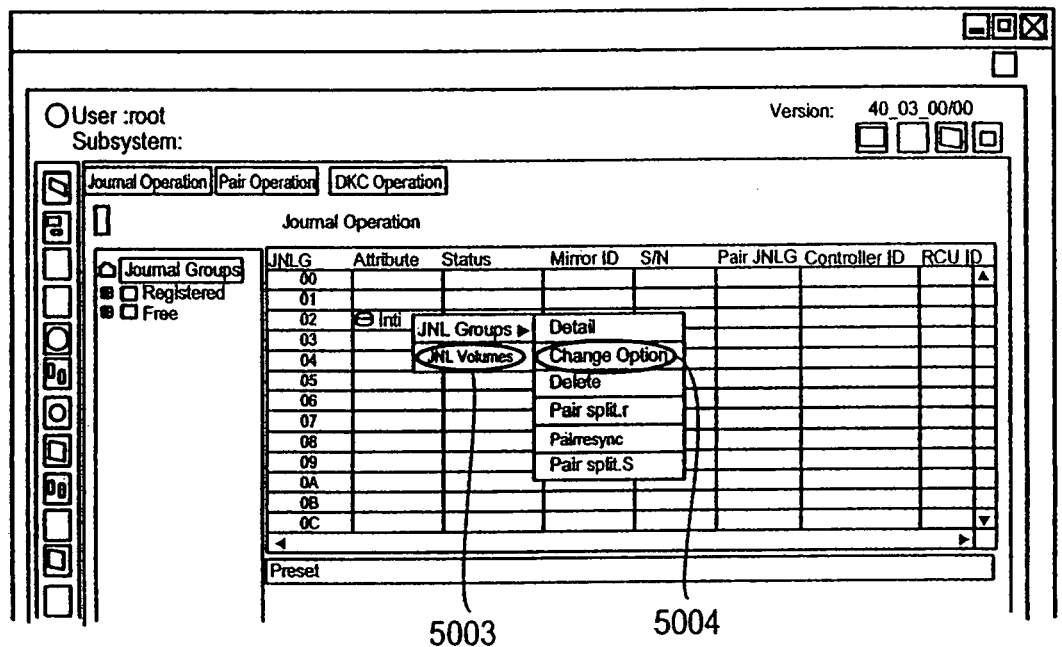
FIG. 32A shows a third GUI screen.

FIG. 32A shows one example of a third GUI screen.

The third GUI screen is a screen for acquiring information relating to a group and making settings relating to a group.

Figure 32B:
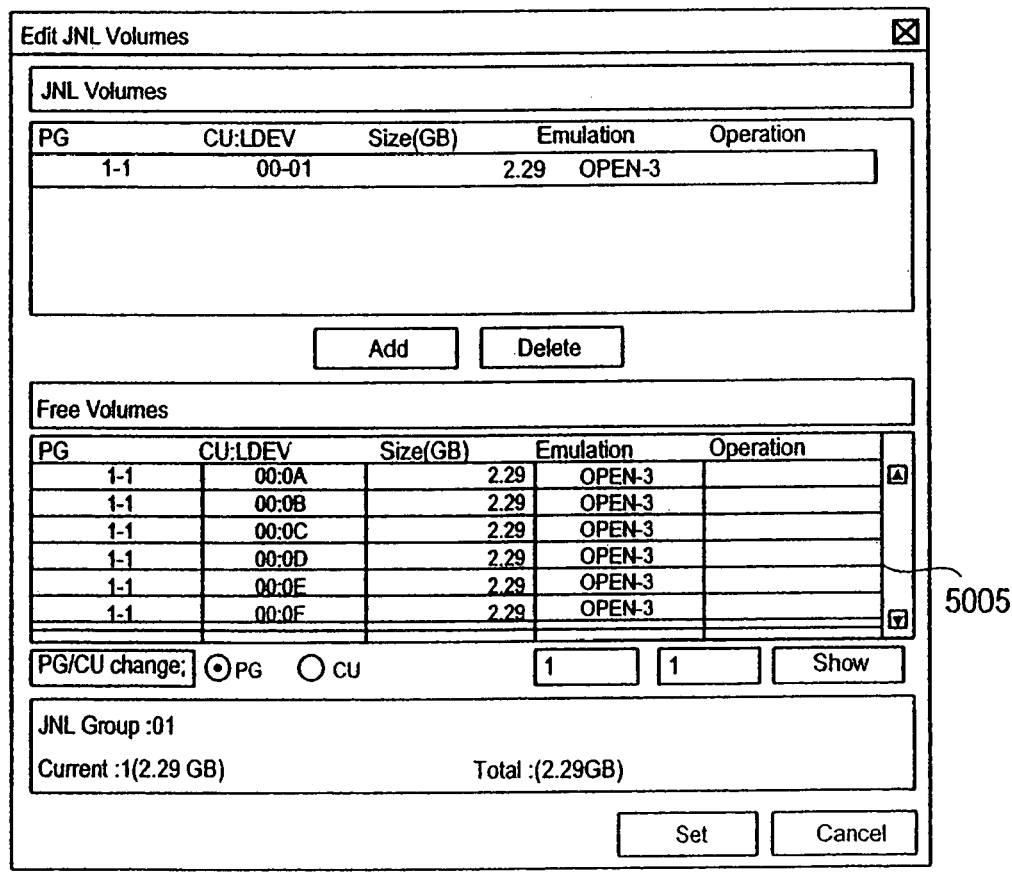
FIG. 32B shows a fourth GUI screen.

For example, the menu "JNL Volumes" indicated by reference number 5003 is selected by the user when a new journal logical volume is to be added to any group chosen by the user. The user can add a logical volume to form a journal logical volume registered for a group, by selecting any of the logical volumes from a list indicated by reference number 5005 on a fourth GUI screen illustrated in FIG. 32B, for example.

On the third GUI screen, the menu "Change Option" indicated by the reference number 5004 is selected by the user when the screen in FIG. 31A is to be displayed.

Although more detailed description is omitted here, the third GUI screen is also used to investigate unused groups (there the "Attribute" column is blank). Furthermore, the third GUI screen may also be used when the user wishes to confirm the group status. Moreover, the third GUI screen is also used when the user carries out operations (issues instructions) in group units, such as starting an initial copy process, or the like.

Figure 33A:
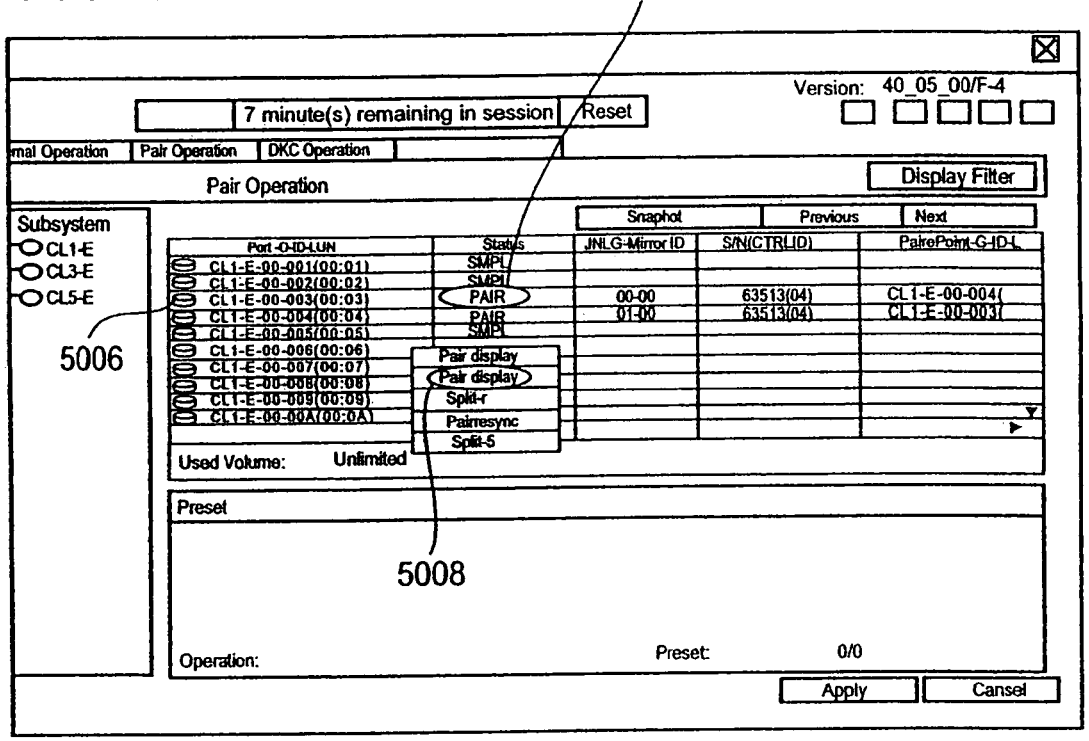
FIG. 33A shows a fifth GUI screen.

FIG. 33A shows one example of a fifth GUI screen.

The fifth GUI screen is a screen for specifying logical volumes forming pairs, and confirming the statuses of these pairs.

In the fifth GUI screen, the column "Status" indicates the pair status. An entry of "SMPL" in the column corresponding to this item indicates a logical volume that is not paired, and an entry of "PAIR" indicates a logical volume that is paired and for which data replication has been carried out normally. If the logical volume is a primary logical volume then "P" is indicated below and to the left of the icon 5006 and if the logical volume is a secondary logical volume then "S" is indicated. Furthermore, in the "Status" column, "Suspend" is displayed if the group status is "suspend", and "Copy" is displayed if initial copying is in progress.

Figure 33B:
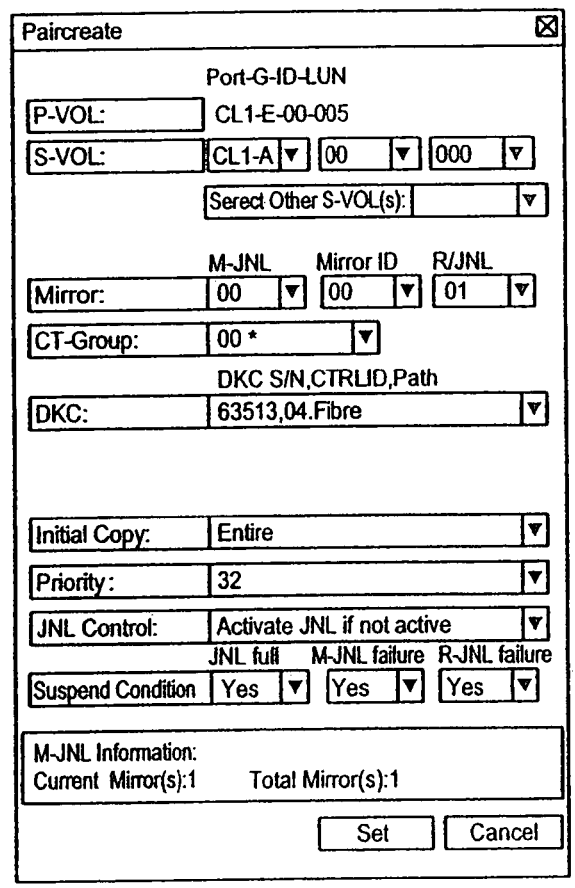
FIG. 33B shows a sixth GUI screen.

Furthermore, in the fifth GUI screen, it is possible to create a pair when the menu "Paircreate" indicated by reference number 5008 is selected. More specifically, if a primary logical volume is selected, right-clicked, and the menu "Paircreate" is selected in the resulting pop-up window, then a sixth screen such as that shown in FIG. 33B will be displayed. On this screen, a pair can be created by selecting a secondary logical volume, and a primary/secondary group number, and the like.

In the foregoing, a preferred mode of implementation and several embodiments of the present invention were described, but the present invention is not limited to this mode of implementation or these embodiments, and it may of course be modified in various ways without departing from the essence of the invention.

For example, in the foregoing description, a "number" is used to identify each element, but it is also possible to use any type of ID capable of identifying that element, and not just a number. More specifically, for example, the ID for identifying a storage system 100 is not limited to being a number, and it may also be a WWN (World Wide Name), iSCSI name, IP address, MAC address, or the like.

Furthermore, a journal may also be stored in the secondary storage system 100B by means of the primary storage system 100A sending the journal and a journal write command to the secondary storage system 100B. If a method using journal read commands is adopted, then it is possible for the secondary storage system 100B to issue commands in accordance with its own status, such as its load, or the like, and this improves convenience to the secondary storage system 100B. If a method using journal write commands is adopted, then it is possible for the secondary primary storage system 100A to issue commands in accordance with its own status, such as its load, or the like, and this improves convenience to the primary storage system 110A.

Moreover, if the control sub-system 101A detects that the update information stored in a journal logical volume of the primary storage system 100A has been restored, for example, by means of the secondary storage system 100B implementing a restore process based on a journal containing that update information, or if the journal containing the update information has been sent to the secondary storage system 100B, then the control sub-system 101A may discards that update information. The former case can be detected, for example, by means of the control sub-system 101B of the secondary storage system 100B sending the update number in the journal to the primary storage system 100A, each time a restore process is performed on the basis of a journal.

What is claimed is:

1. A storage system, comprising:
    a first storage device coupled to an information processing device and having a first controller and first disk drives, a first portion of said first disk drives being related to a first logical volume as a primary logical volume and a plurality of second portions of said first disk drives being related to a plurality of second logical volumes;
    said first controller receiving a plurality of data, which are sent from said information processing device and are targeted to said first logical volume, and storing a first portion of said plurality of data in said first portion of said first disk drives and storing said first portion of said plurality of data in said second portions of said first disk drives in alternate shifts and transferring data stored in said second portions of said first disk drives to a second storage device;
    said second storage device coupled to said first storage device and having a second controller and second disk drives, a third portion of said second disk drives being related to a third logical volume as a secondary volume forming a pair relationship with said primary volume;
    said second controller receiving said data transferred from said first controller and storing a first portion of said transferred data in said third portion of said second disk drives;
    a fourth portion of said second disk drives in said second storage device being related to at least one fourth logical volume,
    wherein said second controller stores said data transferred from said first controller in said fourth portion of said second disk drives before storing said first portion of said transferred data in said third portion of said second disk drives, and
    wherein said storage system is configured to provide information relating to said first logical volume, said plurality of second logical volumes, and said third logical volume for display at said information processing device or another information processing device coupled to the storage system.

2. A storage system according to claim 1:
    wherein said second controller reads said data stored in said fourth portion of said second disk drives in alternate shifts.

3. A storage system according to claim 2:
    wherein said second controller reads data stored in said fourth portion of said second disk drives in alternate shifts based on maintaining a data consistency with said first logical volume.

4. A storage system according to claim 1, further comprising:
    a plurality of fourth portions of said second disk drives in said second storage device being related to a plurality of fourth logical volumes;
    wherein said second controller stores said data transferred from said first controller in said plurality of fourth portions of said second disk drives in alternate shifts before storing said first portion of said transferred data in said third portion of said second disk drives.

5. A storage system according to claim 4:
    wherein said second controller reads said data stored in said plurality of fourth portions of said second disk drives in alternate shifts.

6. A storage system according to claim 4:
    wherein said second controller stores a first portion of said data stored in said plurality of fourth portions of said second disk drives in said third portion of said second disk drives based on maintaining a data consistency with said first logical volume.

7. A storage system according to claim 1:
    wherein said first controller manages a relationship between said data stored in said second portions of said first disk drives and a storage area information of said second portions of said first disk drives.

8. A storage system according to claim 7:
    wherein said first controller transfers to said second controller said relationship between said data stored in said second portions of said first disk drives and a storage area information of said second portions of said first disk drives.

9. A storage system according to claim 1:
    wherein said first controller has a first information indicating that said first logical volume functions as said primary logical volume and a second information indicating that said second logical volume functions as a logical volume being used to transfer data;
    wherein said second controller has a third information indicating that said third logical volume functions as said secondary logical volume.

10. A storage system, comprising:
    a first storage device coupled to an information processing device and having a first controller and first disk drives, a first portion of said first disk drives being related to a first logical volume as a primary logical volume and a plurality of second portions of said first disk drives being related to a plurality of second logical volumes;
    said first controller receiving a plurality of data, which are sent from said information processing device and are targeted to said first logical volume, and storing a first portion of said plurality of data in said first logical volume and storing said first portion of said plurality of data in said second logical volumes in alternate shifts and transferring data stored in said second logical volumes to a second storage device;

said second storage device coupled to said first storage device and having a second controller and a second disk drives, a third portion of said second disk drives being related to a third logical volume as a secondary volume forming a pair relationship with said primary volume;

said second controller receiving said data transferred from said first controller arid storing a first portion of said transferred data in said third logical volume;

wherein said storage system is configured to provide information relating to said first logical volume, said plurality of second logical volumes, and said third logical volume for display at said information processing device or another information processing device coupled to the storage system.

11. A storage system according to claim 10, further comprising:

a fourth portion of said second disk drives in said second storage device being related to at least me fourth logical volume;

wherein said second controller stores said data transferred from said first controller in said fourth logical volumes before storing said first portion of said transferred data in said third logical volume.

12. A storage system according to claim 11:

wherein said second controller reads said data stored in said fourth logical volumes in alternate shifts.

13. A storage system according to claim 12:

wherein said second controller reads said data stored in said fourth logical volumes in alternate shifts based on maintaining a data consistency with said first logical volume.

14. A storage system according to claim 10, further comprising:

a plurality of fourth portions of said second disk drives in said second storage device being related to a plurality of fourth logical volumes;

wherein said second controller stores said data transferred from said first controller in said plurality of fourth logical volumes in alternate shifts before storing said first portion of said transferred data in said third logical volume.

15. A storage system according to claim 14:

wherein said second controller reads said stored in said plurality of fourth logical volumes in alternate shifts.

16. A storage system according to claim 14:

wherein said second controller stores a first portion of said data stored in said plurality of fourth logical volumes in said third logical volume based on maintaining a data consistency with said first logical volume.

17. A storage system according to claim 10:

wherein said first controller manages a relationship between said data stored in said second logical volumes and a storage area information of said second logical volumes.

18. A storage system according to claim 17:

wherein said first controller transfers to said second controller said relationship between said data stored in said second logical volumes and a storage area information of said second logical volumes.

19. A storage system according to claim 10:

wherein said first controller has a first information indicating that said first logical volume functions as said primary logical volume and a second information indicating that said second logical volume functions as a logical volume being used to transfer data;

wherein said second controller has a third information indicating that said third logical volume functions as said secondary logical volume.

* * * * *